(12) United States Patent
Burnett et al.

(10) Patent No.: US 7,484,574 B2
(45) Date of Patent: Feb. 3, 2009

(54) DRILL CUTTINGS CONVEYANCE SYSTEMS AND METHODS

(75) Inventors: George Alexander Burnett, Aberdeen (GB); Colin Crabb, Arbroath (GB); David Wood, Subiaco (AU); Kenneth Wayne Seyffert, Houston, TX (US); William Chrtistian Herben, Magnolia, TX (US); James Michael McIntosh, Willis, TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 11/643,028

(22) Filed: Dec. 20, 2006

(65) Prior Publication Data

US 2007/0215386 A1    Sep. 20, 2007

Related U.S. Application Data

(60) Division of application No. 10/875,083, filed on Jun. 22, 2004, now Pat. No. 7,195,084, and a continuation-in-part of application No. 10/764,825, filed on Jan. 26, 2004, now Pat. No. 6,988,567, which is a continuation-in-part of application No. 10/392,285, filed on Mar. 19, 2003, now Pat. No. 6,936,092.

(51) Int. Cl.
    *E21B 21/06* (2006.01)
(52) U.S. Cl. .......................................... 175/66; 175/207
(58) Field of Classification Search .................. 55/428, 55/430; 175/66, 206, 207
    See application file for complete search history.

(56) References Cited

U.S. PATENT DOCUMENTS

| | | | |
|---|---|---|---|
| 1,559,666 A | 11/1925 | Bernier | |
| 2,816,803 A | 12/1957 | Clark et al. | |
| 2,979,235 A | 4/1961 | Greaves | |
| 3,071,297 A | 1/1963 | Lee | |
| 3,420,419 A | 1/1969 | Haslett, Jr. | |
| 3,708,207 A | 1/1973 | Steele | 302/24 |
| 3,762,773 A | 10/1973 | Schroeder | 302/53 |
| 4,059,195 A | 11/1977 | MacDonald et al. | 214/44 R |
| 4,073,244 A | 2/1978 | Snowdon | 110/165 R |
| 4,085,975 A | 4/1978 | Bilkvist | 302/23 |
| 4,098,412 A | 7/1978 | Shakshober | 214/15 D |
| 4,137,935 A | 2/1979 | Snowdon | 137/242 |
| 4,165,133 A | 8/1979 | Johnson | 406/109 |

(Continued)

FOREIGN PATENT DOCUMENTS

DE    4 010 676    10/1991

(Continued)

OTHER PUBLICATIONS

Form PCT/ISA/210 [8 pp.] and Form PCT/ISA/237 [7 pp.]; PCT/GB2004/00762; mailed Jul. 21, 2004.

(Continued)

*Primary Examiner*—Robert A Hopkins
(74) *Attorney, Agent, or Firm*—Guy McClung

(57) ABSTRACT

Methods for processing drill cuttings including measuring moisture content of the drill cuttings; systems for doing this; methods for moving drill cuttings using conduits with spaced-apart inlets for applying positive pressure; and feeding apparatuses for loading drill cuttings into a positive pressure conduit.

16 Claims, 26 Drawing Sheets

U.S. PATENT DOCUMENTS

| | | | |
|---|---|---|---|
| 4,200,412 A | 4/1980 | Steele | 406/22 |
| 4,355,929 A | 10/1982 | Snowdon | 406/125 |
| 4,430,030 A | 2/1984 | Langen et al. | 406/146 |
| 4,515,503 A | 5/1985 | Snowdon | 406/11 |
| 4,525,107 A | 6/1985 | Feldsted | 406/25 |
| 4,546,783 A | 10/1985 | Lott | 134/109 |
| 4,595,422 A | 6/1986 | Hill et al. | 134/19 |
| 4,606,283 A | 8/1986 | Des Ormeaux et al. | 110/250 |
| 4,695,205 A | 9/1987 | Levine | 406/38 |
| 4,726,301 A | 2/1988 | Des Ormeaux et al. | 110/250 |
| 4,747,961 A | 5/1988 | Beer et al. | 210/770 |
| 4,822,542 A | 4/1989 | Kuwabara et al. | 264/50 |
| 4,834,587 A | 5/1989 | Crawley et al. | 406/23 |
| 4,861,200 A | 8/1989 | Lubbehusen et al. | 406/14 |
| 4,941,779 A | 7/1990 | Dewitz et al. | 406/138 |
| 5,071,290 A | 12/1991 | Johnson | 406/171 |
| 5,090,498 A | 2/1992 | Hamill | 175/206 |
| 5,122,038 A | 6/1992 | Malkoski | 417/313 |
| 5,248,222 A | 9/1993 | Littman et al. | 406/142 |
| 5,303,786 A | 4/1994 | Prestridge et al. | 175/66 |
| 5,303,998 A | 4/1994 | Whitlatch et al. | 366/3 |
| 5,310,285 A | 5/1994 | Northcott | 588/250 |
| 5,433,559 A | 7/1995 | VandeSande | 406/145 |
| 5,624,058 A | 4/1997 | Bailey | 222/240 |
| 5,667,681 A | 9/1997 | Magrecki et al. | 210/374 |
| 5,853,583 A | 12/1998 | Shah | 210/340 |
| 6,045,070 A | 4/2000 | Davenport | 241/60 |
| 6,055,781 A | 5/2000 | Johanson | 52/197 |
| 6,138,834 A | 10/2000 | Southale | 209/17 |
| 6,179,070 B1 | 1/2001 | Dietzen | 175/66 |
| 6,315,813 B1 | 11/2001 | Morgan et al. | 95/23 |
| 6,345,672 B1 | 2/2002 | Dietzen | 175/66 |
| 6,530,438 B1 * | 3/2003 | McIntyre | 175/66 |
| 6,585,115 B1 | 7/2003 | Reddoch et al. | 209/3 |
| 6,698,989 B2 | 3/2004 | Snowdon | 414/137 |
| 6,702,539 B2 | 3/2004 | Snowdon | 414/137.1 |
| 6,709,216 B2 | 3/2004 | Snowdon | 414/137 |
| 6,709,217 B1 | 3/2004 | Snowdon | 414/137.1 |
| 6,752,273 B2 | 6/2004 | Reddoch | 209/2 |
| 6,763,605 B2 | 7/2004 | Reddoch | 34/58 |
| 6,786,681 B2 | 9/2004 | Grasshoff | 406/11 |
| 6,793,814 B2 | 9/2004 | Fout et al. | 210/188 |
| 6,855,261 B2 | 2/2005 | Boutte et al. | 210/768 |
| 6,881,349 B2 | 4/2005 | Mueller | 210/708 |
| 7,074,339 B1 | 7/2006 | Mims | 210/788 |
| 2002/0074269 A1 | 6/2002 | Hensley et al. | |
| 2003/0006202 A1 | 1/2003 | Boutte et al. | |
| 2004/0086345 A1 | 5/2004 | Snowdon | 406/198 |
| 2004/0086360 A1 | 5/2004 | Snowdon | 414/137.1 |
| 2004/0096298 A1 | 5/2004 | Snowdon | 414/137.1 |

FOREIGN PATENT DOCUMENTS

| | | |
|---|---|---|
| EP | 0060137 | 9/1982 |
| EP | 0 705 214 B1 | 4/1997 |
| EP | 0 668 968 B1 | 5/1997 |
| EP | 0 630 839 B1 | 9/1997 |
| EP | 0 502 882 B1 | 5/2000 |
| EP | 1321395 B1 | 6/2000 |
| GB | 1386710 | 7/1973 |
| GB | 1426035 | 1/1974 |
| GB | 1595065 | 1/1977 |
| GB | 2087335 | 5/1982 |
| GB | 2 089 403 A | 6/1982 |
| GB | 2096965 | 10/1982 |
| GB | 2147397 A | 9/1983 |
| GB | 2238730 A | 5/1990 |
| GB | 2289705 A | 5/1994 |
| GB | 2301382 A2 | 11/1995 |
| GB | 2297402 A | 3/1996 |
| GB | 2297702 A | 8/1996 |
| GB | 2 318 370 | 9/1997 |
| GB | 2 327 442 A | 1/1999 |
| GB | 2 327 958 A | 2/1999 |
| GB | 2 339 443 A | 1/2000 |
| GB | 2 344 336 A | 6/2000 |
| GB | 2 403 963 | 7/2003 |
| WO | WO 95/00426 | 1/1995 |
| WO | WO 99/04134 | 1/1999 |
| WO | WO 99/06668 | 2/1999 |
| WO | WO 99/22113 | 5/1999 |
| WO | WO 00/76889 | 6/2000 |
| WO | WO 01/20120 A1 | 9/2000 |
| WO | WO 00/76889 A1 | 12/2000 |
| WO | WO 01/00313 A1 | 1/2001 |
| WO | WO 01/42619 A1 | 6/2001 |
| WO | 2002/004044 | 9/2002 |
| WO | WO 03/021074 | 9/2002 |
| WO | 2005 102883 | 4/2005 |
| WO | PCT/GB2005/050091 | 4/2005 |

OTHER PUBLICATIONS

"Operating and Maintenance Instructions for Don Valley Horizontal Mud Recovery Centrifuge MUD 10;" Don Valley Engineering Company Limited. 1996.

Strategic Management of Waste Streams Generated by Exploration and Production Drilling Operations, Minton, 4 pp., Jul. 16, 2004.

Managing the Regulatory and Project Risks Associated with the Sub-surface Disposal of Oil-Contaminated Waste Streams, Minton, 6 pp., Mar. 2005.

Experimental Observations Obtained From Long Distance Pneumatic COnveying Studies, R.D. Marcus, Pneumatech 2, Int'l Conference on Pneumatic Conveying Technology; pp. 126-149. Book Cover. & Copyright notice page; 1984.

Pneumatic Conveying Of Solids, Klinzing & Marcus, pp. 1-6, 284-288, 290-298, 426-428, and 480; 1997.

* cited by examiner

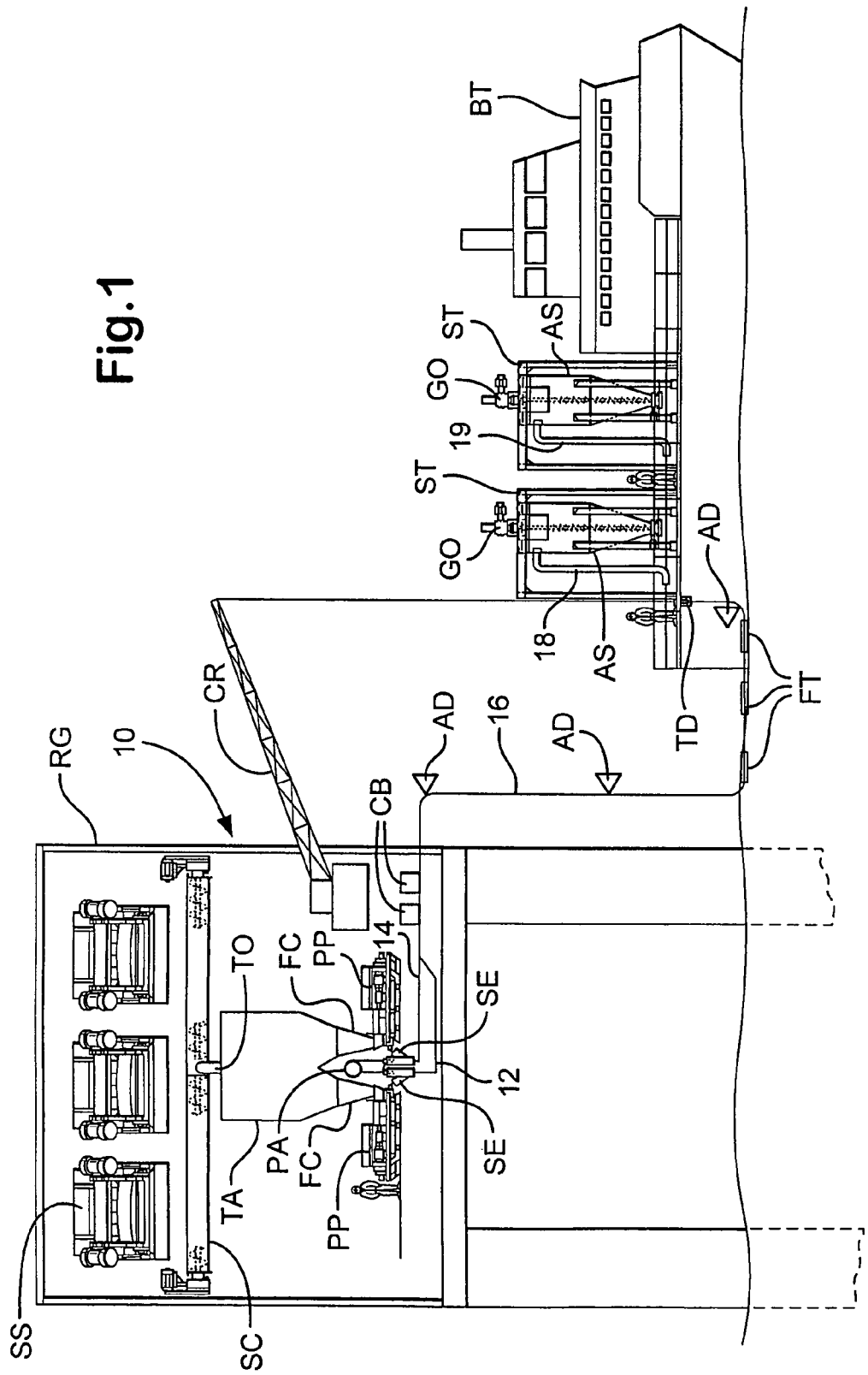

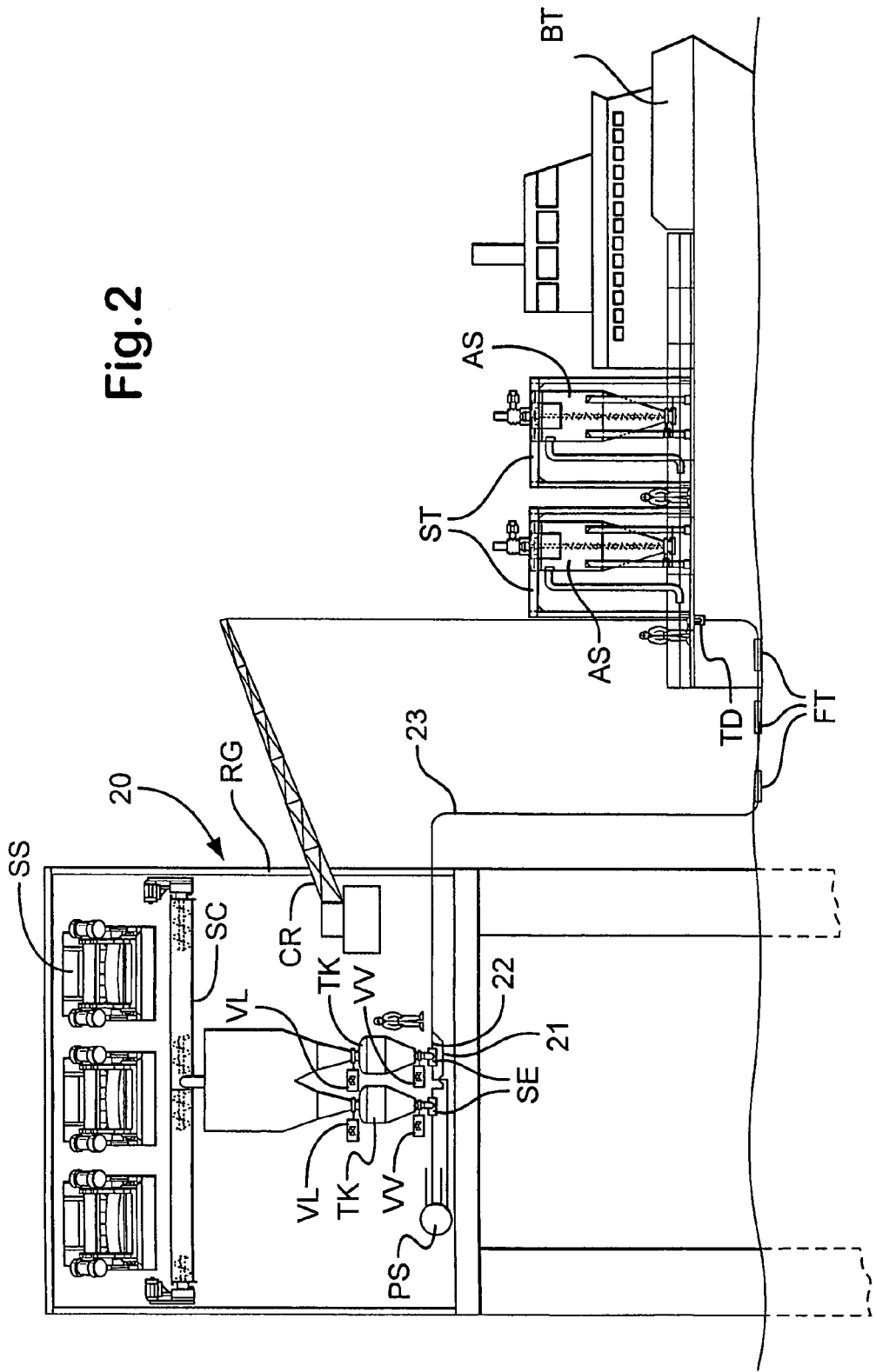

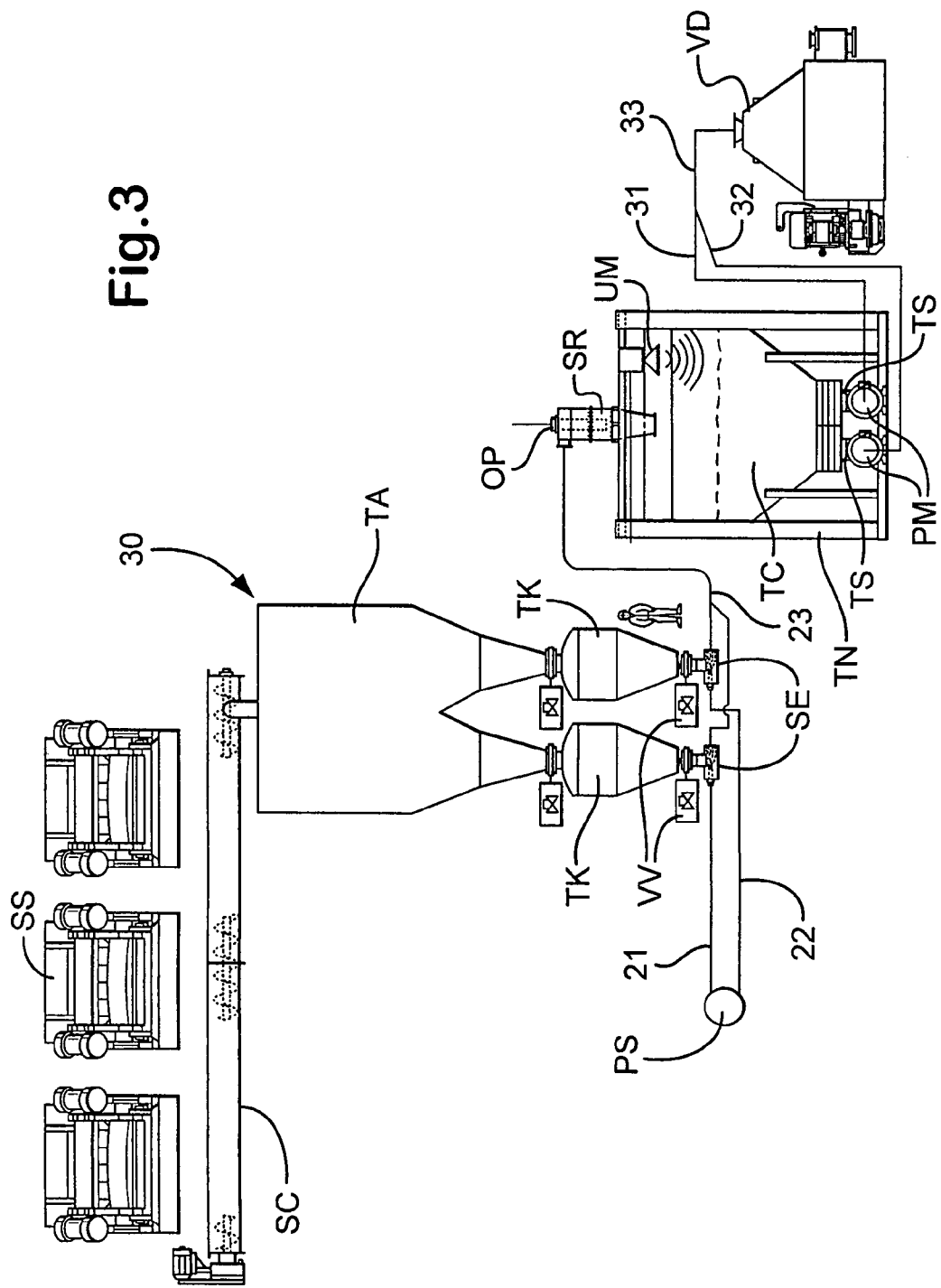

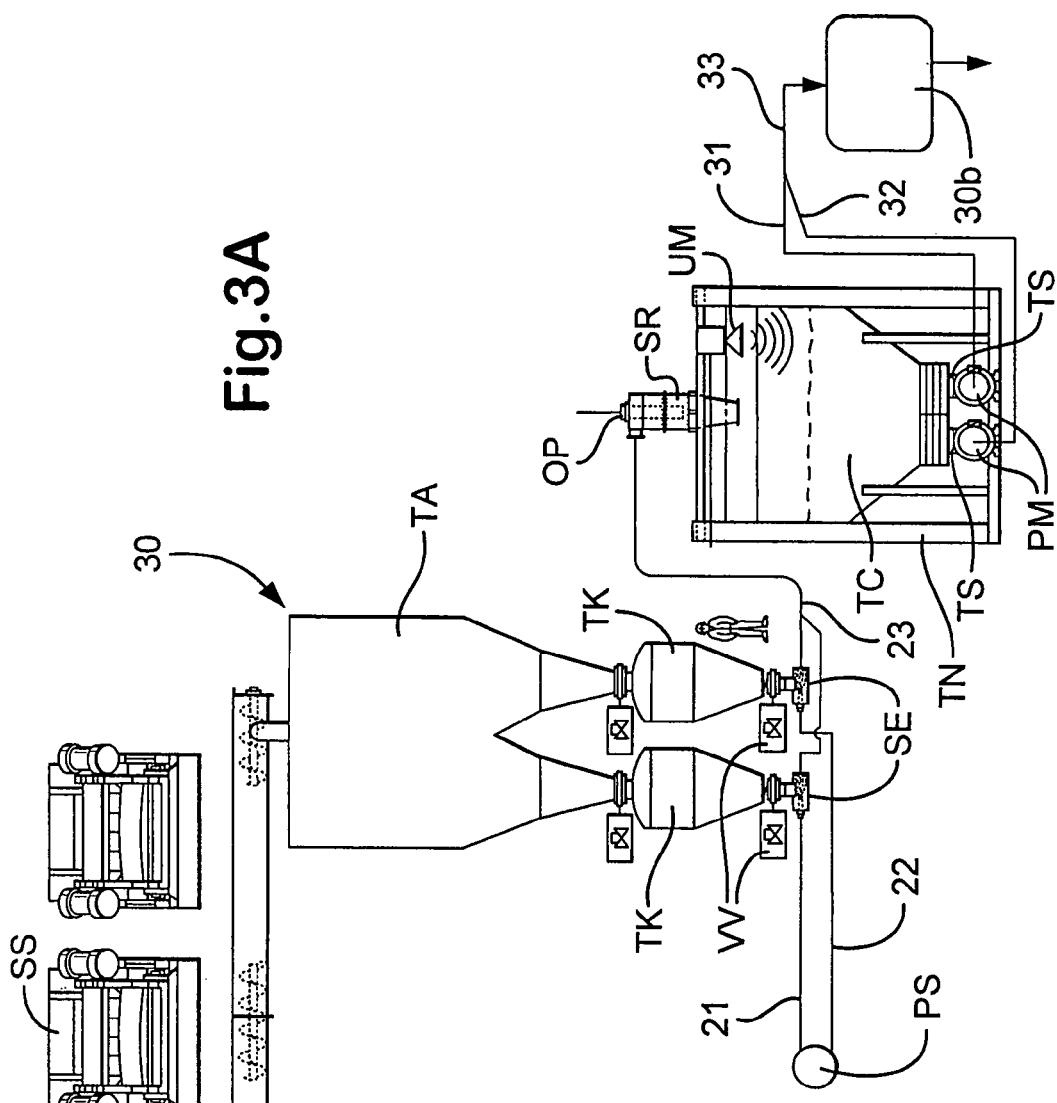
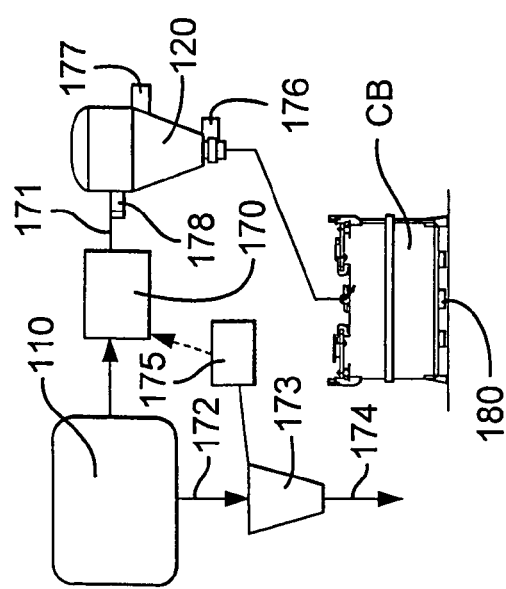

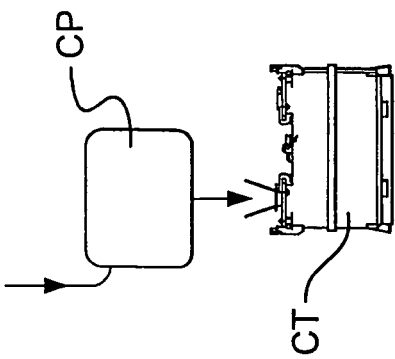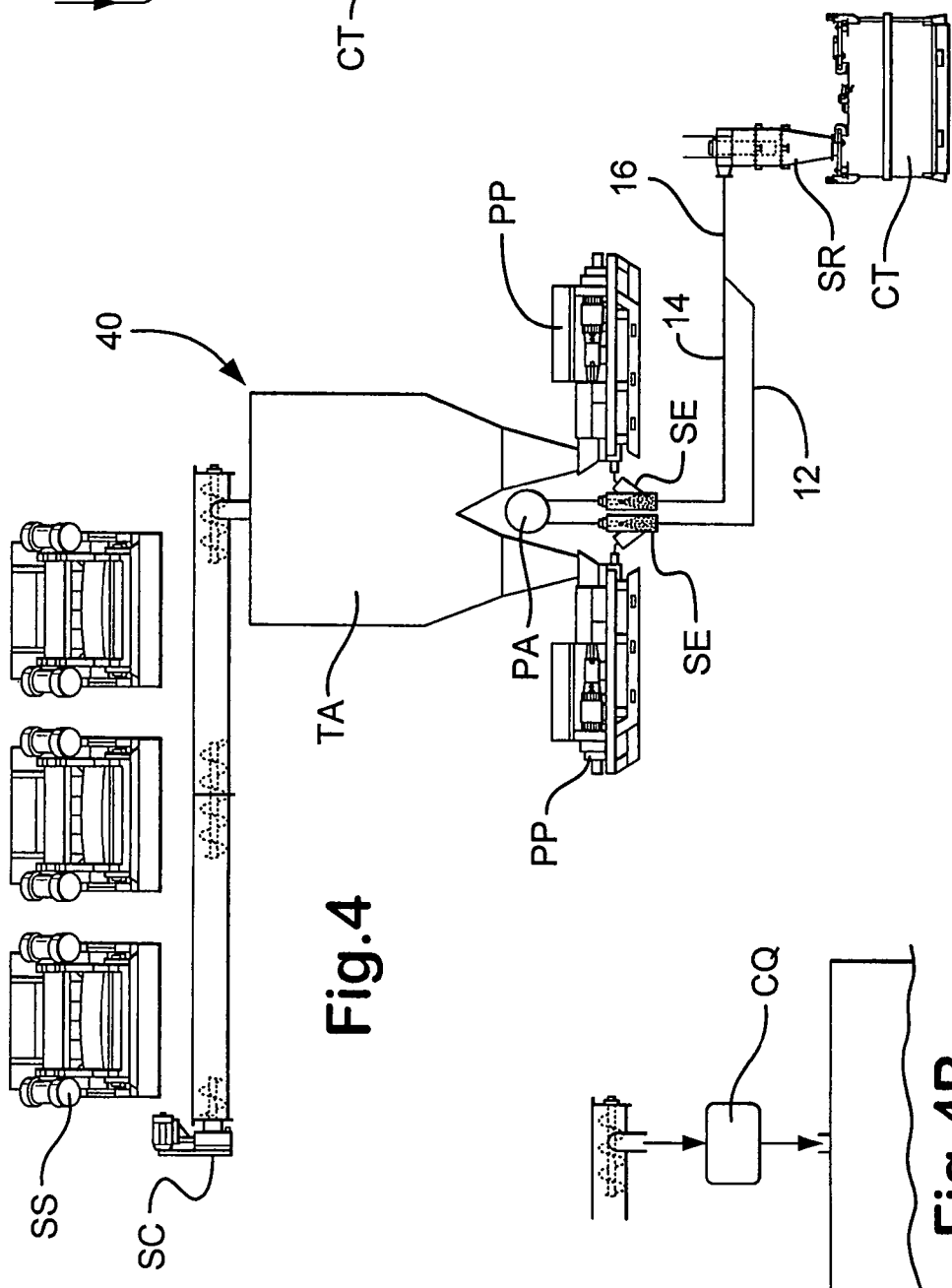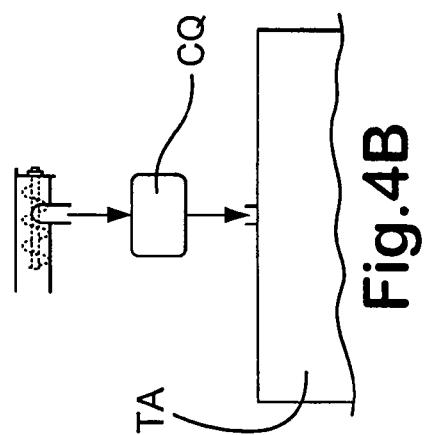

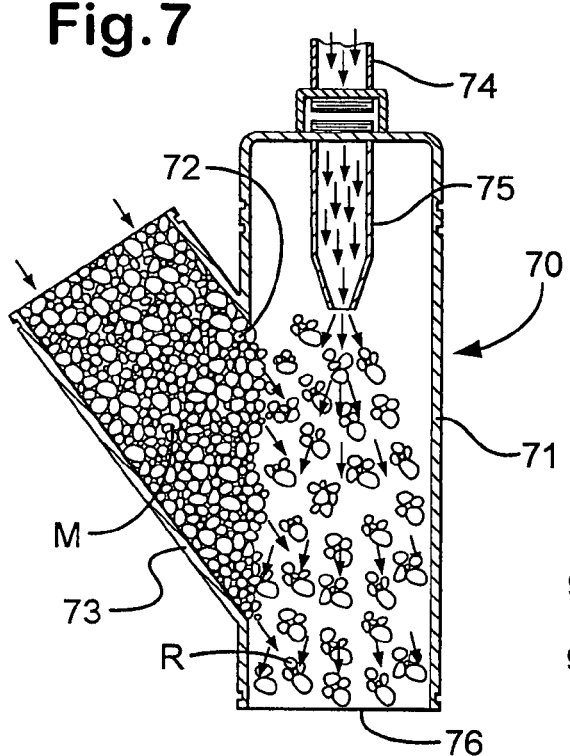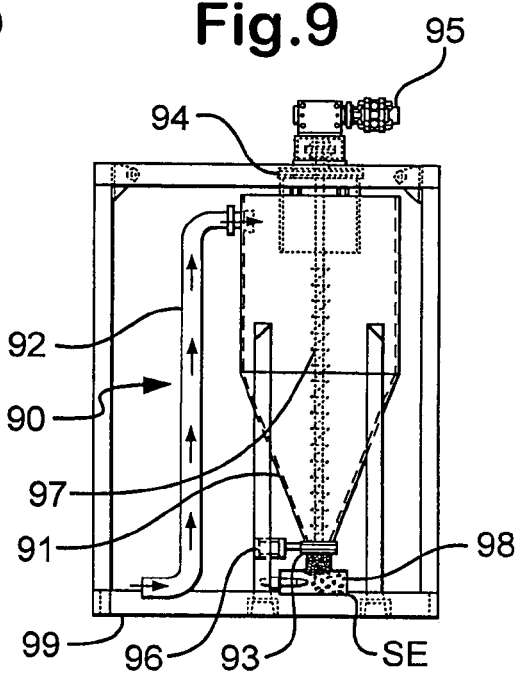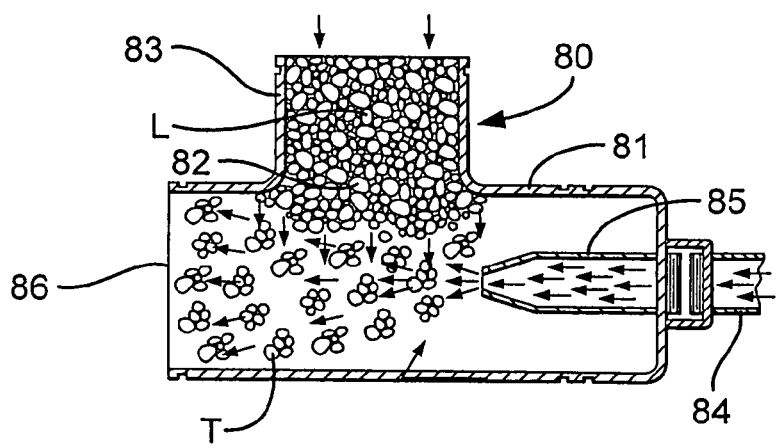

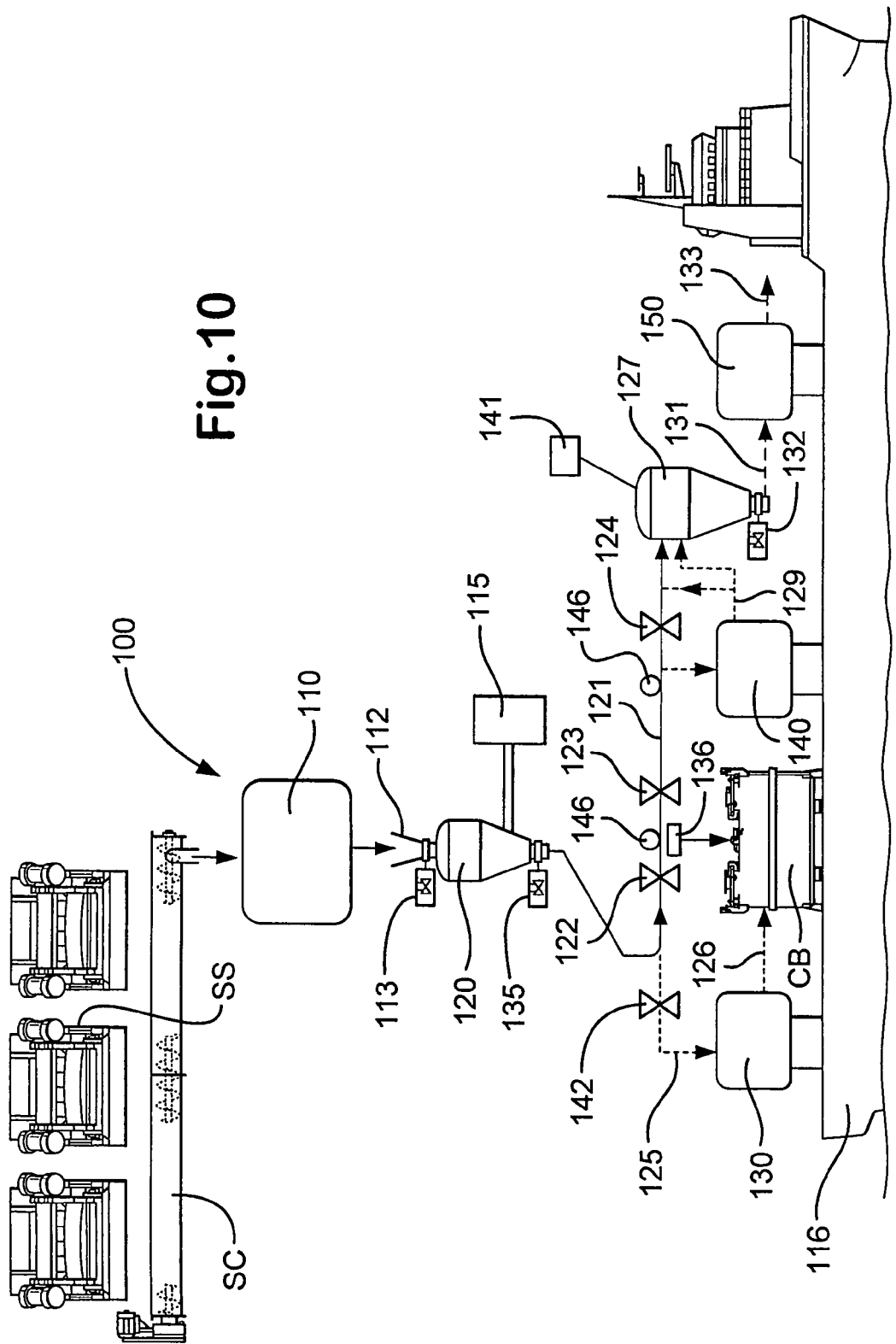

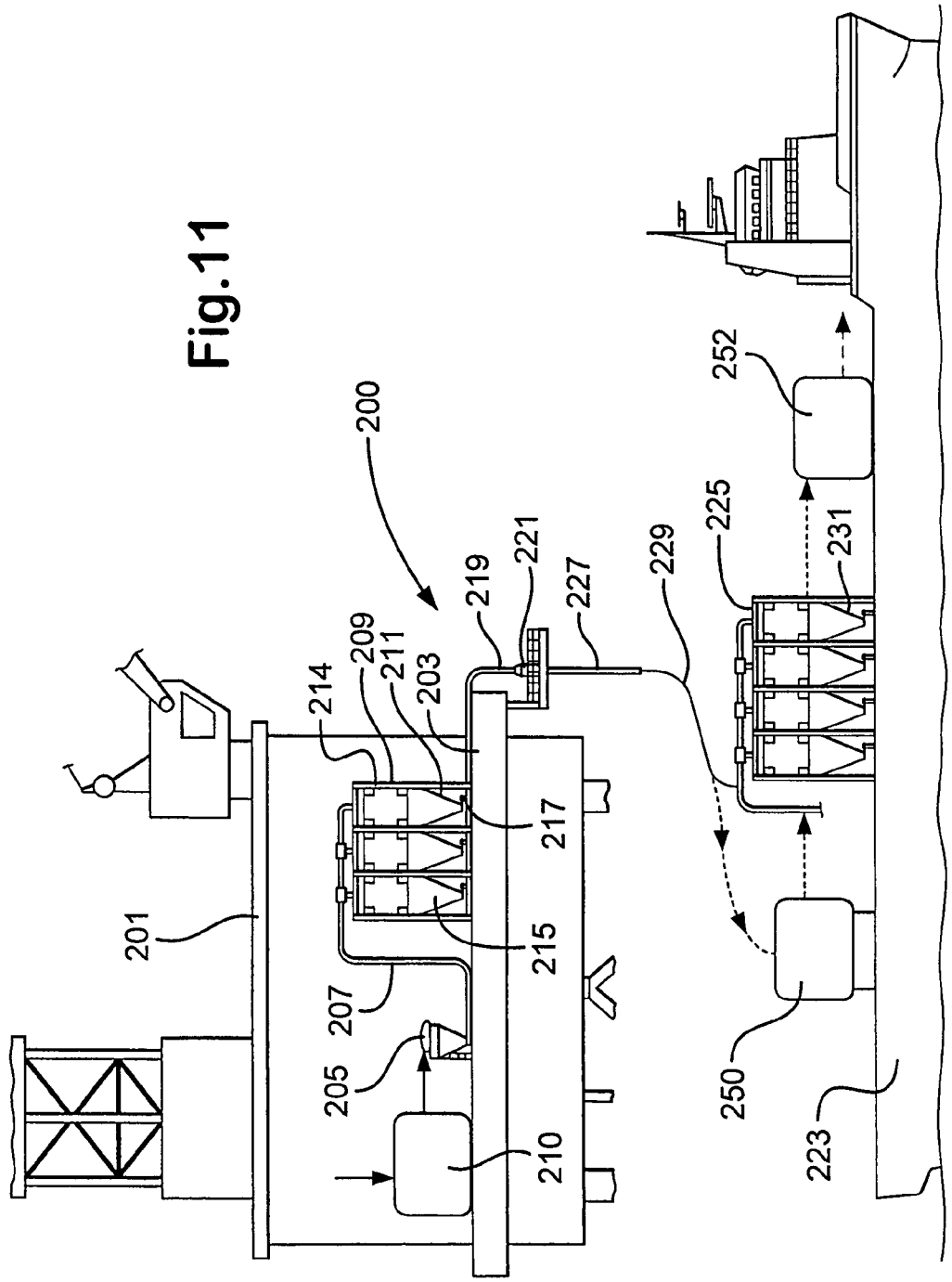

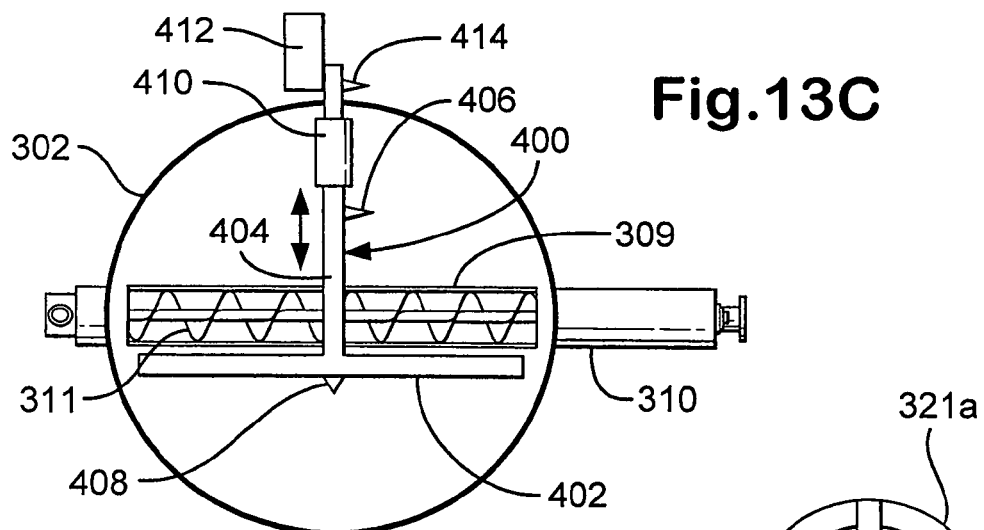
Fig.13C
Fig.13D
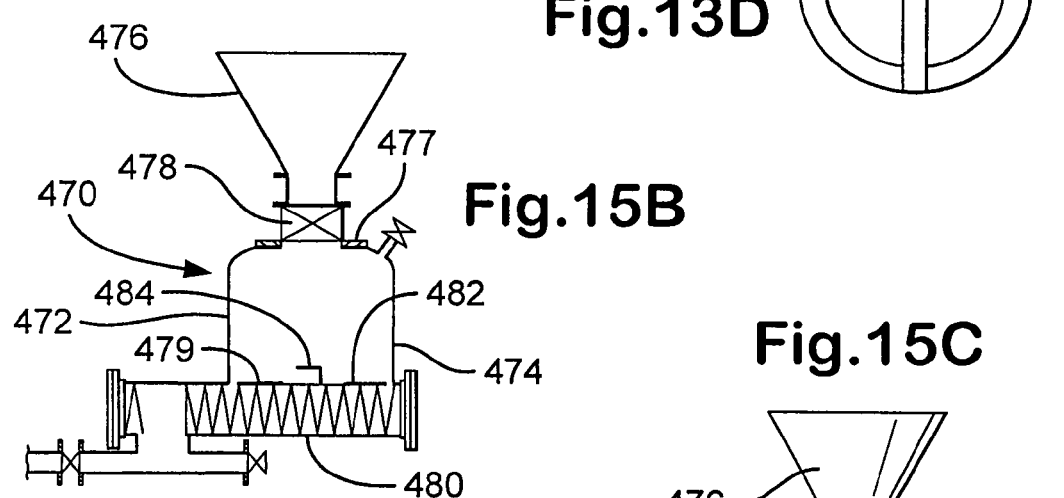
Fig.15B
Fig.15C
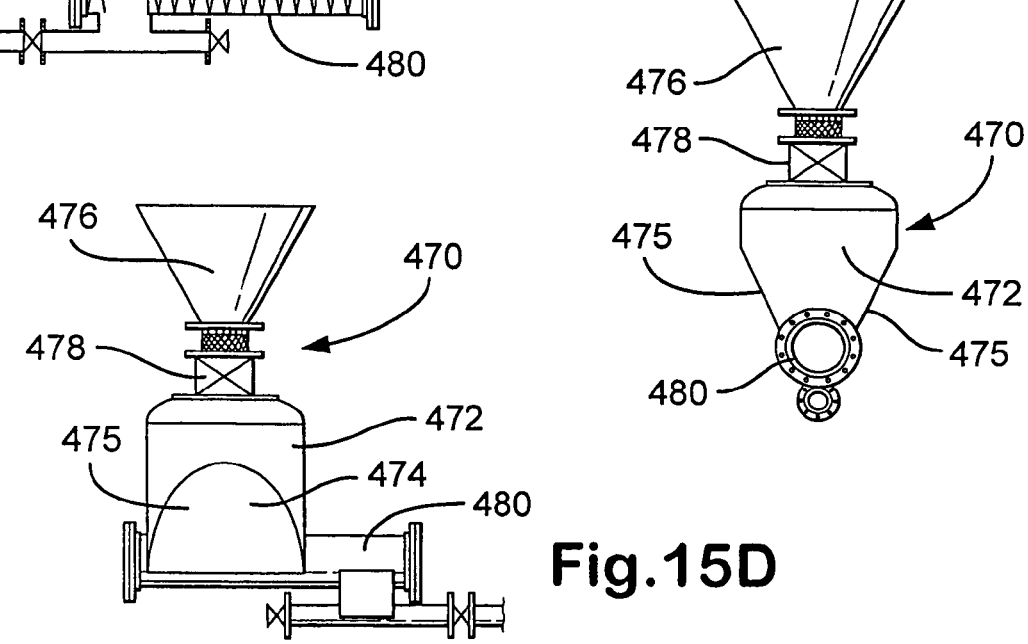
Fig.15D

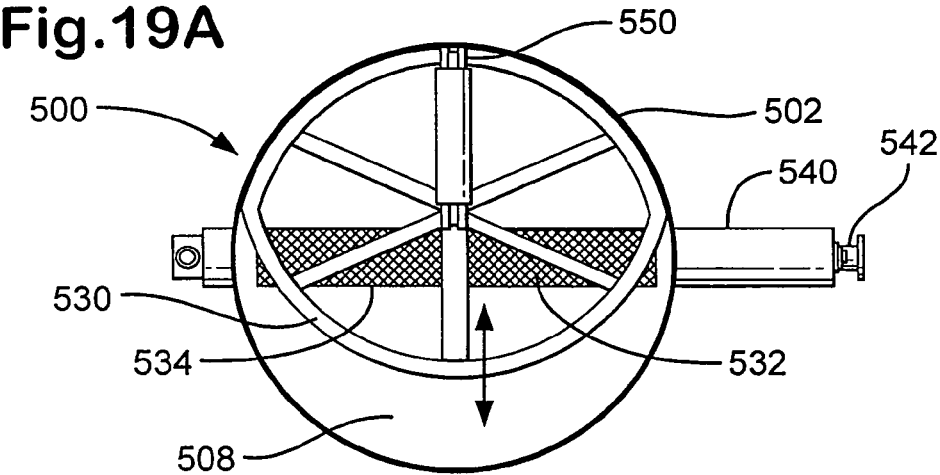
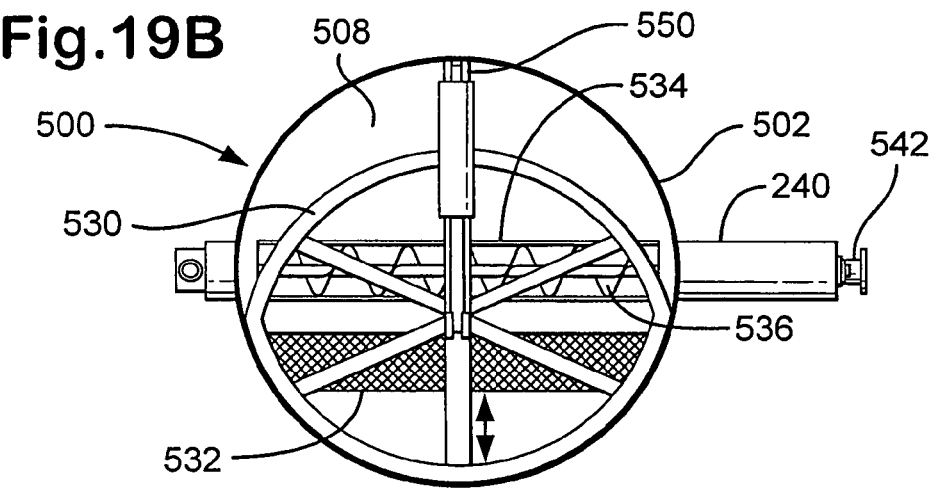
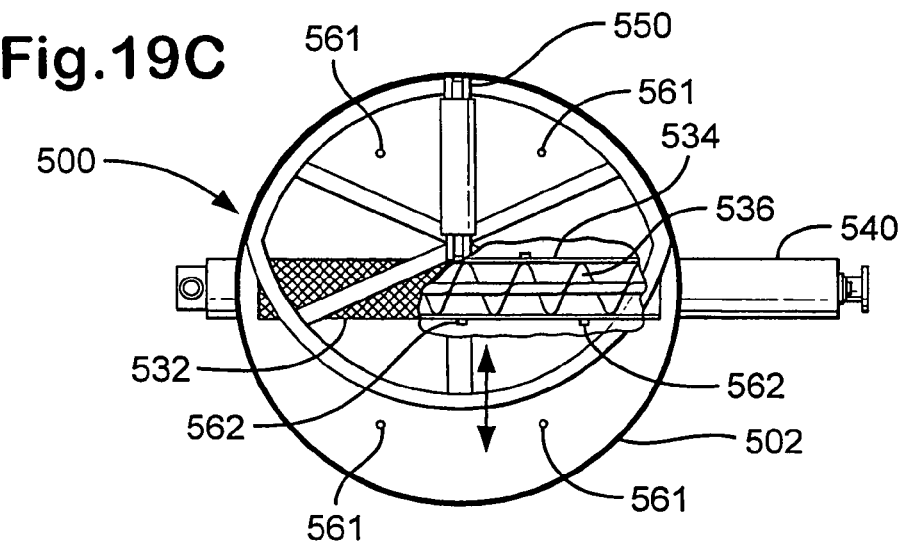

Pressurised screw feeder

DRILL CUTTINGS CONVEYANCE SYSTEMS AND METHODS

CROSS-REFERENCE TO RELATED APPLICATIONS

This is a division of U.S. application Ser. No. 10/875,083 filed Jun. 22, 2004, now U.S. Pat. No. 7,195,084 which is a continuation-in-part of U.S. application Ser. No. 10/392,285 filed Mar. 19, 2003, now U.S. Pat. No. 6,936,092 and Ser. No. 10/764,825 filed Jan. 26, 2004, now U.S. Pat. No. 6,988,567, and is a division of PCT Application PCT/GB2005/050091 (Publication No. WO 2005/124,096)—all of which applications are incorporated fully herein for all purposes and from all of which the present invention claims priority under the Patent Laws.

BACKGROUND OF THE INVENTION

1. Field of the Invention

The present invention is directed to the movement of drilled cuttings (wet, damp, or dry), to the positive pressure pneumatic transport of such drilled cuttings solids, and, in particular aspects, to the movement of oilfield drilled cuttings or other solids for disposal, onward transportation, storage or further processing.

2. Description of Related Art

The prior art discloses various methods for the positive pressure pneumatic continuous pneumatic transport of low slurry density and low particle density dry solids and non-continuous high slurry density transport of high particle density wet material. Many low density slurries typically have particles mixed with air with a specific gravity less than 1.0. The prior art discloses various methods that employ the vacuum transport of high particle and low particle density solids.

To drill an oil or gas well, a drill bit at the end of a drill string is rotated to drill the borehole in the earth. A drilling fluid ("drilling mud") pumped through the drill string to the drill bit lubricates the drill bit and carries drilled cuttings produced and other solids and debris to the surface through an annulus between the drill string's exterior and the borehole's interior. Due to its expense, attempts are made to recover and re-use the used drilling mud. Solids are removed from the drilling mud by, e.g. vibratory separators, such as those shale shakers disclosed in U.S. Pat. No. 5,265,730, WO 96/33792 and WO 98/16328. Recovered drilling mud is received in a reservoir or receptacle beneath a shale shaker and separated solids (e.g. drilled cuttings) move off the top of the shaker's screens into a ditch, receptacle, or skip.

Drilled cuttings having processed by a shale shaker can contain approximately 10% to 20% moisture (oil, water) by weight.

It is now often desirable and/or legislatively required to transport recovered drilled cuttings to a processing site on shore to remove substantially all of the oil and contaminates therein so that the drilled cuttings can be disposed of or used in an environmentally safe and friendly way. Environmental agencies around the world are moving towards a "zero discharge" policy from offshore rigs. Continuous drilling on an offshore oil rig is common and drilled cuttings are stored on the rigs until they can be transported by ships known as supply boats which collect the oily drill cuttings and take them to another site for further processing. There is a need to efficiently and effectively store the oily drilled cuttings on the rig and also a need to efficiently and effectively store the cuttings on supply boats.

In certain prior art systems oily drill cuttings are loaded into vessels, skips or cuttings boxes which are lifted by a crane onto a supply boat.

U.S. Pat. No. 6,702,539 issued Mar. 9, 2004, PCT publication number WO 00/76889 and European Patent No. EP 1,187,783 B1 disclose systems for transporting drill cuttings in the form of a non-free flowing paste, the system comprising a pressure vessel having a conical hopper discharge portion having a cone angle sufficient to induce mass flow. The drill cuttings are stored on a rig and supply boat in ISO sized storage vessels which have a conical hopper discharge portion, such that the ISO sized container vessels can be discharged between each other on the rig and ship and between the ship and port.

German Patent No. DE 40 10 676 discloses an apparatus for conveying sewage sludge or concrete. The apparatus comprises a pressure vessel having a feed opening and a screw conveyor therebelow. Paddles act as a stirrer and forcibly fill the screw conveyor through an opening in the pressure vessel. The sewage sludge or concrete is moved by the screw conveyor into a nozzle into which compressed air is applied to move the sewage sludge or concrete along a pipe in a continuous stream United Kingdom Patent No. GB-A-2,330,600 discloses a system for transporting oil drill cuttings from a rig to shore. The system comprises the steps of mixing the oily drill cuttings with a mud to form a slurry, storing the slurry in retention tanks on the rig and subsequently pumping the slurry to retention tanks on a ship for transportation to shore.

There has long been a need, recognized by the present inventors, for continuous positive pressure pneumatic transport of low slurry density, high particle density material, and in certain aspects, oilfield drilled cuttings (wet, damp, or dry) or other oily/wet waste material. There has long been a need, recognized by the present inventors, for such systems which occupy relatively little space.

BRIEF SUMMARY OF THE INVENTION

The present invention, in certain aspects, discloses a system for processing drilling cuttings material.

The present invention, in certain aspects, discloses a vessel for selectively holding drilling cuttings material, the vessel having: a body, the body having a hollow container with an interior space for receiving drilling cuttings material and from which drilling cuttings material may exit from the body; a first opening through which the drilling cuttings material is introducible into the hollow container; a second opening through which the drilling cuttings material is passable out from the hollow container; movement apparatus, the movement apparatus having a movement member within the hollow container and movable adjacent the second opening to facilitate passage of the drilling cuttings material into the second opening; and an exit opening through the body through which drilling cuttings can exit from the hollow container.

The present invention, in certain aspects, discloses a vessel for selectively holding drilling cuttings material, the vessel having: a body, the body having a hollow container with an interior space for receiving drilling cuttings material and from which drilling cuttings material may exit from the body; a first opening through which the drilling cuttings material is introducible into the hollow container; a second opening through which the drilling cuttings material is passable out from the hollow container; movement apparatus, the movement apparatus having a movement member within the hollow container and movable adjacent the second opening to facilitate passage of the drilling cuttings material into the second opening; an inlet in the body through which compressed gas under pressure is flowable into the body to facilitate the passage of the drilling cuttings material through the body; the movement apparatus further having power apparatus connected to the movement member for moving the movement member; wherein the second opening has a length and the movement member has an elongated member with a length substantially equal to the length of the second opening; wherein the second opening has a width and the movement member is movable back and forth across said width; conveyance apparatus located below the second opening, the conveyance apparatus including a conduit for receiving the drilling cuttings material passing through the second opening.

The present invention, in certain aspects, discloses a system for processing drilling cuttings material, the system having: a cuttings feeder system for receiving drilling cuttings material from a wellbore operation; conduit apparatus for conveying drilling cuttings material from the cuttings feeder system to first storage apparatus and to second storage apparatus; sensor apparatus for sensing moisture content of drilling cuttings material in the cuttings feeder system; valve apparatus on the conduit apparatus for selectively controlling flow to the first storage apparatus and to the second storage apparatus; control apparatus in controlling communication with the cuttings feeder system, the sensor apparatus, and the valve apparatus for selectively permitting flow of drilling cuttings material from the cuttings feeder system and through the conduit apparatus to either the first storage apparatus or the second storage apparatus depending on sensed moisture content of the drilling cuttings material sensed by the sensor apparatus; and the control system permitting flow to the first storage apparatus when sensed moisture content is below a pre-selected valve and to the second storage apparatus when sensed moisture content is above the pre-selected valve.

The present invention, in certain aspects, provides a vessel which, in one aspect is a drill cuttings storage vessel with a pressure vessel, a pneumatic fluid inlet for introducing pneumatic fluid under pressure, and a discharge opening. The storage vessel has a base through which the discharge opening is located and at least one member within the vessel slidable over and along the base towards and away from the discharge opening for facilitating movement of the drill cuttings towards the discharge opening. With appropriately shaped edges and/or members on the slidable member, the slidable member digs material from above it and delivers the material to conveyor apparatus below the discharge opening; and, in one particular aspect, in this manner a conveyor line is maintained substantially full thereby facilitating consistent dosing rates. The conveying line may, in certain aspects, be dosed with drill cuttings in such a way that the conveying line is full so that the drill cuttings move along the conveying line in one long slug. Alternatively, the drill cuttings may form a plurality of slugs along the conveying line separated by pockets of pneumatic fluid. This is controlled by the rate at which the drilled cuttings are released or pushed into the conveying line, which is known as the "dosing rate". The dosing rate is dictated by, among other things, the consistency of the drilled cuttings, the pneumatic pressure applied to the drilled cuttings, and the diameter of the conveying line in order to achieve a predetermined conveying rate. In a preferred embodiment, a conveying rate of thirty metric tons of drilled cuttings per hour are moved along from the storage vessel into the conveying line and on to a destination.

The drill cuttings stored in the storage vessel may be dry or may be wet. Wet cuttings contain water and/or oil. Wet drill cuttings may be free flowing, non-free flowing, or pasty. Drill cuttings are often wet after having been processed with shale shakers. The drill cuttings may be dried by a vortex dryer, as described herein to produce substantially dry drill cuttings which, in some aspects, may be free flowing solids which abide by the laws of Newtonian flow.

In certain aspects the sliding member has a chamfered edge or edges for sliding under the drill cuttings and/or advantageously a scooping edge for scooping the drill cuttings into the opening. In certain aspects, the scooping edge has a planar surface at right angles to the base.

In certain aspects the storage vessel has a piston and cylinder assembly moving the sliding member(s) for sliding the sliding member(s) over the base towards the discharge opening. Alternatively, a rack and pinion system may be employed or a rotating disk having an arm located on the perimeter thereof to translate rotational motion into forwards and backwards motion, in a similar way to a crank in a car engine. Such a sliding member may be used in a variety of tanks, including, but not limited to, a mass flow hopper, core flow hopper, flat bottom hopper, a chisel plane flow-type tank, or a conical tank.

In certain aspects a storage vessel according to the present invention has a second member slidable over the base towards and away from the discharge opening for moving the drill cuttings towards the discharge opening. In one aspect the second member is fixed to the first member and forms a frame. In certain embodiments the storage vessel has a screw conveyor located at the discharge opening to facilitate movement of cuttings out of and away from the storage vessel. In one aspect a box is located at a discharge end of the screw conveyor and the box has a lower chamber with a discharge port for connection to a flow line. The box may have a pneumatic fluid inlet (in one aspect, into the lower chamber) for supplying pressurized pneumatic fluid (e.g. air, nitrogen or another inert gas) and a pneumatic fluid inlet may be substantially in line with the discharge port. In certain aspects, the screw conveyor has a second blade or blades near the discharge end of the screw conveyor for breaking up and distributing the drill cuttings. In one particular aspect, the screw conveyor has a plurality of radially extending fingers for breaking up and distributing the drill cuttings.

The base of the storage vessel may be conical, planar, or substantially horizontal. By using a non-conical hopper or vessel in certain embodiments according to the present invention, bridging is inhibited and reduces as compared to bridging that can occur in certain conical vessels. In one aspect, the sliding member(s) is/are substantially flat for sliding over a planar base. In certain aspects the sliding member is rigid.

In certain embodiments a storage vessel according to the present invention is skid mounted. In certain embodiments a storage vessel according to the present invention has a capacity of between five and twenty cubic meters; and, in one aspect between ten and fifteen cubic meters; and in one particular aspect twelve cubic meters. In certain aspects a vessel according to the present invention has a circular base, which, in some embodiments is between 1.5 and 4 meters in diameter, and in one particular embodiment is 2.7 meters in diameter.

In various systems according to the present invention a drill cuttings storage vessel according to the present invention is fed using a blow tank.

In certain embodiments, the present invention provides methods for storing and handling drill cuttings, the method including: receiving drill cuttings in a pressure vessel; applying pneumatic fluid under pressure to the drill cuttings in the pressure vessel; and using a movable member to facilitate movement of the drill cuttings towards a discharge opening in the pressure vessel. In one aspect such a method according to the present invention includes discharging the drill cuttings into a screw conveyor; and, in a particular embodiment, includes discharging the drill cuttings from the screw conveyor into a box, whereupon a pneumatic fluid under pressure is applied to the drill cuttings to move the drill cuttings along a flow line.

In certain aspects of systems according to the present invention, a pump, e.g. a positive displacement pump or a cement pump (or pumps) are used in addition to or in place of blow tank(s) to move the drill cuttings, e.g. from shakers or a ditch or vortex dryer to the storage vessels. The floor area and overall space around shale shakers is often limited and so the storage vessels or skips for containing the drill cuttings are often placed relatively far, e.g. a few hundred feet, from the shale shakers.

Many prior art systems use a cuttings dryer which, when coupled with a pneumatic cuttings conveying system reduces waste volumes and liquid content, leading to an overall reduction in storage volume required and transportation and disposal costs are also reduced. Due to dried cuttings tending more towards lead phase when using a positive pressure pneumatic conveying system, it is important in certain aspects that any change in dryer output is acted upon at the earliest opportunity. It is known to be problematic to convey a product when its consistency is not uniform. To have a storage tank with a mixture of dried cuttings and wet cuttings can require a conveying system to alternate between various modes of flow, between continuous and discontinuous phase flow. The flow regime of cuttings within a pipe does not lend itself to this change as wet cuttings tend towards dense phase with either a shearing type or plug type flow whereby the slugs of cuttings act as a pulsatile regular/irregular moving bed which may fill the entire cross section of pipe; and dried cuttings tend towards suspended flow. The transfer rate is required to be substantially reduced should this "mixture" of modes of flow transfer be required. Reduced transfer rates are not desirable while a vessel is alongside a rig taking on a load. In order to maximize transfer rates, it is beneficial to maintain a cuttings consistency within the storage vessel.

The cuttings discharge from a dryer with a screen may be significantly altered should the screen "blind," hence not allowing the liquid to pass through resulting in a wet discharge. This is known to happen on occasions when a change in drilled formation results in a change of particle size generated at the drill bit.

In certain systems according to the present invention a wetness meter is used to continuously monitor dryer discharge. The wetness meter may be based on the Near Infrared (NIR) principle, where it is known that several molecular bonds absorb infrared light at well defined wavelengths. Common bonds are O—H in water, C—H in organics and oils and N—H in proteins. The light absorbance level at these specific wavelengths is proportional to the quantity of that constituent in the sample material. Infrared filters within the instrument sensor generate a sequence of light pulses, one of these pulses is selected to be at the specific absorbance wavelength for the constituent required to be measured while the other pulses are selected so as to determine the reflectance properties of the material. The light pulses illuminate the sample being measured with the reflected light being collected and focused onto a detector, the electrical signals from the detector are processed into a ratio to provide a value that is proportional to the constituent concentration—this being in percent or other engineering units, water content and oil based mud content can thereby be monitored. This technology is well defined and provides high accuracy and speed of response to facilitate on-line measurement and control of the dryer process.

Alternative methods according to the present invention of obtaining a "wetness" value include passing the product through an open mesh and measuring the pressure drop generated. A rise in pressure drop indicates product adhering to the mesh most likely due to a rise in the "wetness" value. Dielectric constant based instrumentation or vibratory sensitive instrumentation may also be used to monitor change in consistency.

Use of information can minimize the "mixing" of cuttings with storage vessels. In one aspect a dedicated storage tank is used if a desired "wetness" value is exceeded. In one such system a bank of storage vessels are filled with drilled cuttings of a satisfactory consistency and oily if the desired wetness value is exceeded, then the flow is diverted to a "wet" storage tank and an alarm raised such that the operator can then resolve the situation. In another system according to the present invention a screw conveyor being used to feed the conveying system after the dryer may be immediately reversed in order to feed a dedicated "wet" tank. In another system according to the present invention two dryers are used each fitted with a screen with a different mesh size. Should one dryer blind or malfunction resulting in a "wet" cuttings discharge, then the cuttings can be redirected by actuating an appropriate valve below the dryer feed conveyor in order to use the alternative dryer. In another system according to the present invention overall height required is reduced through the use of screw conveyors.

The present invention, in certain aspects, provides a method for moving drilled cuttings from an offshore rig located in water to a boat in the water adjacent said offshore rig, said drilled cuttings laden with drilling fluid, the method including feeding drilled cuttings from a drilling operation to a cuttings processor, the cuttings processor comprising a rotating annular screen apparatus, processing the drilled cuttings with the cuttings processor producing processed drilled cuttings and secondary material, the secondary material including drilled cuttings and drilling fluid, the processed drilled cuttings including drilling fluid, feeding the processed drilled cuttings from the cuttings processor to positive pressure blow tank apparatus, the positive pressure blow tank apparatus having a tank which receives the processed drilled cuttings from the cuttings processor, feeding the secondary material from the cuttings processor to secondary apparatus, and supplying air under pressure to the tank of the positive pressure blow tank apparatus for expelling drilled cuttings from the tank and propelling the drilled cuttings to tertiary apparatus. In one particular aspect the secondary apparatus is decanting centrifuge apparatus, the method further including processing the secondary material with the decanting centrifuge apparatus, producing secondary drilling fluid and secondary drilled cuttings. In one aspect, prior to feeding drilled cuttings from the cuttings processor to the positive pressure blow tank apparatus, the drilled cuttings are fed to mill apparatus to break up agglomerations of the drilled cuttings and then feeding them from the mill apparatus to the positive pressure blow tank apparatus.

In one aspect, in methods wherein the secondary apparatus is decanting centrifuge apparatus, the methods include processing the secondary material with the centrifuge apparatus, producing secondary drilling fluid and secondary drilled cuttings, recycling said secondary drilling fluid for reuse in a drilling operation, feeding said secondary drilled cuttings to a mill apparatus for breaking up agglomerations of said secondary drilled cuttings, feeding secondary drilled cuttings from the mill apparatus to the positive pressure blow tank apparatus; and/or prior to feeding drilled cuttings from the cuttings processor to the positive pressure blow tank apparatus, feeding said drill cuttings to mill apparatus to break up agglomerations of said drilled cuttings and then feeding said drilled cuttings from the mill apparatus to the positive pressure blow tank apparatus.

The present invention, in certain aspects, provides a method for moving drilled cuttings material, the drilled cuttings material including drilled cuttings and drilling fluid, the method includes feeding the drilled cuttings material to cuttings processor apparatus, the cuttings processor apparatus including rotating annular screen apparatus, processing the drilled cuttings material with the cuttings processor producing processed drilled cuttings and secondary material, the secondary material including drilled cuttings and drilling fluid, said processed drilled cuttings including drilling fluid, conveying with fluid under positive pressure processed drilled cuttings from the cuttings processor to flow conduit apparatus, applying air under positive pressure to the flow conduit apparatus to continuously move the processed drilled cuttings therethrough, continuously moving the processed drilled cuttings with the air under pressure to separation apparatus, and with the separation apparatus continuously separating processed drilled cuttings from the air.

The present invention, in certain aspects, provides a system for moving drilled cuttings, the system having movement apparatus for moving drilled cuttings, cuttings processor apparatus for processing the drilled cuttings for feed to tank apparatus, the cuttings processor apparatus including rotating annular screen apparatus, tank apparatus for receiving drilled cuttings from the cuttings processor apparatus, flow conduit apparatus for receiving drilled cuttings from the tank apparatus, pressurized fluid apparatus for applying air under positive pressure to the drilled cuttings and for continuously moving the drilled cuttings through the flow conduit apparatus and to separation apparatus, and separation apparatus for continuously receiving the drilled cuttings through the flow conduit apparatus, the separation apparatus for separating the drilled cuttings from air.

The present invention, in certain aspects, provides a method of conveying a paste, the paste including drilled cuttings laden with fluid, the method including feeding the paste to a cuttings processor, the cuttings processor comprising a rotating annular screen apparatus, reducing the weight of said paste with the cuttings processor by removing fluid from the paste, the cuttings processor producing produced material that includes drilled cuttings and fluid, feeding the produced material from the cuttings processor into a vessel, applying a compressed gas to the vessel to cause the produced material to flow out of the vessel, the vessel including a conical hopper portion which, at least during discharge of the produced material, forms the lower section of the vessel and the cone angle is below a critical value required to achieve mass flow of the produced material.

The present invention, in certain aspects, provides systems and methods for moving material that has a low slurry density, (e.g. with a specific gravity between 2.3 and 4.0 and, in one aspect, about 2.7 or lower) and a high particle density, (e.g. 2 lbs/gallon-4 lbs/gallon or higher) with a positive pressure pneumatic fluid, e.g. air or steam. In other aspects the cuttings to be treated, e.g. from shale shakers, have a specific gravity of 1.8 (1800 kg/m$^3$; 15 lbs/gallon) and certain high density cuttings have a specific gravity of 2.5 (21 lbs/gallon). In one particular aspect the material is a slurry that includes drilled cuttings from a wellbore, well drilling fluids, drilling muds, water, oil, and/or emulsions with the cuttings present as varying weight percents of the slurry. "Slurry density" refers to material from a well in an air flow and "particle density" refers to the material prior to its inclusion in an air flow.

In certain aspects systems and methods according to the present invention provide the continuous or almost-continuous transport of material.

In certain particular embodiments the present invention provides systems with storage facilities for solids to be moved and apparatus for mixing heavy solids to be transported with a pneumatic fluid, e.g., but not limited to, air or steam, at a positive pressure, i.e. above atmospheric pressure. In one aspect the velocity of moving solids is reduced using, e.g., a separator apparatus, and then the solids are collected in collection apparatus (e.g. tanks, boxes, storage containers). In certain aspects self-unloading tanks are used that have a positive pressure solids removal system. Such tanks may have systems for measuring the amount of solids in the tanks and providing an indication of this amount.

In one aspect the present invention provides apparatus for reduces the density of a slurry of material. Such apparatus includes decelerator/separator apparatus.

In particular embodiments in a method according to the present invention drilled cuttings are collected from a drilling rig (in one aspect, as they are produced) and then moved using positive pressure air and then flowed into a slurry expansion chamber apparatus which reduces the density of the incoming material. The slurry is then transported through conduit(s), e.g. at about 150 mph, 200 mph, 250 mph, or higher to separator apparatus that separates solids in the slurry from the air. The separated solids can be stored, shipped, or moved to other apparatus for further processing. In one such method about thirty-five tons per hour of solids are processed. In one aspect a slurry is, by volume, about fifty percent cuttings (plus wet fluid) and about fifty percent pneumatic fluid. In other aspects the cuttings (plus wet fluid) range between two percent to sixty percent of the slurry by volume.

It is, therefore, an object of at least certain preferred embodiments of the present invention to provide:

New, useful, unique, efficient, non-obvious systems and methods for transporting wet solids using positive pressure pneumatic fluid;

Such systems and methods in which the wet solids include drilled cuttings from a wellbore;

Such systems and methods which provide selective transport of drill cuttings; and Such systems and methods which provide for the continuous or almost-continuous transport of low slurry density, high particle density material; and New, useful, unique, efficient and nonobvious apparatuses and devices useful in such systems and methods.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE SEVERAL VIEWS OF THE DRAWING

A more particular description of certain embodiments of the invention may be had by references to the embodiments which are shown in the drawings which form a part of this specification.

FIG. 1 is a schematic view of a system or parts thereof according to the present invention.

FIG. 2 is a schematic view of a system or parts thereof according to the present invention.

FIG. 3 is a schematic view of a system or parts thereof according to the present invention.

FIG. 3A is a side view in cross-section of a feeding vessel in accordance with the present invention which may be used in place of the feeding vessel shown in use in the apparatus shown in FIG. 2.

FIG. 3B is an end view of the feeding vessel shown in FIG. 3.

FIG. 4 is a schematic view of part of a system according to the present invention.

FIG. 4A is a schematic view of part of a system according to the present invention.

FIG. 4B is a schematic view of part of a system according to the present invention.

FIG. 7 is a side cross-section views of slurry expansion chamber apparatus according to the present invention.

FIG. 8 is a side cross-section view of slurry expansion chamber apparatus according to the present invention.

FIG. 9 is a side schematic view of a separator according to the present invention.

FIG. 10 is a schematic view of a system according to the present invention.

FIG. 11 is a schematic view of a system according to the present invention.

FIG. 13C is an alternative embodiment of the storage vessel of FIG. 13A.

FIG. 15B is a side cross-section view of a tank for use in a system as in FIG. 14.

FIG. 15C is a side view of the tank of FIG. 15B.

FIG. 15D is a rear view of the tank of FIG. 15B.

FIG. 19A is a top cutaway view of a vessel system according to the present invention.

FIG. 19B is a top cutaway view of a vessel system according to the present invention.

FIG. 19C is a top cutaway view of a vessel system according to the present invention.

DETAILED DESCRIPTION OF THE INVENTION

Figure 5:
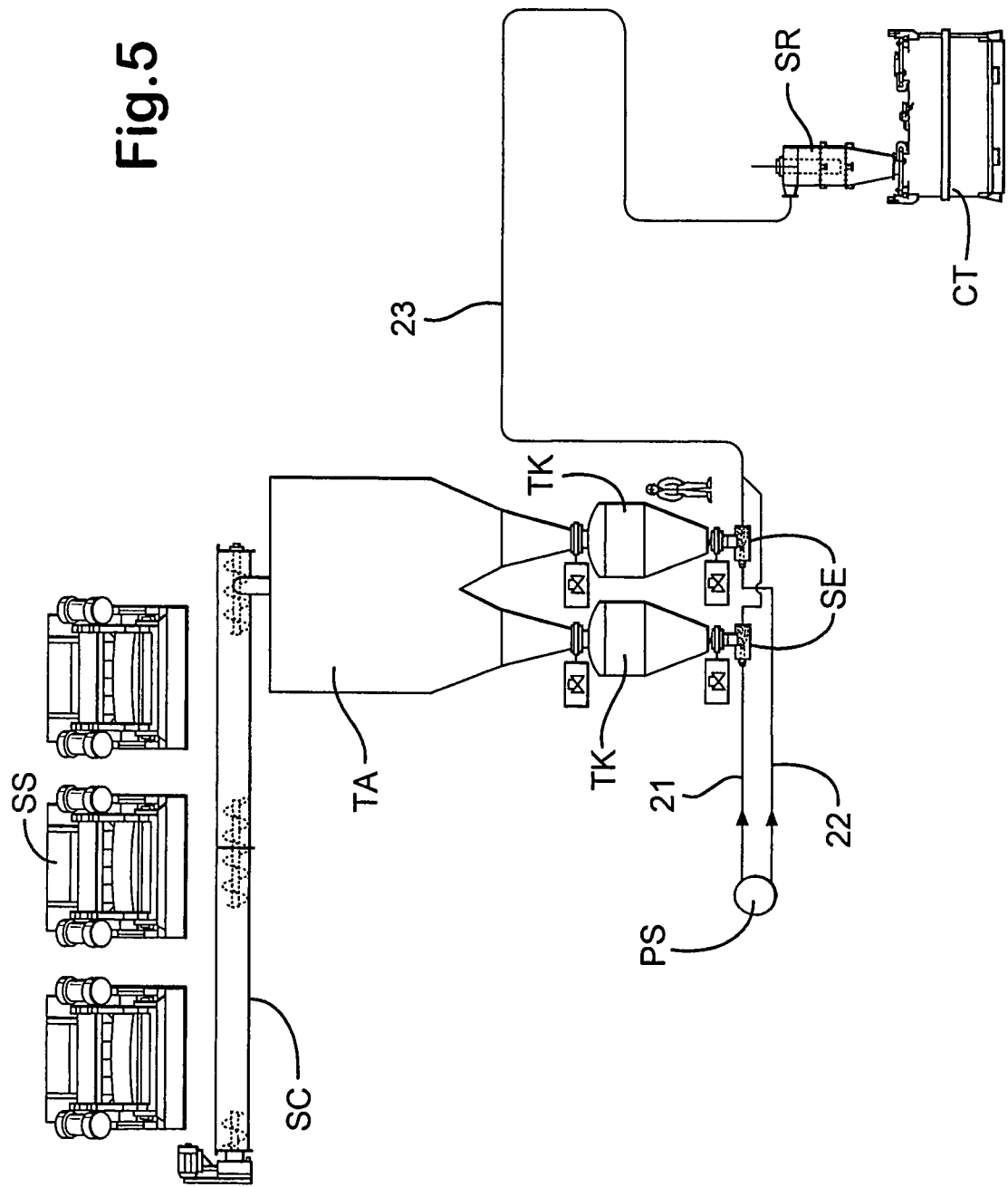
FIG. 5 is a schematic view of a system or parts thereof according to the present invention.
Figure 6A:
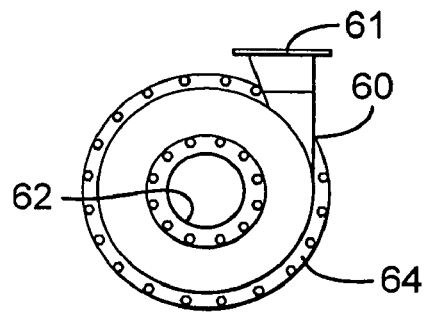
FIG. 6A is a top view of an air/solids separator according to the present invention.
Figure 6B:
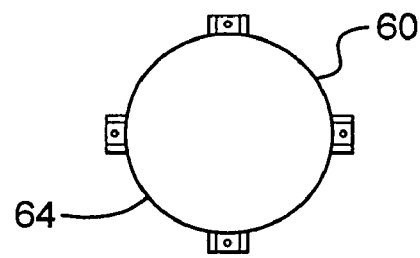
FIG. 6B is a cross-section view of the separator of FIG. 6A.
Figure 6C:
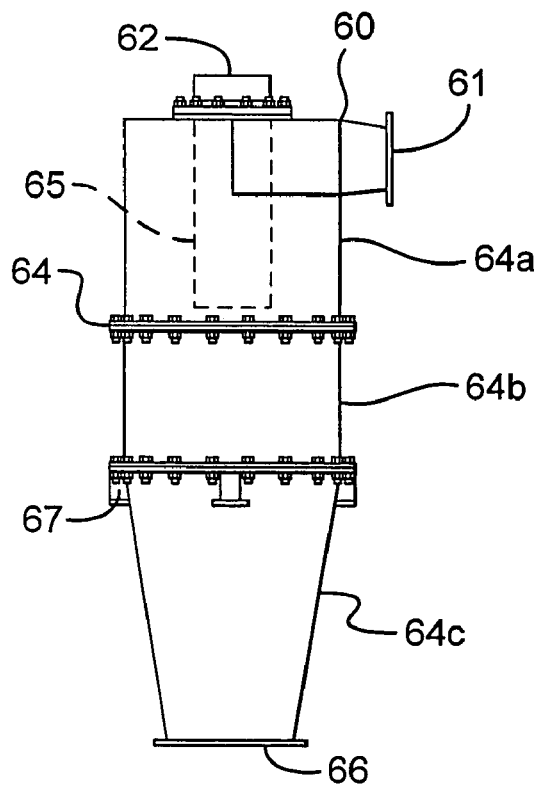
FIG. 6C is a side view of the separator of FIG. 6A.
Figure 6D:
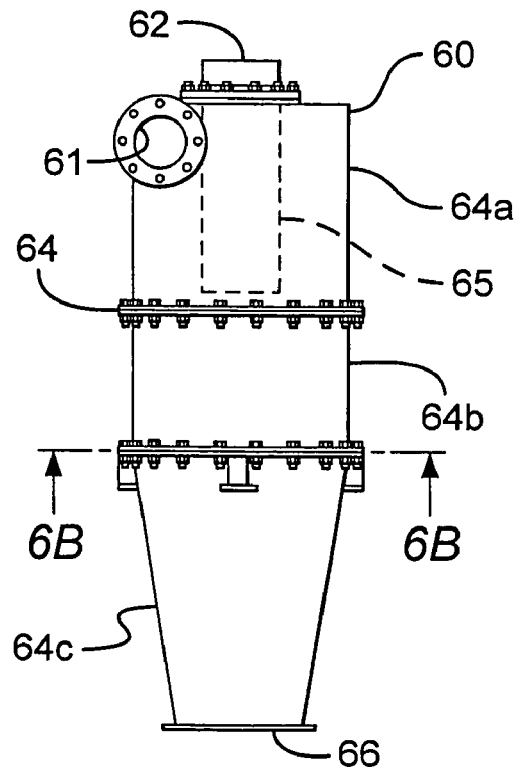
FIG. 6D is a front view of the separator of FIG. 6A.

FIG. 1 shows a system 10 according to the present invention which has one or more (three shown) shale shakers SS mounted on an offshore rig RG. The shale shakers process drilling fluid having drilling solids, drilled cuttings, debris, etc. entrained therein. Separated solids and/or cuttings (with minimal liquid) exit the shale shakers S and are fed to a conveyor SC (or to any other suitable cuttings movement apparatus or device) which moves the separated solids to a feed opening TO of a tank TA.

Solids from the tank TA are pumped, optionally, by one or more pumps PP (two shown) in a line 16 and, optionally, to and through collection devices; e.g. optional cuttings boxes CB are shown in FIG. 1. Pressurized air from a pressurized air source flows to slurry expansion chambers SE in which the density of the solids pumped from the tank TA is reduced. In one particular embodiment air is provided at about 3000 cubic feet per minute to 6000 cubic feet per minute (or about 400 to 800 ACFM (actual cubic feet per minute at 100 p.s.i.) air pressure in a line 16 ranges between 15 and 40 p.s.i.; and, preferably, the solids density is relatively low, e.g. between 1 and 2 pounds per gallon of fluid flowing in the line 16. The solids are impelled from the slurry expansion chambers SE by the pressurized air into lines 12 and 14 that flow into the line 16. Desirably, one such system will process 20 to 40 tons of material per hour. Preferably solids, cuttings, etc. flow continuously in the line 16 to storage tanks on a boat BT.

Floats FT may be used with the line 16 and tether/disconnect apparatus TD provides selective and releasable connection of the line 16 to corresponding flow lines 18 and 19 of the storage tank systems ST. Optionally, air/solids separators AS may be used to remove air from the incoming fluid and/or to concentrate the solids therein. Air escapes from the systems ST via gas outlets GO and solids exiting the systems ST flow directly to a dock/shipping facility or are collected in containers on the boat BT. The line 16 and/or tether/disconnect apparatus TD may be supported by a crane CR on the rig RG. It is also within the scope of this invention for its systems and methods to be used on land.

In one particular aspect the systems ST employ self-unloading storage tanks which have one or more air inlets on their sides with pressurized air flow lines connected thereto to prevent wet solids build upon the tanks internal walls and interior surfaces and to facilitate solids movement from the tanks. Optional air assist devices AD through which air under pressure is introduced into the line 16 may be used on the line 16 to facilitate solids flow therethrough.

FIG. 2 shows a system 20 according to the present invention, like the system 10 (like numerals and letters indicate like parts), but with tanks TK receiving solids from the tank TA. The solids flow by gravity into the tanks TK. Alternatively, or in addition to gravity flow, the solids may be moved by suitable conveyor apparatus, screw conveyor(s), belt movement apparatus, etc. Valves VL selectively control flow into the tanks TK and valves VV selectively control flow from the tanks TK into flow lines 21, 22. Pressurized air from a pressurized air source PS forces the solids from lines 21, 22 into a line 23 (like the line 16, FIG. 1).

FIG. 3 shows a system 30 according to the present invention, in which some parts and apparatuses are like those of the systems 10 and 20 (like numerals and letters indicate like apparatuses and items). Material flows in the line 23 to a separator SR from which solids flow to a tank TC of a system TN. Gas (primarily if not wholly air) flows out from an opening OP of the separator SR. Pumps PM (one, two, or more) (e.g. cement pumps or progressive cavity pumps) pump solids from the tank TC in lines 31, 32 and 33 to a vortex dryer VD. In certain aspects only one of the pumps PM is operational at any given time. One, two or more tanks TC may be used. Separated solids exit from the bottom of the vortex dryer VD. In one particular aspect the cuttings coming out of the bottom of the vortex dryer are about 95% dry, i.e., 5% by weight of the solids exit stream is oil, drilling fluid, etc. In certain aspects the systems 20 and 30 achieve continuous flow of 20 to 40 tons of solids per hour. An ultrasonic meter UM indicates the depth of solids in the tank TC and tank sensors TS measure the weight of solids therein. FIG. 3A shows a system 30a, like the system 30, FIG. 3 (like numerals indicate like parts); but the vortex dryer VD is replaced by a cuttings processor 30b (like the cuttings processor 110, FIG. 10, described below).

FIG. 4 shows a system 40 according to the present invention which has some apparatuses and items like the systems 10, 20 and 30 (and like numerals and letters indicate like apparatuses and items). The separator SR separates solids from air in the line and feeds them primarily via gravity (optionally with a pressurized air assist) to one or more cuttings boxes CT. Air may be vented from opening(s) in the box CT. According to the present invention a separator SR can be a separate apparatus interconnected with a tank or box in fluid communication therewith or it can be built into a tank or box as are integral part thereof. In one particular aspect the cuttings box CT is a commercially available Brandt FD-25 (Trademark) Cuttings Box. FIG. 4A illustrates that the separator SR can be replaced with a cuttings processor CP (like the cuttings processor 110, FIG. 10, described below) that feeds processed cuttings to the box CT and that any separator SR in any system herein can be so replaced.

FIG. 4B illustrates that any tank TA in any system herein can be fed with cuttings from a cuttings processor CQ (like the cuttings processor 110, FIG. 10, described above).

FIG. 5 shows a system 50, like the system 20 (like numerals and letters indicate like apparatuses and items), but with material fed in the line 23 to a separator SR on a cuttings box CT.

FIGS. 6A-6D show one embodiment of a separator 60 according to the present invention which may be used as the separator SR, above. A top 64a, mid section 64b and lower section 64c are bolted together to form a housing 64. Material is fed into the top section 64a through a feed inlet 61 that is, preferably, tangent to the diameter. Gas flows out through a top opening 62. Mounted within the housing 64 is a generally cylindrical hollow vortex finder 65. In one particular aspect the diameter of the vortex finder 65 and the diameter of a solids exit opening 66 of the lower section 64c are sized so that the flow from the opening 66 is primarily solids (e.g. between about 80% to 99% solids by weight) and the flow of gas out of the top opening 62 is primarily (99% or more) air; e.g. with a housing 64 that is about 48 inches in height, with a mid section 64b about 24 inches in diameter, the top opening 62 is about 12 inches in diameter and the bottom opening 66 is about 10 inches in diameter. It is within the scope of this invention to provide such an apparatus with dimensions of any desired size.

Mounts 67 facilitate mounting of the separator SR on a tank, rig, boat, or other structure. Any suitable support, e.g. one or more posts 68, may be used.

FIG. 7 shows a slurry expansion chamber apparatus 70 according to the present invention which has a main hollow body 71 with an opening 72. Material M flows through a feed tube 73 (e.g. cuttings, fluid, and material from a wellbore) through the opening 72 into the main hollow body 71. Air under pressure from any suitable pressurized air source is introduced into a feed conduit 74 and then into a nozzle 75. The air mixes with the material M, reduces its density, and propels the reduced-density material R out through an exit opening 76. Optionally the nozzle 75 is deleted and the air flow and/or movement into the expansion chamber reduces the density of the material.

FIG. 8 shows a slurry expansion chamber apparatus 80 according to the present invention which has a main hollow body 81 with an opening 82. Material L flows through a feed tube 83 (e.g. cuttings, fluid and material from a wellbore) through the opening 82 into the body 81. Air under pressure from a pressurized air source is introduced into a feed conduit 84 and then into a nozzle 85. The air mixes with the material L, reduces its density, and propels the reduced-density material T out through an exit opening 86. The apparatus in FIGS. 7 and 8 may be used as the slurry expansion chamber apparatuses in the systems of FIGS. 1-5.

FIG. 9 shows an air/solids separator 90 usable as the separators AS, FIG. 1, mounted on a base 99. A mixture of air and solids is introduced into a tank 91 through a feed conduit 92. Solids flow by gravity to an exit opening 93.

Optionally, a slurry expansion chamber apparatus SE receives the solids and propels them through a pipe 98 to storage, to a collection tank or tanks, or to a cuttings box, on shore, on a rig, or on a boat or barge. Air flows out from a top opening 94.

Optionally the separator 90 may be provided with a motor apparatus 95 (e.g., a gear-box/air-motor-apparatus device) that rotates a screw 97 that inhibits or prevents the bridging of solids within the tank 91. Alternatively or in addition to such motor apparatus, devices like the air assist devices AD described above may be used to inhibit such bridging.

A valve 96 (e.g., an air-operated valve) selectively closes off the opening 93 as desired.

The present invention, therefore, in at least certain embodiments, provides a method for moving drilled cuttings material, the method including conveying with fluid under positive pressure drilled cuttings material to flow conduit apparatus, applying fluid (e.g., air or steam) under positive pressure to the flow conduit apparatus to continuously move the drilled cuttings material therethrough, continuously moving the drilled cuttings material with the fluid under pressure to separation apparatus, and with the separation apparatus continuously separating drilled cuttings from the fluid.

Such a method may also include one or some (in any possible combination) of the following: wherein the drilled cuttings are included in a low density slurry with drilling fluid; wherein the separation apparatus is a cyclone separator and the drilled cuttings moved into the cyclone separator are wet; wherein a flow pipe interconnects the separation apparatus in fluid communication with drying apparatus, the method further including flowing wet drilled cuttings through the flow pipe to the drying apparatus, and drying the wet drilled cuttings with the drying apparatus; flowing the drilled cuttings material to expansion chamber apparatus, and reducing density of the drilled cuttings material in the expansion chamber apparatus; wherein the density of the drilled cuttings material is reduced by flowing air into the material within the expansion chamber apparatus; wherein the air flows into and out through a nozzle within the expansion chamber apparatus; wherein the drilled cuttings flow in a main conduit to the separation apparatus, the main conduit having at least one air movement assistance device, the method further including facilitating movement of the drilled cuttings material through the main conduit with air from the at least one air movement assistance device; moving separated drilled cuttings from the separation apparatus to collection apparatus, the collection apparatus from the group consisting of cuttings box or boxes, tank or tanks, storage device, container or containers, and receptacle(s) on a boat or barge; wherein prior to conveying drilled cuttings material to the flow conduit apparatus the material is fed into tank apparatus, the method further including pumping the material from the tank apparatus into the flow conduit apparatus; wherein the pumping includes pumping the material from the tank apparatus into expansion chamber apparatus and therethrough into the flow conduit apparatus; wherein the tank apparatus includes valve apparatus for selectively controlling flow of the material into the flow conduit apparatus; wherein at least a portion of the flow conduit apparatus is in water and float apparatus is on the flow conduit apparatus, the method further including facilitating floating of at least a portion of the flow conduit apparatus in the water with the float apparatus; wherein the drying apparatus is a vortex dryer; wherein the drilled cuttings material is included within a slurry of material, wherein the slurry has a low slurry density, and wherein upon mixing of the slurry with the fluid under positive pressure a resultant slurry is produced, the resultant slurry having a high particle density; and/or wherein the slurry has a specific gravity between 2.3 and 4.0 and the particle density of the resultant slurry is between 2 pounds/gallon and 4 pounds/gallon.

The present invention, therefore, in at least certain embodiments, provides a method for moving drilled cuttings material, the method including conveying with fluid (e.g., air) under positive pressure drilled cuttings material to flow conduit apparatus, applying air under positive pressure to the flow conduit apparatus to continuously move the drilled cuttings material therethrough, continuously moving the drilled cuttings material with the air under pressure to separation apparatus, with the separation apparatus continuously separating drilled cuttings from the air, wherein the separation apparatus is a cyclone separator and the drilled cuttings moved into the cyclone separator are wet, wherein a flow pipe interconnects the separation apparatus in fluid communication with drying apparatus, flowing wet drilled cuttings through the flow pipe to the drying apparatus, drying said wet drilled cuttings with the drying apparatus, flowing the drilled cuttings material to expansion chamber apparatus, and reducing density of the drilled cuttings material in the expansion chamber apparatus, wherein the density of the drilled cuttings material is reduced by flowing air into said material within the expansion chamber apparatus, moving separated drilled cuttings from the separation apparatus to collection apparatus from the group consisting of cuttings box, tank, storage device, container, and receptacle on a boat, wherein the drilled cuttings material is included within a slurry of material, wherein the slurry has a low slurry density, and wherein upon mixing of the slurry with the fluid under positive pressure a resultant slurry is produced, the resultant slurry having a high particle density, and wherein the slurry has a specific gravity between 2.3 and 4.0 and the particle density of the resultant slurry is between 2 pounds/gallon and 4 pounds/gallon.

The present invention, therefore, in at least certain embodiments, provides a system for moving drilled cuttings, the system having movement apparatus for moving drilled cuttings, tank apparatus into which the movement apparatus can move the drilled cuttings, flow conduit apparatus for receiving the drilled cuttings from the tank apparatus, pressurized fluid apparatus for applying air under positive pressure to the drilled cuttings and for continuously moving the drilled cuttings through the flow conduit apparatus and to separation apparatus, and separation apparatus for continuously receiving the drilled cuttings through the flow conduit apparatus, the separation apparatus for separating the drilled cuttings from air; and such a system wherein the drilled cuttings are wet and the system further has drying apparatus for drying the drilled cuttings.

FIG. 10 shows a system 100 according to the present invention which has shale shakers SS (e.g. as in FIG. 1) whose processed solids, drilled cuttings, etc. are fed by a conveyor SC (as in FIG. 1) to a cuttings processor 110 which is a rotating annular screen apparatus, which, optionally is formed in a conical shape, e.g., as disclosed in U.K. Patent Application GB 2,297,702 A published Aug. 14, 1996 (incorporated fully herein for all purposes). (Commercially available embodiments of such annular screen apparatus are available from Don valley Engineering Company Limited, including, but not limited to, its models MUD 8 and MUD 10.) A method using one such annular screen apparatus includes applying a mixture with drill cuttings and drilling fluid to the inner surface of an annular filter screen, rotating the annular filter screen, the annular screen having a plurality of apertures, the apertures being of a size such that the drilling fluid can pass through the apertures but drill cuttings with oil are substantially prevented from passing through the apertures. The cuttings processor 110 significantly reduces the amount of fluid in the drilled cuttings; e.g., in one particular embodiment from about 15% to 20% fluid by weight in the drilled cuttings to about 1% to 3% therein. In one particular aspect the cuttings processor 110 and others herein like it fit within a 1 meter cube; hence they take up minimal space on a rig or on a boat.

The treated drilled cuttings are then introduced into a hopper 112 from which they flow into a blow tank 120. A valve 113 selectively controls flow from the hopper 112 to the blow tank 120. Air under pressure, e.g. at least 75 psi (in one aspect between 75 and 150 psi and in one aspect about 125 psi), flows into the blow tank 120 in a line 114 from a positive pressure air source 115. In one aspect, all of the items SS, SC, 110, 112, 120, 114 and 115 and their associated lines, valves and controls are all located on a drilling rig, in one aspect an offshore drilling rig. The blow tank 120 may be like the tanks TK and their associated apparatus, FIG. 2 or FIG. 3.

In the offshore drilling rig situation, as shown in FIG. 10, processed drill cuttings are fed from the blow tank 120 (with the valve 135 open), with a valve 123 closed, and a valve 122 and 136 open, and with a valve 142 closed, in a line 121 to a cuttings box CB (like those described above) on a ship 116 in the water adjacent the offshore rig. Optionally with valve 36 closed and valve 124 open, the drilled cuttings are fed to a blow tank 127 from which they can be fed to any suitable on-ship or off-ship storage device or processing apparatus. A pressurized air source 141 on the ship provides air under pressure to the blow tank 127.

Optionally either or both of the cuttings box CB or the blow tank 127 can be fed with drilled cuttings processed by a cuttings processor 130 or 140, respectively, as indicated by the dotted lines in FIG. 10. In one aspect with the valve 122 closed and a valve 142 open, drilled cuttings are fed from the blow tank 120 in a line 125 to a cuttings processor 130 (like the cuttings processor 110) and processed cuttings are fed in a line 126 to the cuttings box CB. In one aspect with the appropriate valves open and the appropriate valves closed, including a valve 124 closed, drilled cuttings are fed in a line 128 from the blow tank 120 to a cuttings processor 140 (like the cuttings processor 110) and processed cuttings are fed in a line 129 to the blow tank 127. A valve 132 selectively controls the flow of drilled cuttings from the blow tank 127. In one aspect drilled cuttings from the blow tank 127 are fed in a line 131 to a cuttings processor 150 (like the cuttings processor 110) and processed cuttings flow in a line 133 from the cuttings processor 150 (e.g. to a cuttings box, to other storage apparatus, or to off-ship storage or processing.

In one particular embodiment of a system as described in FIG. 10 above, drilled cuttings conveyed to the cuttings processor 110 have 15% to 20% fluid by weight and drilled cuttings fed from the cuttings processor 110 to the hopper 112 have 1% to 3% fluid by weight. As desired any number of positive pressure air assist devices 146 can be used on the line 121. In one particular embodiment for about 1 cubic meter of total material fed to the cuttings processor 110, about 0.5 cubic meter is received by the blow tank 120.

It is to be understood that the cuttings processors used in certain embodiments of the present invention (like the processor 110 and those like it) receive material that includes drilled cuttings and recoverable drilling fluid. The cuttings processor produces primary drilled cuttings whose drilling fluid component is much less by weight than the fluid-laden material in the initial feed. As shown in FIG. 3B primary drilled cuttings from the processor 110 are, in one particular embodiment, fed to mill apparatus 170 to break up agglomerated masses of drilled cuttings. The mill apparatus, in one aspect, is a pug mill. The mill apparatus 170 produces drilled cuttings with some fluid therein which are fed in a line 171 to the blow tank 120. The processor 110 also produces a secondary stream 172 that contains drilling fluid and some drilled cuttings. The stream 172, in one aspect, is fed to further processing apparatus which, in one aspect, is one or more decanting centrifuges, e.g. decanting centrifuge apparatus 173, which produces recyclable drilling fluid that exits in a line 174 and drilled cuttings 175 with some drilling fluid therein. The drilling fluid 174 is fed back into a rig mud system for re-use in a drilling operation. The drilled cuttings 175, which may be in the form of a paste, are, in one aspect, fed to the mill apparatus 170; or are fed to the blow tank 120 without milling (shown by dotted line, FIG. 3B). Any system herein may employ mill apparatus 170 and/or further processing apparatus like the apparatus 173.

As shown in FIG. 3B, to measure the amount of material within the blow tank 120 and the amount fed to and within the cuttings box CB, load cell apparatus 176 is used on the blow tank 120 and the cuttings box CB which can provide continuous monitoring of the weight of material in these apparatuses; and, optionally, ultrasonic level probes 177 monitor the level of material in these apparatuses. Optionally, timer apparatus 178 monitors the time of flow into the blow tank 120.

FIG. 11 shows a system 200 according to the present invention which is an improvement of systems disclosed in European Patent EP 1,187,783 B1 granted Sep. 24, 2003 (incorporated fully herein for all purposes). An offshore oil rig 201 has located on a platform 203 a pressure vessel 205 into which is loaded screened drill cuttings arising from a drilling process. The pressure vessel 205 includes an upper material inlet and a lower material outlet as well as apparatus for supplying compressed air to the interior of the vessel. The material inlet includes a valve assembly and the entire vessel may be similar to that manufactured and sold by Clyde Materials Handling Limited. Initially, drilled cuttings are fed to a cuttings processor 210 (like the processor 110, FIG. 10) and the cuttings processed by the cuttings processor 210 are fed to the pressure vessel 205. The material from the processor 210 may be a free-flowing or a non-free flowing paste depending on how much fluid the cuttings processor 210 removes.

The pneumatic conveying system, including the pressure vessel 205, follows a cycle of filling and discharging material from the pressure vessel. At the start of the cycle, the material inlet valve is closed. A vent valve is opened to equalize vessel pressure to ambient air. The inlet valve is opened and the oil cuttings/oil mixture is fed into the pressurized vessel. The vent valve is opened to vent displaced air from the vessel. When the pressurized vessel if full, the inlet valve closes. The vent valve also closes and the vessel is now sealed. An air inlet valve is opened and the material is conveyed along a pipe 207 which extends from a position below pressurized vessel 205 to an elevated position above a container assembly 209. Assembly 209 can include three ISO container sized vessels 211 located within a support framework 214. (In other embodiments, the container assembly may include a number of vessels 211 other than three.) Pipe 207 extends above the top of container assembly 209 and has downwardly extending branches leading into the inlets of each of the containers 211.

Each container 211 has a lower conical shaped hopper portion 215 and at the lowermost point of this portion there is a valve inlet 217 whereby the material within the containers 211 may be discharged via pipe 219 to a hose connection pipe 221.

A supply boat 223, fitted with a further container assembly 225, may be brought close to the oil rig 201. A flexible hose 227 is connected to pipe 219 at hose connection pipe 221. At its other end hose 227 is connected to a filling pipe 229 located on boat 223. Filling pipe 229 leads from the rear of boat 223 to a position above container assembly 225 and branch pipes extends downwardly from pipe 229 to the inlets of each of the containers 231 forming part of the containers assembly 225.

Optionally, using appropriate valving and controls (not shown) material in the flexible hose 227 is fed to a cuttings processor 250 (like the cuttings processor 110, FIG. 10) on the boat 223 which then provides processed cuttings to the container assembly 225. Optionally, cuttings from the container assembly 225 are fed to a cuttings processor 252 (like the cuttings processor 110, FIG. 10) from which processed cuttings may be provided to storage or further processing on the boat 223 and/or on shore.

Figure 12:
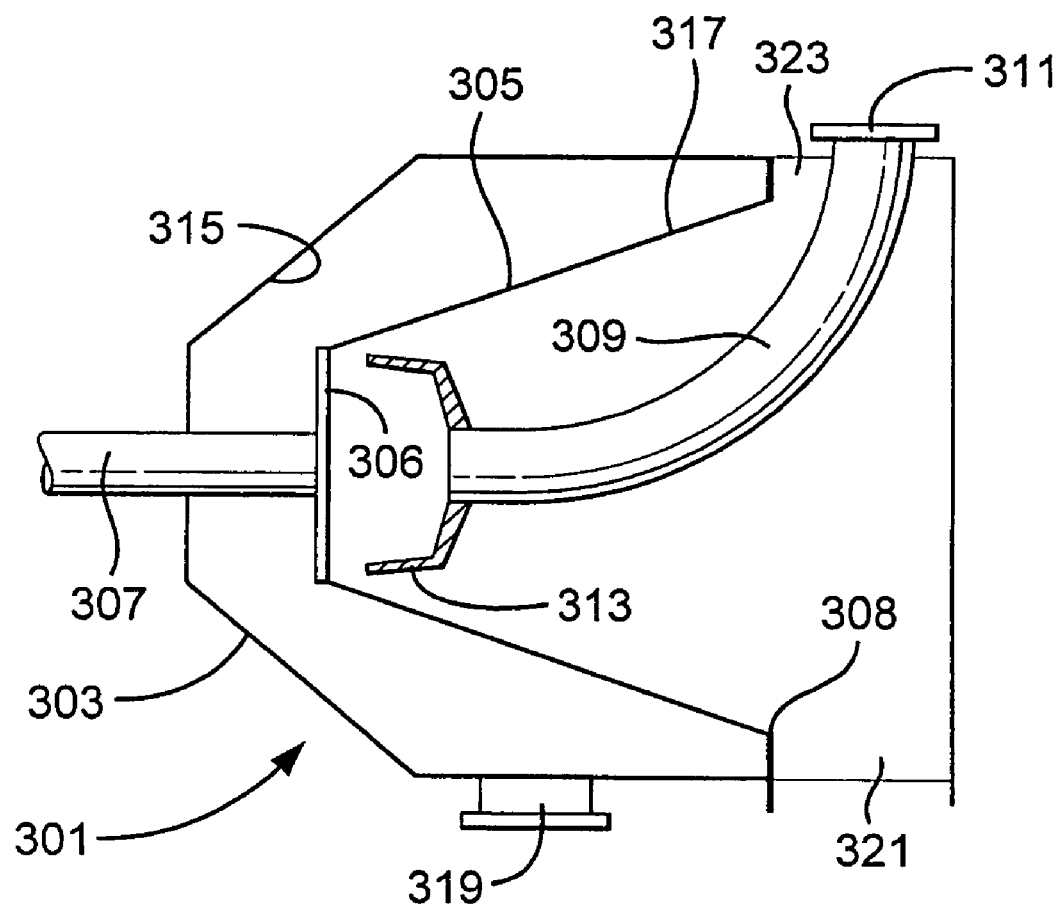
FIG. 12 is a cross-sectional view of a prior art cuttings processor.

FIG. 12 illustrates a prior art rotating annular screen apparatus as disclosed in U.K. Patent Application GB 2,297,702 A published Aug. 14, 1996, which e.g., in certain aspects, can serve as the cuttings processor 110, FIG. 10, and the like cuttings processors mentioned above.

The cuttings processor 301 in FIG. 12 is a vibrating centrifuge for use with the present invention, consisting of an outer body 303, a conical screen 305 having a small radius end 306 and a large radius end 308, a drive shaft 307 for rotating the conical screen 305 and a feed tube 209. The conical screen 305 is rotated by the drive shaft 307 with a centrifugal force acting on the conical screen 305, e.g. a force of between 10 g and 200 g. A linear motion is applied along the longitudinal axis of the drive shaft 307, e.g. with a force per unit mass of up to 5 g and an amplitude of up to 10 mm. As the conical screen 305 is directly coupled to the drive shaft 307, this linear motion is imparted onto the conical screen 305. The angle of the conical screen 305 is critical to the efficiency of the process and can range from 10 degrees to 110 degrees depending on the efficiency required. A mixture of drilling cuttings and oil, e.g., oil in oil based drilling mud, is conveyed into the input port 311, falls down the feed tube 209 and is guided onto the small radius end 306 of the conical screen 305 by a feed tube guide 313. The vibrating centrifuge separates the drilling mud from the drilling cuttings by the combination of the centrifugal force supplied by the rotating conical screen 305, the linear motion imparted on the conical screen 305 and the angle of the conical screen 305.

As the mixture of drilling mud and drilling cuttings are conveyed onto the rotating conical screen 305, the centrifugal force forces the drilling mud to migrate through apertures in the conical screen 305. However, the apertures are of a size such that the drilling cuttings are too large to migrate through the apertures in the conical screen 305, and hence are retained on an inside surface 315 of the conical screen 301. The linear motion, which is produced by the drive assembly of the vibrating centrifuge, conveys the retained drilling cuttings towards the large radius end 308 of the conical screen 305. Because of the conical form of the screen 305, as the drilling cuttings are conveyed towards the large radius end 308 of the conical screen 305, the force per unit mass acting on the drilling cuttings increases and so further removing any remaining residual oil based drilling mud from the drilling cuttings. The recovered drilling mud flows off the outside surface 317 of the conical screen 305 and exits the outer body 303 through recovered mud exit pipe 319. After the drilling cuttings have been conveyed along the length of the conical screen 305 and passed through the large radius end 308, the drilling cuttings exit the outer body 303 through dry drilling cutting exit ports 321, 323. In one particular aspect, the level of oil retained on the drilling cuttings after the cuttings have been ejected from the vibration centrifuge is reduced to between 0.015 kg and 0.04 kg of oil per kilogram of drilling cuttings.

The present invention, therefore, in at least certain embodiments, provides a method for moving drilled cuttings from an offshore rig located in water to a boat in the water adjacent said offshore rig, said drilled cuttings laden with drilling fluid, said method including feeding drilled cuttings from a drilling operation to a cuttings processor, said cuttings processor comprising a rotating annular screen apparatus; processing the drilled cuttings with the cuttings processor producing processed drilled cuttings and secondary material, the secondary material including drilled cuttings and drilling fluid, said processed drilled cuttings including drilling fluid; feeding the processed drilled cuttings from the cuttings processor to positive pressure blow tank apparatus, said positive pressure blow tank apparatus having a tank which receives said processed drilled cuttings from said cuttings processor; feeding the secondary material from the cuttings processor to secondary apparatus, and supplying air under pressure to the tank of the positive pressure blow tank apparatus for expelling drilled cuttings from said tank and propelling said drilled cuttings to tertiary apparatus. Such a method may include one or some, in any possible combination, of the following: wherein the tertiary apparatus is storage apparatus; wherein the tertiary apparatus includes a secondary positive pressure blow tank apparatus for facilitating movement of drilled cuttings from the storage apparatus; wherein drilled cuttings from the positive pressure blow tank apparatus are fed in a line to the tertiary apparatus, the line having at least one positive pressure air assist device for facilitating movement of drilled cuttings through the line, the method further include facilitating drilled cuttings movement through the line with the at least one positive pressure air assist device; wherein the cuttings processor reduces the weight of drilled cuttings processed by removing drilling fluid from said drilled cuttings, said removed drilling fluid not fed to said positive pressure blow tank apparatus; reducing a load on the positive pressure blow tank apparatus and on the tertiary apparatus by removing drilling fluid from said drilled cuttings with said cuttings processor; wherein the secondary apparatus is decanting centrifuge apparatus, the method further including processing the secondary material with the decanting centrifuge apparatus, producing secondary drilling fluid and secondary drilled cuttings; recycling said secondary drilling fluid for reuse in a drilling operation; feeding said secondary drilled cuttings to mill apparatus for breaking up agglomerations of said secondary drilled cuttings, and feeding secondary drilled cuttings from the mill apparatus to the positive pressure blow tank apparatus; and/or prior to feeding drilled cuttings from the cuttings processor to the positive pressure blow tank apparatus, feeding said drilled cuttings to mill apparatus to break up agglomerations of said drilled cuttings and then feeding said drilled cuttings from the mill apparatus to the positive pressure blow tank apparatus.

The present invention, therefore, in at least certain embodiments, provides a method for moving drilled cuttings from an offshore rig located in water to another location, in one aspect to a boat in the water adjacent said offshore rig, said drilled cuttings laden with drilling fluid, said method including feeding drilled cuttings from a drilling operation to a cuttings processor, the drilled cuttings laden with drilling fluid, said cuttings processor comprising a rotating annular screen apparatus, processing the drilled cuttings with the cuttings processor producing processed drilled cuttings and secondary material, the secondary material including drilling fluid and drilled cuttings, said processed drilled cuttings including drilling fluid, feeding processed drilled cuttings from the cuttings processor to positive pressure blow tank apparatus, said positive pressure blow tank apparatus having a tank which receives said processed drilled cuttings from said cuttings processor, supplying air under pressure to the tank of the positive pressure blow tank apparatus for expelling processed drilled cuttings from said tank and propelling said processed drilled cuttings to tertiary apparatus, wherein drilled cuttings from the positive pressure blow tank apparatus are fed in a line to the tertiary apparatus, the line having at least one positive pressure air assist device for facilitating movement of drilled cuttings through the line, the method further including facilitating drilled cuttings movement through the line with the at least one positive pressure air assist device, wherein the cuttings processor reduces the weight of drilled cuttings processed thereby by removing drilling fluid from said drilled cuttings, said drilling fluid not fed to said positive pressure blow tank apparatus, and thereby reducing a load on the positive pressure blow tank apparatus and on the further apparatus. Such a method may include the following: wherein the secondary apparatus is decanting centrifuge apparatus, the method further including processing the secondary material with the decanting centrifuge apparatus, producing secondary drilling fluid and secondary drilled cuttings, recycling said secondary drilling fluid for reuse in a drilling operation, feeding said secondary drilled cuttings to a mill apparatus for breaking up agglomerations of said secondary drilled cuttings, feeding secondary drilled cuttings from the mill apparatus to the positive pressure blow tank apparatus, and prior to feeding drilled cuttings from the cuttings processor to the positive pressure blow tank apparatus, feeding said drill cuttings to mill apparatus to break up agglomerations of said drilled cuttings and then feeding said drilled cuttings from the mill apparatus to the positive pressure blow tank apparatus.

The present invention, therefore, in at least certain embodiments, provides a method for moving drilled cuttings material, the drilled cuttings material including drilled cuttings and drilling fluid, the method including feeding the drilled cuttings material to cuttings processor apparatus, the cuttings processor apparatus having rotating annular screen apparatus, processing the drilled cuttings material with the cuttings processor producing processed drilled cuttings and secondary material, the secondary material including drilled cuttings and drilling fluid, said processed drilled cuttings including drilling fluid, conveying with fluid under positive pressure processed drilled cuttings from the cuttings processor to flow conduit apparatus, applying air under positive pressure to the flow conduit apparatus to continuously move the processed drilled cuttings therethrough, continuously moving the processed drilled cuttings with the air under pressure to separation apparatus, and with the separation apparatus continuously separating processed drilled cuttings from the air. Such a method may include one or some, in any possible combination, of the following: flowing the processed drilled cuttings to expansion chamber apparatus, and reducing density of the processed drilled cuttings in the expansion chamber apparatus; wherein the density of the drilled cuttings material is reduced by flowing air into said material within the expansion chamber apparatus; moving separated drilled cuttings from the separation apparatus to further apparatus from the group consisting of cuttings box, tank, storage device, container, receptacle on a boat, decanting centrifuge apparatus, and secondary rotating annular screen apparatus; wherein the drilled cuttings material is included within a slurry of material, wherein the slurry has a low slurry density, and wherein upon mixing of the slurry with the fluid under positive pressure a resultant slurry is produced, the resultant slurry having a high particle density; and/or wherein the slurry has a specific gravity between 2.3 and 4.0 and the particle density of the resultant slurry is between 2 pounds/gallon and 4 pounds/gallon.

The present invention, therefore, in at least certain embodiments, provides a system for moving drilled cuttings, the system including movement apparatus for moving drilled cuttings, cuttings processor apparatus for receiving drilled cuttings from the movement apparatus and for processing the drilled cuttings for feed to tank apparatus, the cuttings processor apparatus including rotating annular screen apparatus, tank apparatus for receiving drilled cuttings from the cuttings processor apparatus, flow conduit apparatus for receiving drilled cuttings from the tank apparatus, pressurized fluid apparatus for applying air under positive pressure to the drilled cuttings and for continuously moving the drilled cuttings through the flow conduit apparatus and to separation apparatus, and separation apparatus for continuously receiving the drilled cuttings through the flow conduit apparatus, the separation apparatus for separating the drilled cuttings from air.

The present invention, therefore, in at least certain embodiments, provides a method of conveying a paste, the paste including drilled cuttings laden with fluid, the method including feeding the paste to a cuttings processor, the cuttings processor comprising a rotating annular screen apparatus, reducing the weight of said paste with the cuttings processor by removing fluid from the paste, the cuttings processor producing produced material that includes drilled cuttings and fluid, feeding the produced material from the cuttings processor into a vessel, applying a compressed gas to the vessel to cause the produced material to flow out of the vessel, the vessel including a conical hopper portion which, at least during discharge of the produced material, forms the lower section of the vessel and the cone angle is below a critical value required to achieve mass flow of the produced material. In such a method the paste may be a free-flowing paste or a non-free-flowing paste; such a method may be accomplished on a rig or on a boat or partially on a rig and partially on a boat; and/or such a method may include feeding processed drilling cuttings processed by said method to a boat in water adjacent said offshore rig, said drilling cuttings having less drilling fluid therein by weight than the drilling cuttings initially fed to the cuttings processor; and in such a method fluid content of said processed drilling cuttings is at least 500% less by weight than fluid content of the drilled cuttings fed to the cuttings processor.

Figure 13A:
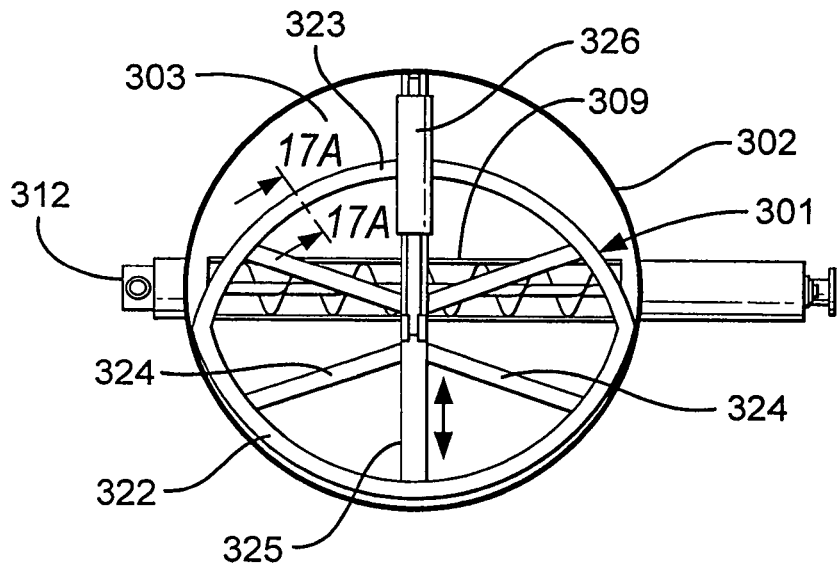
FIG. 13A is a top view in cross-section of a storage vessel according to the present invention for use in methods according to the present invention.
Figure 13B:
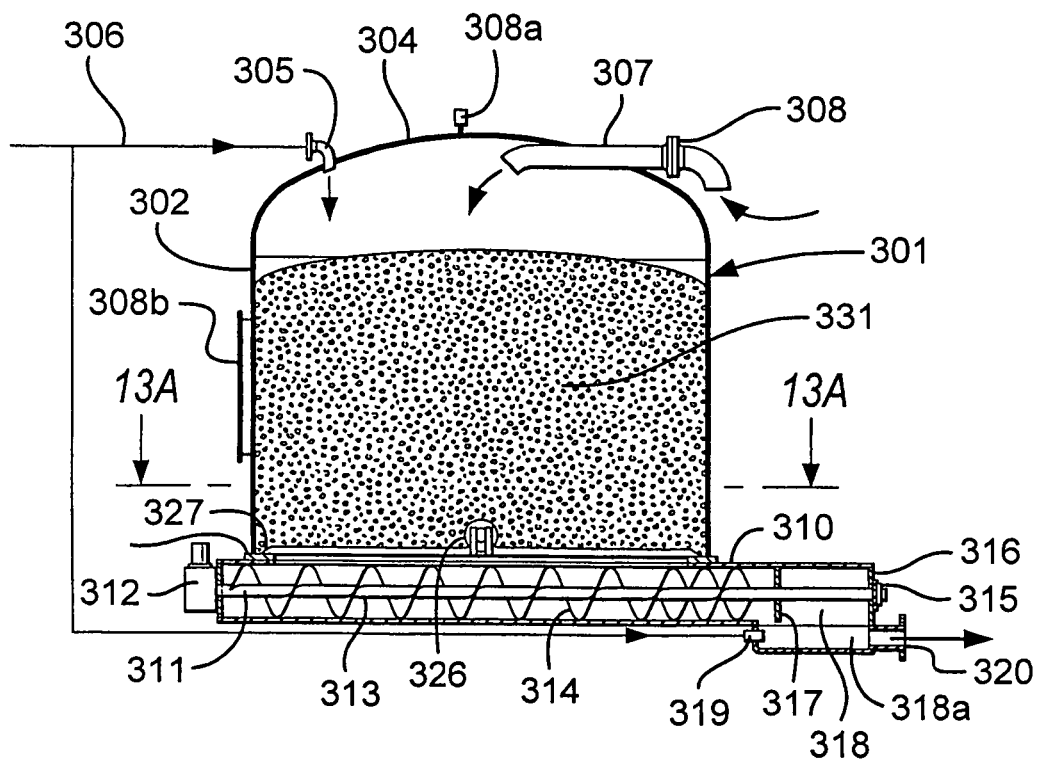
FIG. 13B is a side cross-section view of the storage vessel of FIG. 13A.

Referring to FIGS. 13A and 13B, a storage vessel 301 according to the present invention has a generally cylindrical pressure vessel 302 of circular cross-section with a substantially circular planar base 3 and a domed cap 4. The planar base 303 and the domed cap 304 may be formed integrally or be welded to the wall of the pressure vessel 302.

The pressure vessel 302 may be made of steel of the type defined by British Standard 1501 224-49B and may be designed to withstand a working pressure of between 1 and 20 Bar, and in one particular aspect 7 Bar. The domed cap 304 has, optionally, an inlet 305 with a supply hose 306 attached thereto [which in one particular aspect has a 52 mm (two inch) diameter] for applying compressed gas (e.g. air and/or nitrogen and/or another inert gas to the vessel to facilitate the movement of drilling cuttings from the vessel. Alternatively, cuttings may be introduced to the inlet 305 by any known system, e.g. but not limited to, a conveyor system. The domed cap 304 is also provided with a cuttings inlet 307 provided with a valve 308 (e.g. a gate valve or a full bore ball valve, which may be manually operable or operable remotely, e.g. using a stepper motor.

The cuttings inlet 307, in one particular aspect, has an internal diameter of 125 mm (5 inches). The planar base 303 has an opening 309. The opening 309 may be any suitable shape as viewed from above and, as shown, is generally rectangular. A tube 310 has an opening corresponding to and fixed to the perimeter of the opening 309 in the planar base 304 to form a pressure tight seal. The tube 310 may be welded or otherwise formed with the planar base 304. The tube 310 houses an optional auger apparatus which, in one aspect, is a screw conveyor 311 rotatably mounted in the tube 310 and driven by a variable speed hydraulic motor 312.

The motor may alternatively be an electrical, petrol drive, pneumatic or otherwise powered motor. The screw conveyor has a shaft 313 and a helical blade 314. The helical blade 314 has, in one aspect, a diameter of between 150 mm and 600 mm (6 and 24 inches), and in one particular aspect has a diameter of between 350 mm and 400 mm (fourteen and sixteen inches). The shaft 313 has a first end coupled to the variable speed hydraulic motor 312 and a second end rotatably arranged in a bearing 315 in an end wall 316 of the tube 310. The tube 310 extends beyond the perimeter of the planar base 304. The helical blade 314 extends along substantially the entire diameter of the planar base 304 and extends into a portion of the tube 310 which extends beyond the perimeter of the planar base 304, whereupon the helical blade ends. In certain aspects in which there is no auger apparatus or no conveyor 311, positive pressure gas in the vessel feeds the material in the vessel to the discharge opening.

Four, six or more radially projecting fingers 317 (two shown) extending from the shaft 313 (or which may be connected to the interior of the tube 310) are spaced from the end of the helical blade 314. The portion of the tube 310 which extends beyond the perimeter of the planar base 304 has a box 318 with a lower chamber 318a, having a compressed gas supply inlet 319 arranged below the end of the helical blade 314. The air supply inlet 319 is directed into the lower chamber 318a of the box 318 and in line with a cuttings outlet 320. The cuttings outlet 320 has, in one particular aspect, an internal diameter of 125 mm (5 inches) and is attached to a cuttings conveying line (not shown) of the same or similar internal diameter, which may be a flexible hose or a rigid pipe.

Figure 17A:
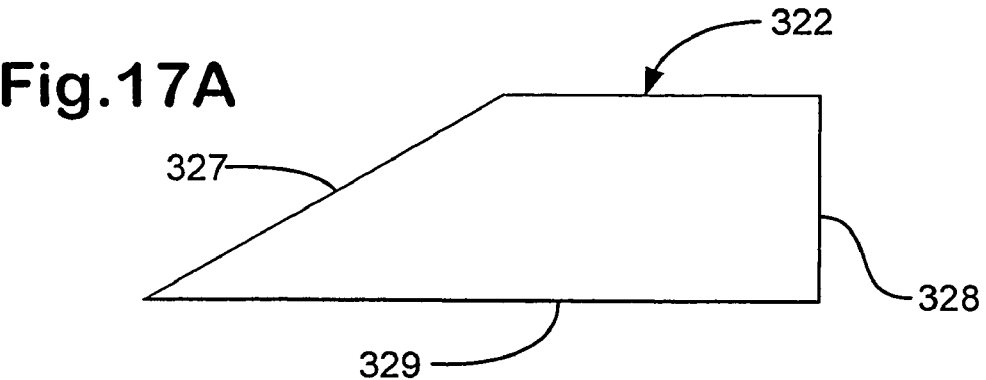
FIG. 17A is a top view of a part of the system of FIG. 13A.

A sliding frame 321 is arranged inside the pressure vessel 302 on the planar base 304 about opening 309. The sliding frame 321 may be any desired shape as viewed from above which assists in moving drilling cuttings to the opening 309. In one aspect as shown, the frame 321 has two symmetrical curved members 322 and 323 forming an eye shape which is arranged on four arms 324 joined to a central member 325. The curvature of the two symmetrical curved sections is slightly less than the curvature of the perimeter of the planar base 304. Outer edges 327 of the two symmetrical curved sections 322 and 323 and of the four arms 324 are, in one aspect, chamfered, whereas internal edges 328 (see FIG. 17A) facing the opening 309 are at right angles to the plane of the planar base 304. The curved members 322 and 323 have flat bottoms 329. The angle of the chamfer in certain aspects is between 45 and 20 degrees from the flat bottom 29. This can be seen clearly in FIG. 17A. It is within the scope of the present invention to have a frame or member sized and configured for movement across the opening 309 of any desired shape, e.g., but not limited to, a member 402 as shown in FIG. 13C or a generally circular frame, as shown with the frame 321a, FIG. 13D. The opening 309 may be any desired shape with any desired width and length; and, as shown, may be about the same width as an auger apparatus located beneath the opening (or the auger apparatus may be slightly wider than the opening).

A hydraulically actuated piston and cylinder assembly 326 is joined at one end to the wall or planar base 304 of the pressure vessel 302 and the other to the sliding frame 321, to induce movement of the sliding frame 321 over the planar base 304 backwards and forwards as indicated by the arrow within the confines of the pressure vessel 302. Alternatively some of the frame movement apparatus may be positioned exteriorly of the vessel.

The curved members 322 and 323 may have various profiles to accomplish the function of sliding underneath the drill cuttings 331 when moving away from the opening 309 and acting as a rake or scoop to scoop, dig, or move the drill cuttings into the discharge opening 309. In one aspect the space around the conveyor 311 in the tube 310 is maintained substantially full to facilitate maintenance of a consistent dosing rate dependent on the rpm's of the conveyor 311 while conveying drill cuttings from the storage vessel.

Figure 17B:
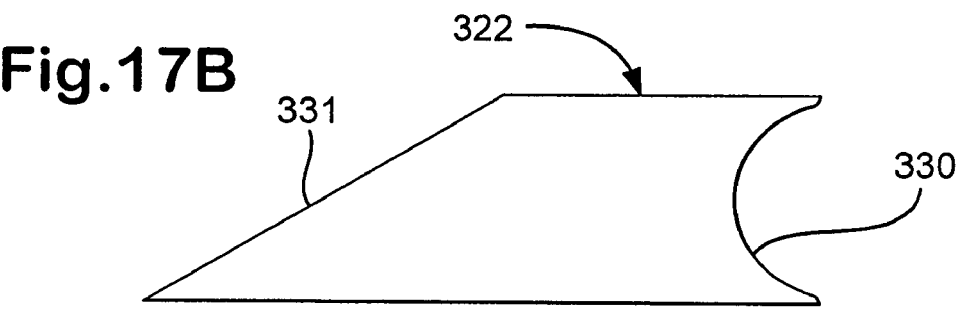
FIG. 17B is a top view of a part of the system of FIG. 13A.
Figure 17C:
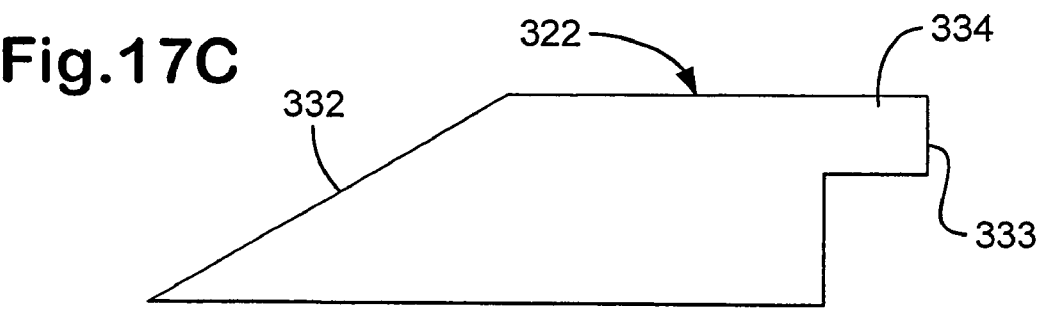
FIG. 17C is a top view of a part of the system of FIG. 13A.
Figure 17D:
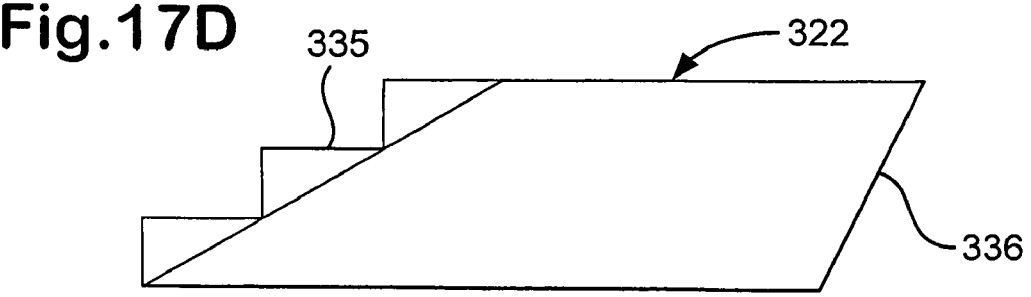
FIG. 17D is a top view of a part of the system of FIG. 13A.

An exemplary, but not exclusive, list of alternatives for the curved members is shown in FIGS. 17A-17D. FIG. 17B shows a curved member 322 (the member 323 is similar) having a chamfered front face 331 and a concave rear face 330. FIG. 17C shows a curved member 322 (or 323) having a chamfered front face 323 and a stepped rear face 333 having a shoulder 334. FIG. 17D shows the curved member 322 (or 323) having a stepped front face 335 and a slightly angled rear face 336 such that an acute angle is formed in use between the angled rear face 336 and the planar base 304.

The storage vessel 301, in one aspect, is attached to a skid (not shown) to facilitate transport of the storage vessel on lorries, supply boats, train cars and on offshore and onshore rigs. The height of the storage vessel 301, in one particular aspect, when mounted on the skid is 3.26 m, the length of the skid is 3.95 m and the width of the skid is 2.9 m.

A pressure relief valve 308a is provided on the pressure vessel 302, which is set to between 10% and 20% above the normal working pressure of preferably 7 Bar. A removable and/or openable hatch (308b) is, optionally, also provided in the wall of the pressure vessel 302 to allow access for inspection, servicing and cleaning.

FIG. 13C illustrates a rake system 400 according to the present invention useful instead of the sliding frame 321 and its associated movement apparatus. Like numerals indicate like parts in the systems of FIGS. 13A and 13C. The system 400 (or the sliding frame 321, etc.) can be used with any tank or vessel described herein. The system 400 has a member 402 on a shaft 404 that is moved back and forth above the opening 309 by movement apparatus 410. A mover 412 (e.g. any suitable motor engine, or reciprocating mechanism, e.g., but not limited to, a piston/cylinder assembly like that of FIG. 13A) moves the shaft 404 back and forth to move the member 402 above the opening 309 to facilitate the movement of drilled cuttings down into the opening 309. Optionally a vibratory apparatus 414 exterior to the vessel 302 vibrates the shaft 404 to vibrate the member 402 and/or to induce vibration through the vessel 302 in the drilled cuttings. Optionally, a vibratory apparatus 406 is disposed within the vessel 302 on the shaft 404 to vibrate the shaft 404 and the member 402 to facilitate cuttings movement. Optionally a vibratory apparatus 408 on the member 402 facilitates cuttings movement.

Figure 14:
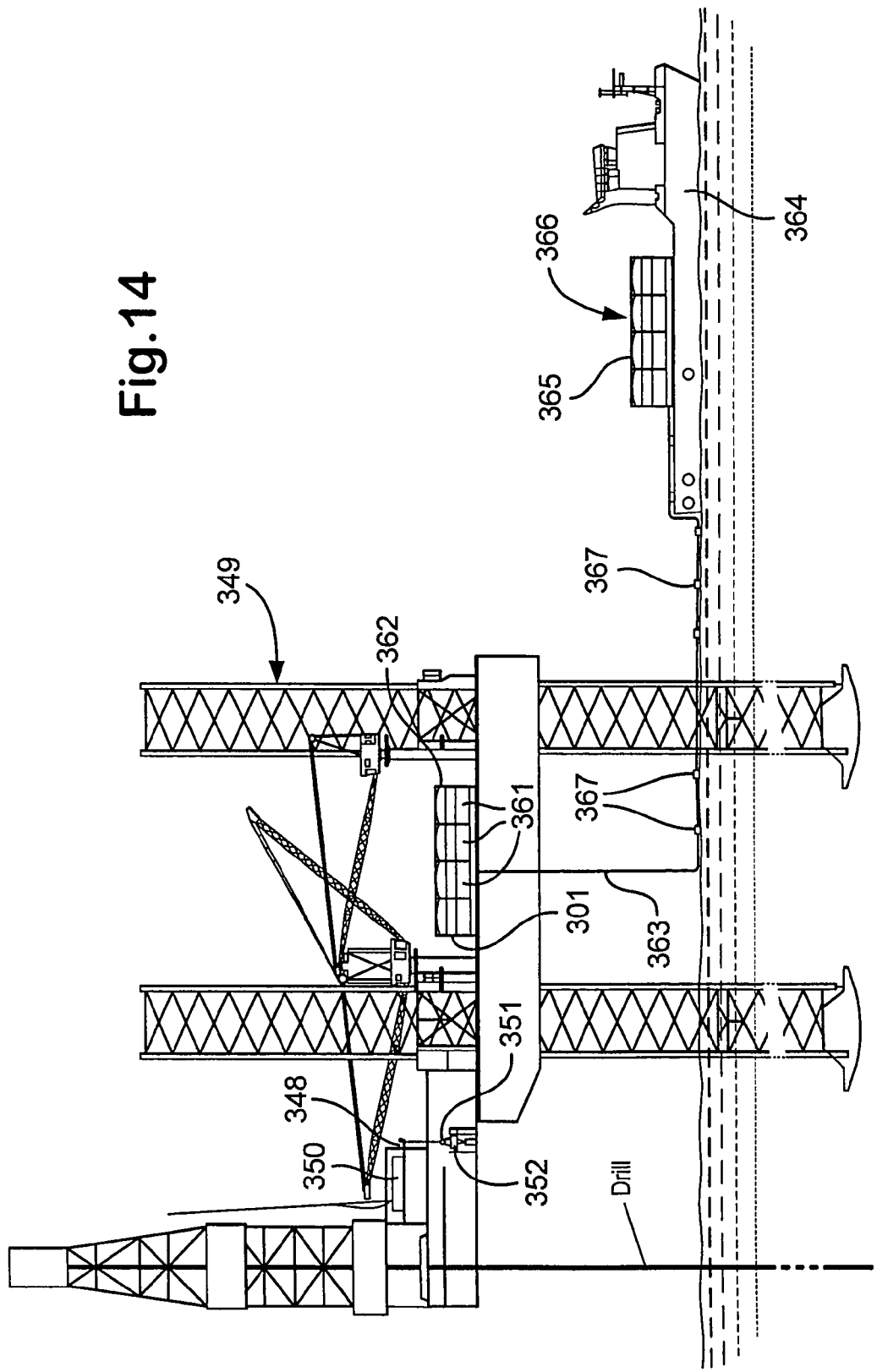
FIG. 14 is a schematic view of a system according to the present invention.

Referring to FIG. 14, wet drill cuttings are produced by a bank of shale shakers 350 on a drilling rig. 349. The screened wet drill cuttings fall from the screens of the shale shakers into a ditch 348. The wet drill cuttings are moved along the ditch 348 using a screw conveyor or belt conveyor or fall directly into a hopper. Wet drill cuttings are optionally fed into a dryer (not shown), such as a vortex dryer or a dryer of the type disclosed in GB-A-2,297,702, the disclosure of which is incorporated for all purposes herein, to remove a substantial amount of moisture. This is disclosed in more detail in co-pending PCT application number PCT/GB2004/000762 and in co-pending US application number U.S. Ser. No. 10/764,825 filed by the applicant for the present patent, the disclosures of which are incorporated fully for all purposes herein. In some circumstances, the moisture content of the drill cuttings is reduced to between 1% and 5% moisture by weight and in other circumstances down to 1% moisture by weight. Typically, "wet" cuttings contain 5% or more oil content and "dry" cuttings contain less than 5% oil content.

Figure 15A:
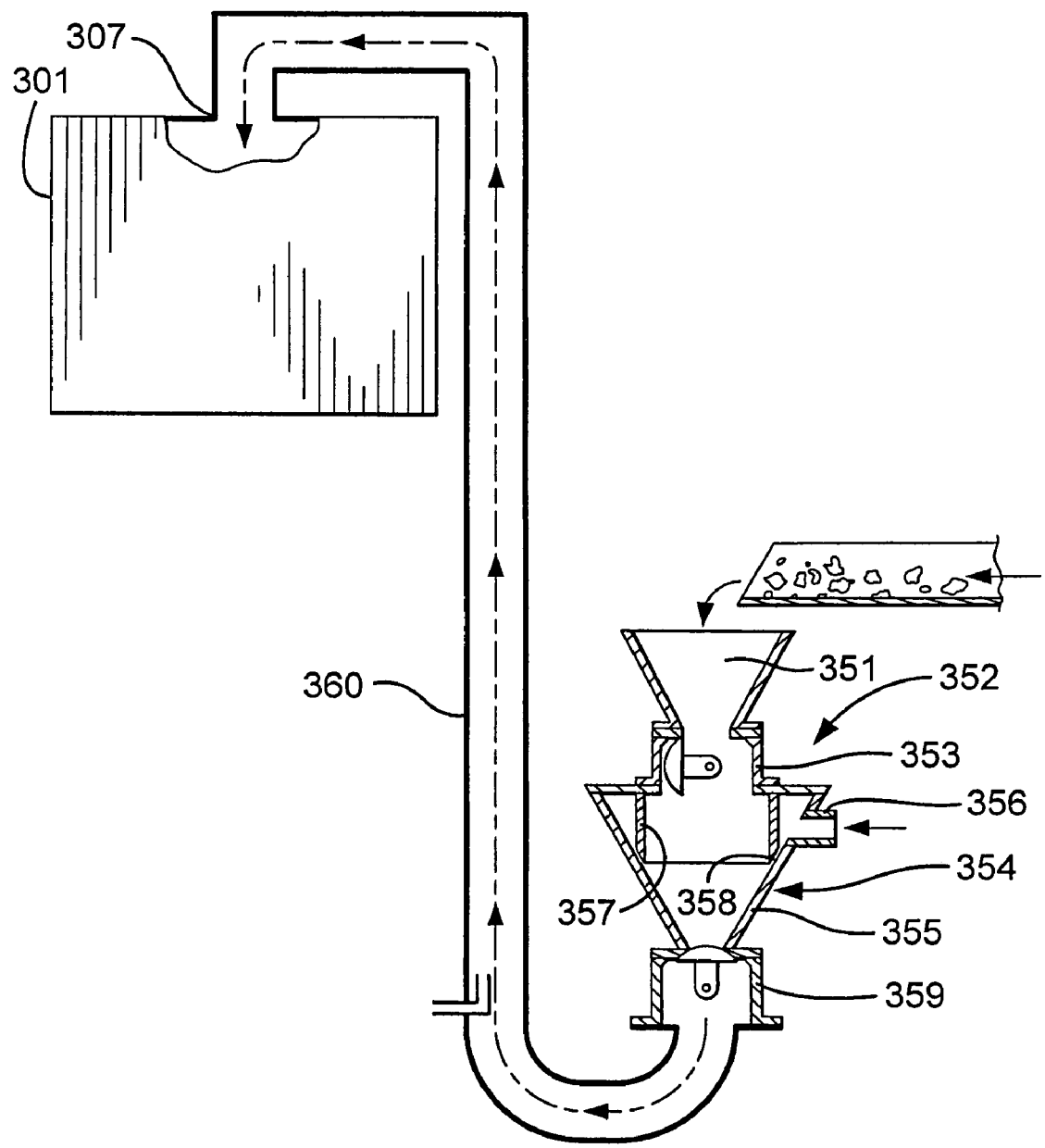
FIG. 15A is a schematic cross-section view of a prior art tank for use in a system as in FIG. 14.

The wet or dry drill cuttings fall directly into a hopper 351 of a blow tank 352, shown in more detail in FIG. 15A. The blow tank 352 may be of the type disclosed in GB-A-1,564, 311, the disclosure of which is incorporated fully herein for all purposes. A valve 353, which may be of the type disclosed in GB-A-1,539,079, the disclosure of which is incorporated fully herein for all purposes, is arranged between the hopper 351 and a small pressure vessel 354 having a capacity, in one aspect, of approximately 0.3 cubic meters, although the capacity in other aspects is between 0.1 and 1 cubic meter; or larger or smaller. The size of the small pressure vessel, in certain embodiments, is dependent on the space available near shale shakers, and/or the number of cycles needed to transfer material, e.g. at a rate of 30 metric tons per hour. The small pressure vessel 354 has a frusto-conical portion 355. An air inlet 356 is arranged in an upper part of a wall of the pressure vessel 354 and a cylindrical portion 357 of circular cross-section is arranged between the valve 353 and the wall of the frusto-conical portion 355, leaving a small gap 358 therebetween through which air under pressure can pass from the air inlet 356 into the frusto-conical portion 355. This aspect is also disclosed in U.S. Pat. No. 3,586,383 in the name of William Trythall, the disclosure of which is incorporated fully herein for all purposes. A further valve 359 (which is optional) is arranged at the discharge end of the frusto-conical portion 355 between the small pressure vessel and a feed line 360. The further valve 358 may be of the same type as valve 353. The feed line 360 may be a flexible hose or a rigid pipe and, in one aspect, has an internal diameter of 125 mm (5 inches).

In one aspect, the valve 353 and the further valve 359 cycle substantially out of phase, such that the valve 353 is open to allow the small pressure vessel 354 to be charged with drill cuttings under gravity from the hopper 351 while the valve 359 is closed to inhibit drill cuttings from entering the feed line 360. The valve 353 is closed so that a dose of drill cuttings is trapped in the small pressure vessel 354. The further valve 359 is opened. In one aspect air under pressure at between 1 and 8 Bar passes into the small pressure vessel 354 through gap 358 and applies a positive pressure to the top of the charge of drill cuttings to push a dose of drill cuttings out into the feed line 360. The further valve 359 may have a slight delay in opening to allow pressure to build up in the small pressure 354 vessel before being opened. The frusto-conical portion 355 may be at an angle to induce mass flow, as is well-known in the prior art, e.g. as disclosed in U.S. Pat. No. 3,604,758, the disclosure of which is incorporated fully herein for all purposes. Alternatively the interior wall of the frusto-conical section is lined with a friction reducing material, such as plastic, fiberglass, PTFE or a paint or enamel. The frusto-conical portion 355 may alternatively be a chisel, pyramid, wedge, transition or square opening type. Substantially all of the dose is discharged into the feed line and then the cycle is repeated. Many cycles per minute may occur. The feed line 360 leads to the inlet 307 of the storage vessel 301, which is arranged on the offshore rig 349 or, if it is a land based rig, near the rig. for example within 100-300 meters, although it may be up to many (e.g. three or more) kilometers away.

In use, the storage vessel 301 is vented to atmosphere, either using a valve or by disconnecting the air supply line 306 from the air inlet 305. Doses of drill cuttings enter the storage vessel 301, through the feed line 360 from the blow tank 352 and gradually fill the storage vessel 301. The storage vessel 301 can, in one aspect, store up to twelve cubic meters of drill cuttings, cut may, in other aspects, be sized to store between five and 20 cubic meters. Once the storage tank 301 is full or near full, a valve (not shown) in the feed line is operated to divert the doses of drill cuttings to another storage vessel 361. Alternatively, the feed line is disconnected from cuttings inlet 307 and connected to the cuttings inlet on a further storage vessel 361. Several storage vessels may be arranged to form a bank 362 of storage vessels.

At a convenient time when the supply boat or vehicle to transport the drill cuttings is in close proximity to the bank of storage vessels 362, for example when a supply boat 364 is moored to or within three or four hundred meters of the offshore rig, one end of a flexible hose 363 is connected to one of the storage vessels 301, 361. The other end of the flexible hose 363 is connected to at least one storage vessel 365 in a bank of storage vessels 366 on the supply ship 364. The storage vessels 365 are, in one aspect of the type described with reference to FIGS. 13A-13C. Floatation collars 367 may be provided on the flexible hose 363 to inhibit the hose from sinking into the sea.

An air supply provided by a compressor (not shown) under approximately 7 Bar is provided through air supply hose 306 through air inlet 305 into a space in the pressure vessel 302 provided above the surface of the drill cuttings. The variable speed hydraulic motor 312 is activated to drive the screw conveyor 311. A supply of air, e.g. under approximately 7 Bar or slightly less, is supplied through an air supply inlet 319 in the box 318. A slightly lower pressure in the lower chamber 318a of the box 318 than the pressure applied above the drill cuttings facilitates movement of drill cuttings from the pressure vessel 302 into the screw conveyor 311. The hydraulic piston and cylinder 326 is activated to move the sliding frame 321 backwards and forwards to facilitate movement of the drill cuttings into opening 309. The chamfered edges on the sides of the members 322, 323, 324 of the sliding frame 321 ensure that upon movement away from the opening 309 the components of the sliding frame slide under the drill cuttings and upon movement towards the opening 309, the opposed right angle or scoop profile surfaces pull the drill cuttings towards the opening 309. The drill cuttings move through opening 309 into the screw conveyor 311 which moves the cuttings along towards the lower chamber 318a of the box 318. Towards the end of the screw conveyor, a double helix blade may be arranged to facilitate break up of the drill cuttings. Fingers 317 are also provided to facilitate break up of the drill cuttings which then fall into the box 318 and are propelled through the opening 320 into flexible hose 363 into storage vessel 365 on the supply boat 364.

The supply boat then transports the loaded bank of storage vessels 366 to shore. The storage vessels may be lifted off the supply boat 364 and placed on train cars, flat bed lorries or directly into a processing plant. Alternatively, the drill cuttings can be discharged in the same way as described above in relation to moving the cuttings from an offshore rig to the supply boat 364.

Figure 16:
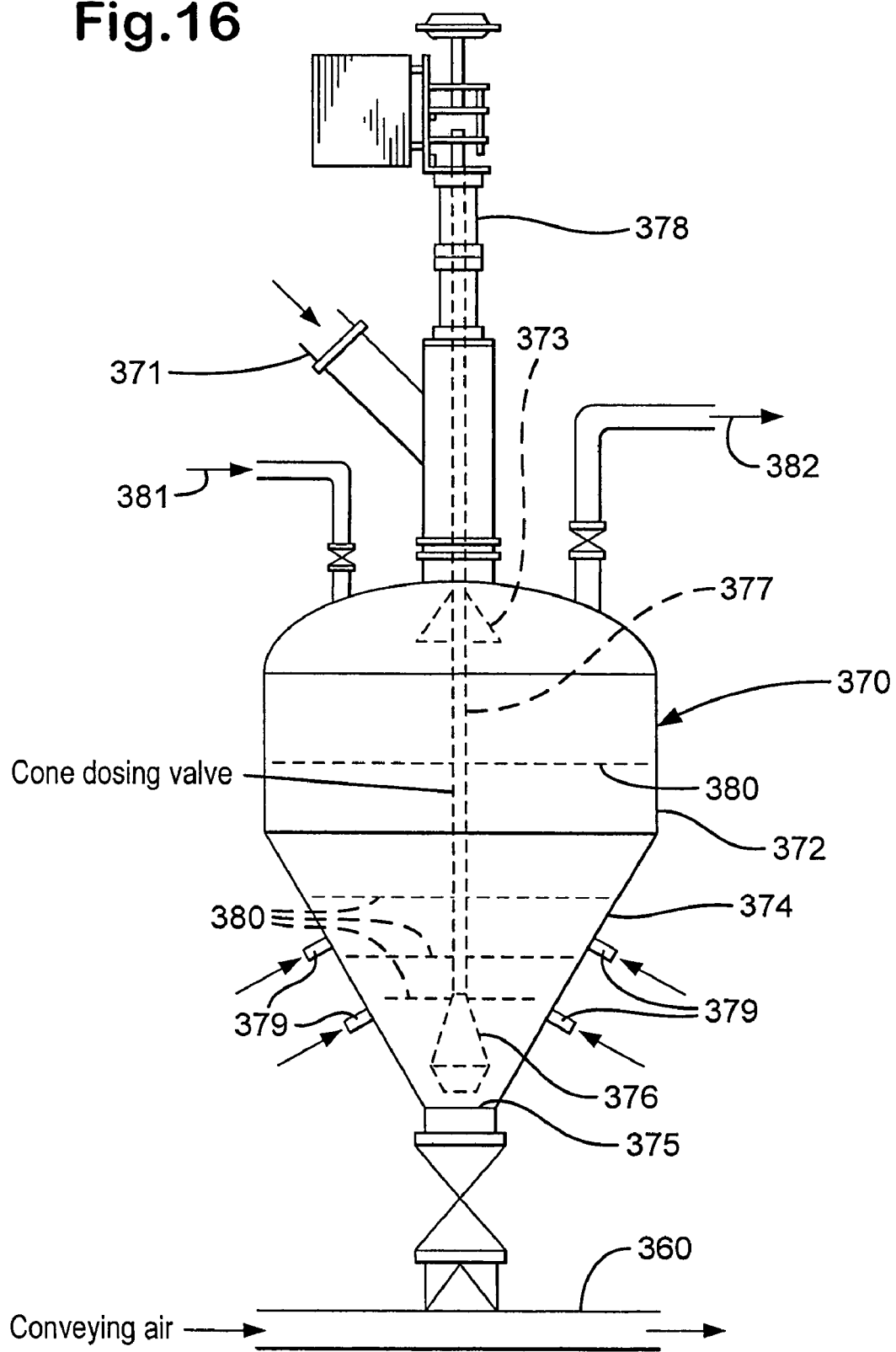
FIG. 16 is a side schematic view of a tank for use in methods according to the present invention.

An alternative dosing vessel 370 is shown in FIG. 16 which may be used in place of the blow tank shown in FIG. 15A. The vessel 370 has a cuttings inlet 371 leading from a hopper or other vessel (not shown), into a pressure vessel 372 through a fill valve 373. The lower end of the pressure vessel 372 is provided with a frusto-conical portion 374 which leads to a discharge opening 375. The discharge opening is provided with a discharge valve 376 for selectively opening or closing the opening 375. The discharge valve 376 and the fill valve 373 are in a fixed relationship by a piston 377 which extends from the discharge valve 376 through the fill valve 373 to an actuating cylinder 378. The piston 377 may be actuated pneumatically, hydraulically or using a stepper motor to open and close the fill valve 373 and the discharge valve 376, which are arranged so that they operate substantially out of phase. An air supply inlet 381 is arranged in the top of the small pressure vessel 372 for supplying air under pressure, e.g. of approximately 7 Bars, although it may be supplied at a pressure between one and ten Bars. Aeration ports 379 are provided in the wall of the frusto-conical portion 374 to inhibit sticking of the drill cuttings to the walls and to inhibit bridging of the drill cuttings around the discharge opening. Bristles 380 extend radially from the piston 377 within the small pressure vessel 372, which are moved up and down in concert with the valves to brush any drill cuttings stuck to the walls or in the form of a bridge about the discharge opening (but for the bristles 380 the tank 370 is like a prior art tank).

In use, the fill valve 373 and the discharge valve 376 cycle substantially out of phase, such that the fill valve 373 is open to allow the small pressure vessel 372 to be charged with drill cuttings under gravity from the hopper 351 while the discharge valve 376 is closed to inhibit drill cuttings from entering feed line 360. The fill valve 373 is closed so that a dose of drill cuttings is trapped in the small pressure vessel 372. The discharge valve 376 is opened by actuation of the piston 377, which closes the fill valve 373. Air under pressure, e.g. at between 1 and 8 Bar, passes into the small pressure vessel 372 and applies a positive pressure to the top of the charge of drill cuttings to push a dose of drill cuttings out into the feed line 360. The valves may cycle several times per minute with a relatively small pressure vessel. With a pressure vessel of 0.3 cubic meters, the valves will cycle once or twice every minute or every two minutes. The feed line 360 (as in FIG. 15A) leads to the inlet 307 of the storage vessel 201, which is arranged on the offshore rig 349 or, if it is a land based rig, near the rig, for example within 300 meters although it may be up to three or four kilometers away. Venting is provided as needed via a vent line 382.

This type of dosing vessel 370 was manufactured by Klockner-Becroit and shown and described on pages 290-291 of the text book entitled "Pneumatic Conveying of Solids—a theoretical and practical approach" by Klinzing and Marcus, published in 1997.

Figure 18:
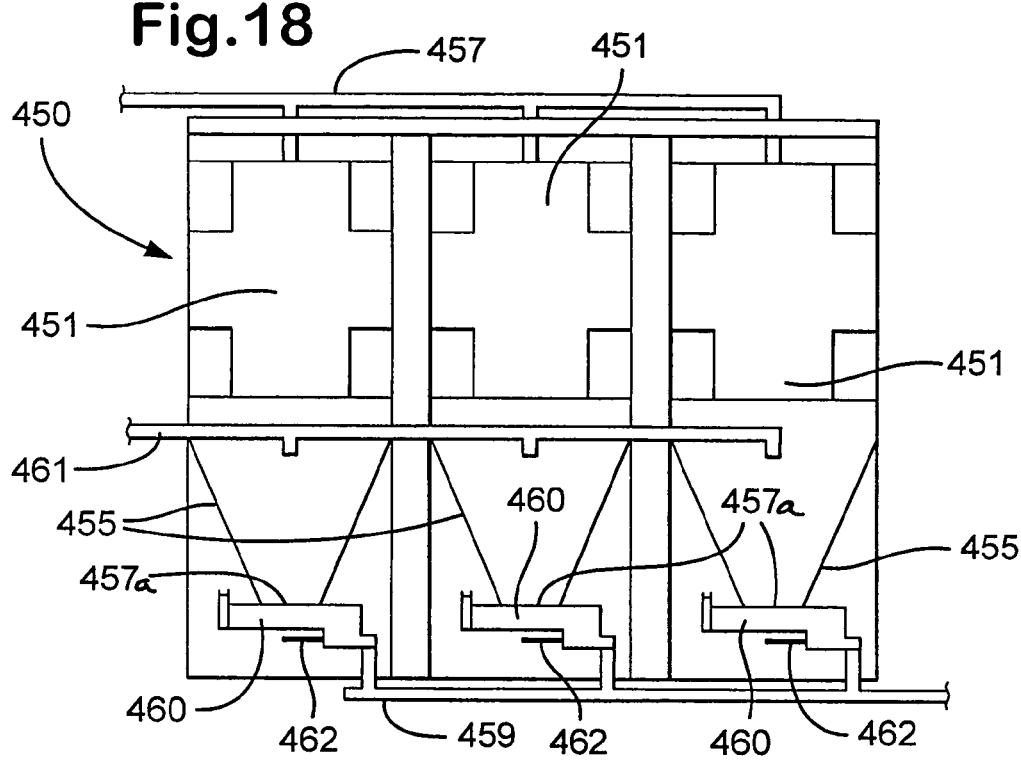
FIG. 18 is a schematic view of a storage vessel system according to the present invention.

As does the system according to the present invention shown in FIG. 11, FIG. 18 illustrates a system 450 according to the present invention and also provides improvement to systems and apparatuses as disclosed in: U.S. Pat. No. 6,702, 539 issued Mar. 9, 2004; Great Britain Application No. 9913909 filed Jun. 16, 1999; U.S. application Ser. No. 10/018,124 filed as application PCT/GB00/02158 on Jun. 14, 2000; and European Patent EP 1,187,783 B1, published Sep. 24, 2003. The system 400 can be used in the system 200, FIG. 11.

Drilled cuttings flow in a pipe 457 into containers 451. Each container 451 has a lower conical-shaped portion 455 with a lower opening 457a. Adjacent each opening 457 is an apparatus 460 (which is like any apparatus or system disclosed herein to facilitate the movement of drilled cuttings from a tank or vessel, e.g., but not limited to, the systems disclosed in FIGS. 13A-13C, e.g. with a movable frame 324 and/or a movable member 402 and the associated powered movement mechanisms. The apparatuses 460 move drilled cuttings into a pipe 459 (e.g. like the pipe 19, U.S. Pat. No. 6,702,539) from which the drilled cuttings can be introduced into any suitable tank or container for transport, the containers 211, 231 of FIG. 11 and/or the containers 31 of U.S. Pat. No. 6,702,539 may have an apparatus like the apparatus 460 to facilitate cuttings movement.

FIGS. 15B-15D illustrate a pressurized feeder 470 to feed cuttings (e.g. from shakers or dryers to storage vessels) in methods according to the present invention which have a pressure vessel 472 with a non-conical lower portion 474 which has two sloping sides 475. In certain aspects the pressure vessel 472 has a capacity of between 0.15 cubic meter and 1 cubic meter, and in one particular aspect 0.33 cubic meter. Drilled cuttings enter the pressure vessel 472 from an upper inlet hopper 476 through an opening 477. An inlet valve 478 (e.g. a dome valve) selectively controls the entry of drilled cuttings into the pressure vessel 472 and, in one aspect, provides a preselected dose of drilled cuttings, e.g., in one aspect 0.15 cubic meter to 1 cubic meter, and in one particular aspect 0.3 cubic meter.

Optionally, compressed gas (e.g. air and/or nitrogen or another inert gas) may be introduced into the vessels 451 with or after drilled cuttings flow into the vessels 451 in the line 457. Optionally compressed gas is introduced in a line 461 into the vessels 451 for application to and/or above the drilled cuttings as previously described and/or referred to for any embodiment described herein. Optionally compressed gas is applied in lines 462 to the apparatuses 460 as described above in the system of FIG. 13A. Optionally, compressed gas may be applied to the interior of the line 459 with one or more apparatus 463 to facilitate the flow of the drilled cuttings material through the line 459. Each apparatus 460 may, optionally, have a movement member (e.g. like frame 321 or member 402) to facilitate movement of drilled cuttings from the vessels 451. Optionally, a movement member 482 (e.g., like the movement member 402 or frame 321 described above) is movable by movement apparatus 484 (shown schematically; e.g. any movement apparatus disclosed herein) to facilitate the movement of drilling cuttings to and through the opening 479 and from the vessel. Optionally, an auger apparatus 480 (e.g. as any auger apparatus described herein and, in one aspect, like the conveyor 311, FIG. 13A) may be used with the vessel 422.

Figure 19D:
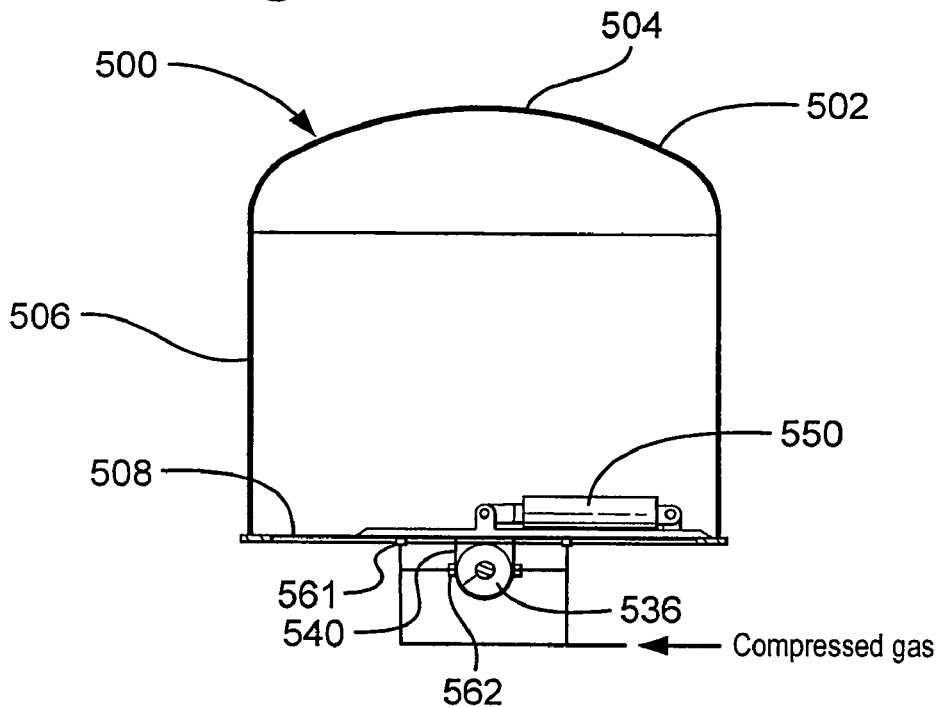
FIG. 19D is a side cross-section view of the vessel system of FIG. 19A.
Figure 19E:
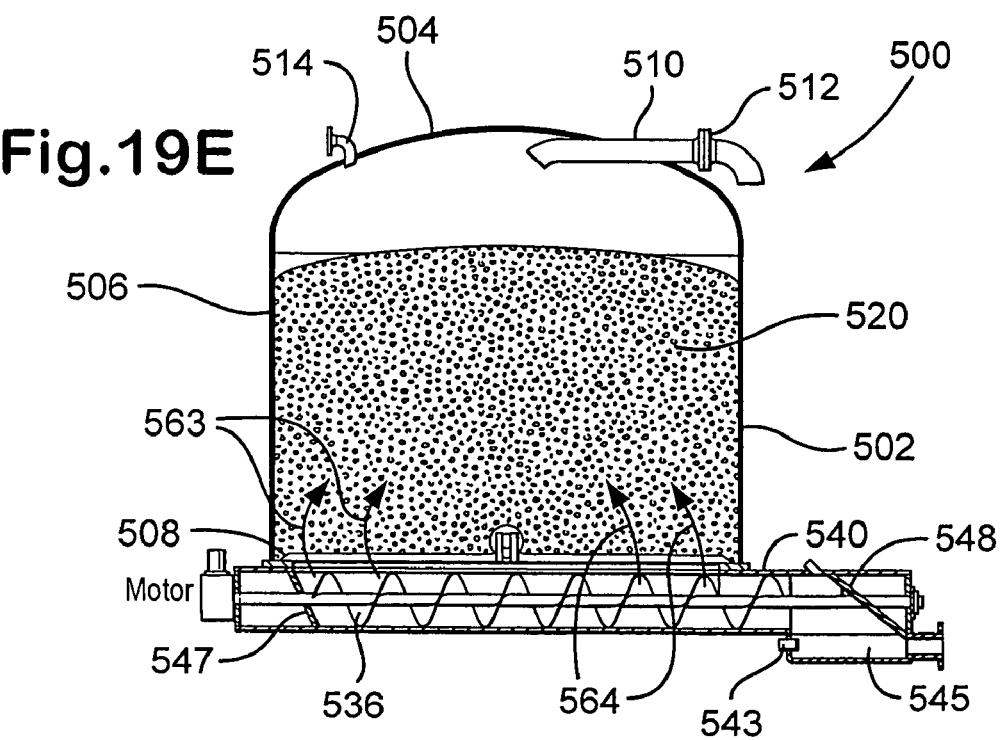
FIG. 19E is a side cross-section view of the vessel system of FIG. 19A.

FIGS. 19C-19E show a vessel system 500 according to the present invention which has a pressure vessel 502 (e.g. like the vessel 302, FIG. 13A) with a domed top 504, a generally cylindrical side wall 506, and a floor 508. Drilled cuttings 520 are fed into the vessel 502 via an inlet 510 flow through which is controlled by a valve 512. Optionally, compressed gas is introduced through a gas inlet 514.

A frame 530 (e.g. similar to the frame 321, FIG. 13A) slides over the floor 508. The frame 530 includes a solid closure portion 532, but which may be perforated or made of screen. The closure portion 532 selectively closes off an opening 534 in the floor 508 which is located above a screen conveyor 536 (like the conveyor 311, FIG. 13A) which is rotatably mounted in a tube 540.

As shown in FIG. 19A the closure portion 532 closes off flow to the conveyor 536 when movement apparatus 550 is in the fully retracted position. This closed position is assumed when the storage vessel 500 has drill cuttings being stored therein, for inhibiting drill cuttings from sitting in the screw conveyor tube 540. It is possible if drill cuttings sit in the screw conveyor for too long a period of time that the drill cuttings can set and inhibit or prevent the screw conveyor from rotating when discharging the drill cuttings commences. This closed position is also assumed when the storage vessel 500 is empty so that drill cuttings are inhibited from falling into the screw conveyor and becoming compacted in the screw conveyor. As shown in FIG. 19B, the frame 530 has been moved by the movement apparatus 550 (like any movement apparatus disclosed herein) and the opening 534 is no longer blocked and receives material flowing down from the vessel 502. Cuttings flow from the vessel 502 to a cuttings discharge end 542 of the tube 540 is facilitated by the screw conveyor 536.

As shown in FIGS. 19C and 19D the system 500, optionally, includes a plurality of aeration nozzles 561 through the floor 508 which inject gas under pressure into the vessel 502 (in certain aspects, upwardly and/or downwardly into the conveyor 536). The same compressed gas system that provides gas to the inlet 514 may be used to provide gas to the nozzles 561 or a separate compressed gas source may be used. The pressurized fluid through the nozzles 561 may be at a pressure higher than the pressure used to convey the drill cuttings. By applying a pneumatic fluid through the air nozzles 562 the drill cuttings are aerated. This is important when dry drill cuttings are stored in the pressure vessel 502. The dry drill cuttings are aerated and moved out through the screw conveyor 536. When the drill cuttings are aerated, they act more like a fluid and, therefore, transportation of the drill cuttings is more predictable. This also can facilitate removal of blockages in the conveyor and may also be used to purge and clean the screw conveyor 536 at any convenient time, such as when the storage vessel 500 is empty. Optionally, the system 500 includes a plurality of aeration nozzles 562 which project into the tube 540 and provide gas under pressure into the tube 540 to promote cuttings movement, to inhibit cuttings consolidation and unwieldy slug formation. In one particular aspect there is a plurality of aeration nozzles along the full length of the tube 540. When the closure member 532 is in a closed position, air diffuses past the edges of the closure member 532 (and, if it is perforated, through any perforations therein) and aerates the cuttings which are moving past the frame 530.

As shown in FIG. 19E by arrows 563, the conveyor 536 can be run in reverse to circulate cuttings within the vessel 502 to produce a more homogenized mass of cuttings. The arrows 564 indicate rotation of the conveyor 536 in the direction resulting in cuttings moving from the vessel 502.

Optionally, the tube 540 may have an inclined end plate 547 to facilitate cuttings movement toward the conveyor 536 and, when the conveyor is run in reverse, to facilitate cuttings movement into and within the vessel 502. Optionally, the tube 540 has an inclined end plate 548 near the tube's discharge end which urges material down into a discharge chamber 545 and out of the tube 540. Optionally, compressed gas is supplied to an inlet 543 to promote the movement of cuttings from the discharge chamber out the discharge end 542 of the tube 540.

A sliding frame (e.g. like the frame 530, FIG. 19A) in dealing with wet cuttings, dry cuttings, or cuttings which are moisture bearing, provides discharge rate control (from the discharge end 542) by controlling the amount of material that flows into the conveyor 536. Aerating dried cuttings, e.g. cuttings dried by a dryer facilitates cuttings movement by making the cuttings act more like a fluid and makes transportation of the cuttings more predictable.

Compressed gas to facilitate cuttings conveyance is supplied from a compressed gas source 602 in a line 627 (with flow controlled by a valve 616) to a vessel 622 and in a line 612 (with flow controlled by a valve 615) to a discharge box 624. Cuttings discharged from a tube 626 of the system 620 are propelled by the gas into and through a conveying line 632 from which the cuttings flow to further processing apparatus (e.g. another vortex dryer) or to storage (e.g. cuttings boxes on a rig, on shore or on a boat).

A plurality of pressure monitors 640 are spaced-apart along the conveying line 632, each including a pressure gauge and in communication with a control system, e.g. a PLC control system 680. A plurality of gas injection apparatuses 690 are spaced-apart along the conveying line 632 for selectively injecting gas under pressure into the conveying line 632 as directed by the PLC controller 680. Gas is supplied in a line 613 to the apparatuses 690. A valve 614 controls flow in the line 613. The valves 614, 615, 616 are in communication with and controlled by the PLC controller 680. A conveyor 631 of the system 620 is in communication with and controlled by the PLC controller 680.

Each apparatus 690 includes a one way check valve 691 through which air flows into a conveying line 632, the one way check valves 691 inhibiting drill cuttings from entering and blocking pneumatic line 613; a controllable valve 692 that selectively controls flow of fluid into the conveying line 632; and a regulating valve 693 that selectively allows pneumatic fluid under pressure through and into the conveying line 632 when the pressure differential between the line 613 and the pressure at the point 640 is less than a predetermined difference in order to maintain a constant pressure drop along the conveying line.

Figure 20A:
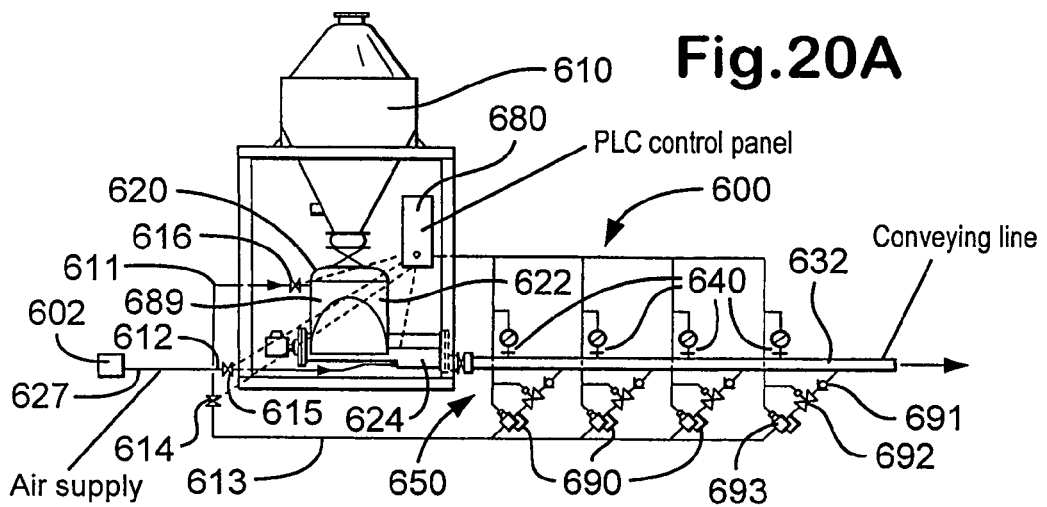
FIG. 20A is a side schematic view of a vessel system according to the present invention.

FIG. 20A shows a system 600 according to the present invention for storing and moving drilled cuttings [which may be wet, dry, or moisture-bearing (damp)] which has a vortex dryer 610, feeder system 620, and a conveying system 650. The feeder vortex dryer 610 provides drilled cuttings to the feeder system 620. The feeder system 620 has a vessel 622 which provides drilled cuttings to the conveying line 632. The feeder system 620 may be, in certain aspects, like the systems of FIG. 15B or 16 or like any blow tank or storage vessel disclosed herein.

The monitoring and control system maximizes throughput in a safe manner, i.e. avoiding plugging and pushing solids into a conveying line in an uncontrolled manner. The use of the apparatus 690 and 640, in one aspect, ensures that the cuttings are kept "live" and moving within the conduit 632. The pressures are monitored at strategic points along its full length. The pressures observed are maintained by modifying the cuttings feed rate and/or assist air flow for continuous (and, in some aspects, optional) performance. To minimize the overall pressure drop over the length of the conduit 632, the length and/or density of a conduit 632 is controlled which is in the dense phase mode of flow whereby it has filled the entire cross section of conduit 632. The denser the slug, the higher the wall friction, hence the higher the pressure required to propel the slug down the conduit 632. Also the relationship of slug-length-to-pressure required to propel a slug is exponential; i.e., the pressure required to convey a series of slugs separated by "cushions" of air is far less than that needed to convey a single slug whose length is equivalent to the sum of the lengths of the series of slugs.

The system 620 doses cuttings into the conduit 632 in slugs, the size of which are determined by the screw or auger outside diameter, shaft size and pitch. The feed rate is directly proportional to the rotational speed of the screw. Localized aeration within the conveying/discharge chamber of the screw ensures the cuttings are "life" and the speed control/stop/start facility of the screw controlled by the PLC controller 680 offers close control in the creation of the slugs. This control is based upon the pressure regime within the conduit 632 which is heavily dependant upon the mode of flow.

In one aspect nominal setpoints are used within the conduit 632 regarding the maximum pressure drop across the conduit 632, one set at a low value for dilute phase, e.g. 2 bar, which is used for dried drill cuttings and the other for non-dried cuttings which is higher, e.g. 4 bar. In one particular aspect, in dense phase, the drill cuttings move along the conveying line at approximately 10 m/s; and in lean or dilute phase, the drill cuttings move along the conveying line at approximately 30 m/s. The PLC controller 680 ramps up the screw speed to the speed necessary to feed the conveying line 632 so that pressure drop is maintained to a set level between the units 690. For example, with four units 690 spaced equidistant along the length of a straight conveying line 632, the conveying line 632 is dosed with a first dose of drill cuttings from the feeder 620. The air supply 602 is activated and the plug of drill cuttings moves along the conveying line. The initial pressure is set to e.g. 4 bar and it is expected that the pressure at the end of the conveying line will be slightly above atmospheric when the plug reaches the end. The units 690 regulate the pressure in the line so that there is a reasonably constant pressure drop between the units 690. The pressure drop is, e.g. 0.5 bar between each unit, such that after the first unit 690 the pressure is regulated at 3.5 bar, after the second unit the pressure is regulated to 3 bar after the third unit the pressure is regulated to 2.5 bar and after the fourth unit the pressure is regulated to 2 bar so that it is expected that the pressure at the end of the conveying line 632 is approximately 1.5 bar and that there is a reasonable degree of certainty in knowing the plug will discharge from the end of the conveying line and into a storage vessel. If the pressure drop is within a certain percentage, e.g. 30%, and, in one aspect, 15%, and in one particular aspect, 10% of what was expected, the regulator opens the line 613 and allows air under pressure, regulated by regulator 693 to enter the conveying line at the correct pressure.

Figure 20B:
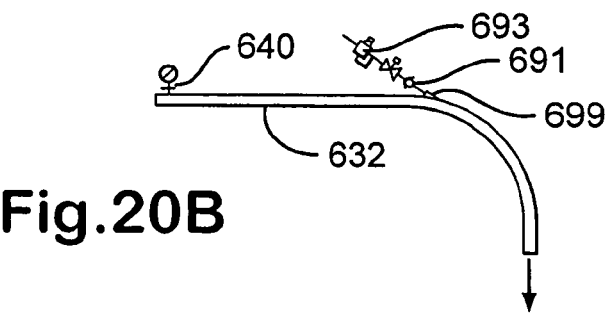
FIG. 20B is a partial top view of part of the system of FIG. 20A.

A standard PID loop "PID loop" is utilized such that should the pressure drop overshoot the desired setpoint, the screw feeder speed is reduced or stalled accordingly. Feedback from the pressure monitors 640 along the line which are located strategically slightly upstream of bends/vertical lifts or any other areas known to create turbulence within the conduit are used in order to actuate air assist valves in the apparatus 690 should it be necessary. An air assist valve is located at a turbulence point downstream of a pressure monitor and should the pressure at the monitor go below a given percentage value compared to the sensor immediately upstream of it, e.g. 80%, then air is fed direct from source 602 via the bypass line 613 which runs the full length of the conduit 632 into the associated assist point. The pressure setting for the air assist is set at e.g. 90% of the pressure value at the monitor 640 immediately upstream, and if this pressure is reached, then the assist air is also directed to the next injection point immediately downstream and so forth. Each valve 691 can feed an associated gas injection nozzle 699 (e.g. see FIG. 20B).

Figure 21A:
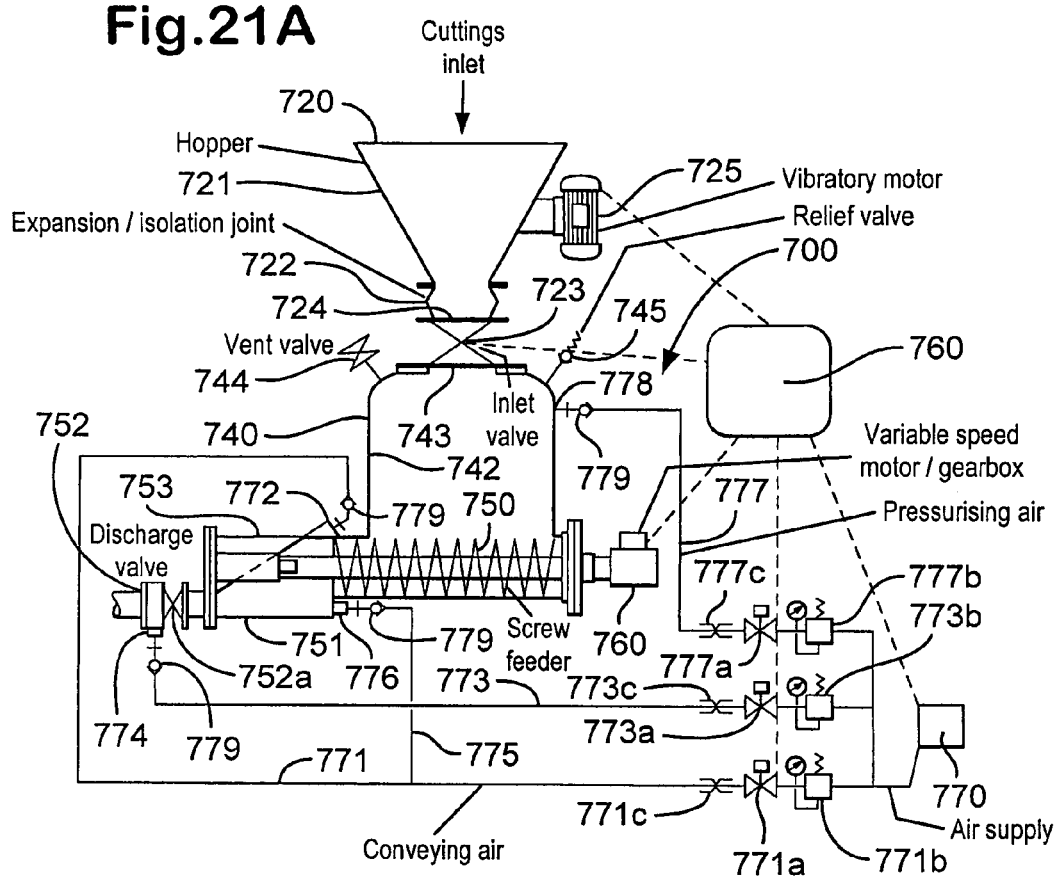
FIG. 21A is a side schematic view of a vessel system according to the present invention.
Figure 21B:
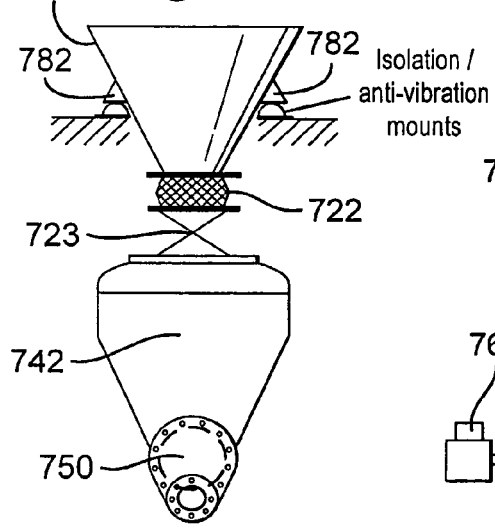
FIG. 21B is an end view of part of the system of FIG. 21A.
Figure 21C:
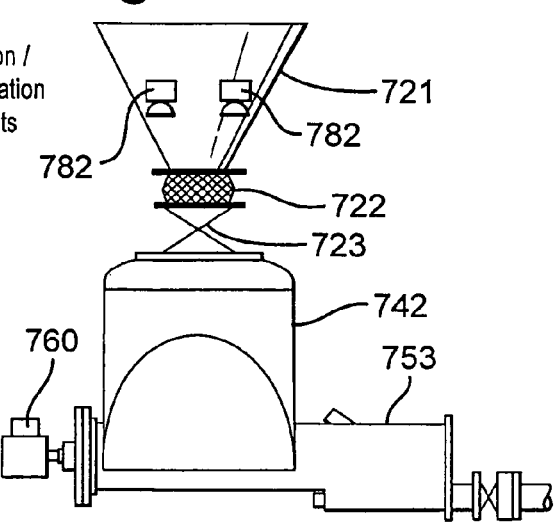
FIG. 21C is a partial side view of the system of FIG. 21A.

FIGS. 21A-21C illustrate a system 700 according to the present invention (like the system of FIG. 15B, but with a vibratory motor for a hopper) which has a feeder system 720, a storage vessel system 740, and a control system 760 in communication with the systems 720, 740. The system 720 has a buffer hopper 721; an optional vibratory motor 722 for vibrating the hopper 721 and its contents; an expansion joint 722; and a valve 723 at an exit opening 724 to control the flow of drilled cuttings from the hopper 721 to the storage vessel system 740. The system 700 is used, e.g., to move drilled cuttings from shakers to storage vessels, and, in one particular aspect, the pressure vessel 740 only has a storage capacity of about 0.3 cubic meter.

The storage vessel system 740 may be like the storage systems of FIGS. 13A, 15B-D, 19A and 20A. The system 740 has a vessel 742 which receives drilled cuttings through an inlet 743. A vent valve 744 selectively vents the vessel 742 and a relief valve 745 relieves pressure in the vessel 742 at a preset level. A conveyor 750 conveys drilled cuttings from the vessel 742 to a discharge box 751 and the cuttings exit a discharge end 752 of a tube 753 to flow into a conduit (not shown; e.g. like the conduit 632, FIG. 20A). A motor/gear system 760 rotates the conveyor 750.

Compressed gas from a source 770 supplied gas under pressure in a line 771 to an inlet 772 on the tube 753; in a line 773 to an inlet 774 at the discharge end 752 of the tube 753; in a line 775 to an inlet 776 at the discharge box 751; and in a line 777 to an inlet 778 of the vessel 742. Each line has a one way check valve 779. Optionally the hopper 721 is mounted on isolation/non-vibration mounts 782.

All the operational components of the system 700 are in communication with (see dotted lines) a controller 760 (e.g. like the controller 680, FIG. 20A.

Each line 771, 773, 777 has an on/off flow control valve 771a, 773a, 777a respectively (e.g. like the valves 692); a pressure regulator 771b 773b 777b respectively (like the pressure units 690; pressure set manually or by the control system, the set pressure effectively sets the maximum working pressure of the system, e.g., 2 BAR for dried cuttings or 4 BAR for wet cuttings from the shale shakers); and flow control valves 771c, 773c, and 777c, respectively, which control the rate of change in pressure (e.g., may be needle valves, orifice plates, or similar devices).

Via the line 777 gas is provided to the vessel 742 at a pressure equal to the pressure of gas provided to the tube 753 in the line 771 and to the gas provided in the line 773 to the discharge box 751 so that the pressure drop across the conveyor (screw feeder) 750 is negligible. Therefore feed rate of cuttings from the system 700 is determined by the rpm's of the conveyor 750. In one aspect gas is input downstream of a discharge valve 752a in the line 773. With the discharge valve 752a closed, the vessel 742 can be vented to the atmosphere, permitting refilling of the vessel 742 while cuttings are being conveyed downstream of the discharge end 752.

Figure 22:
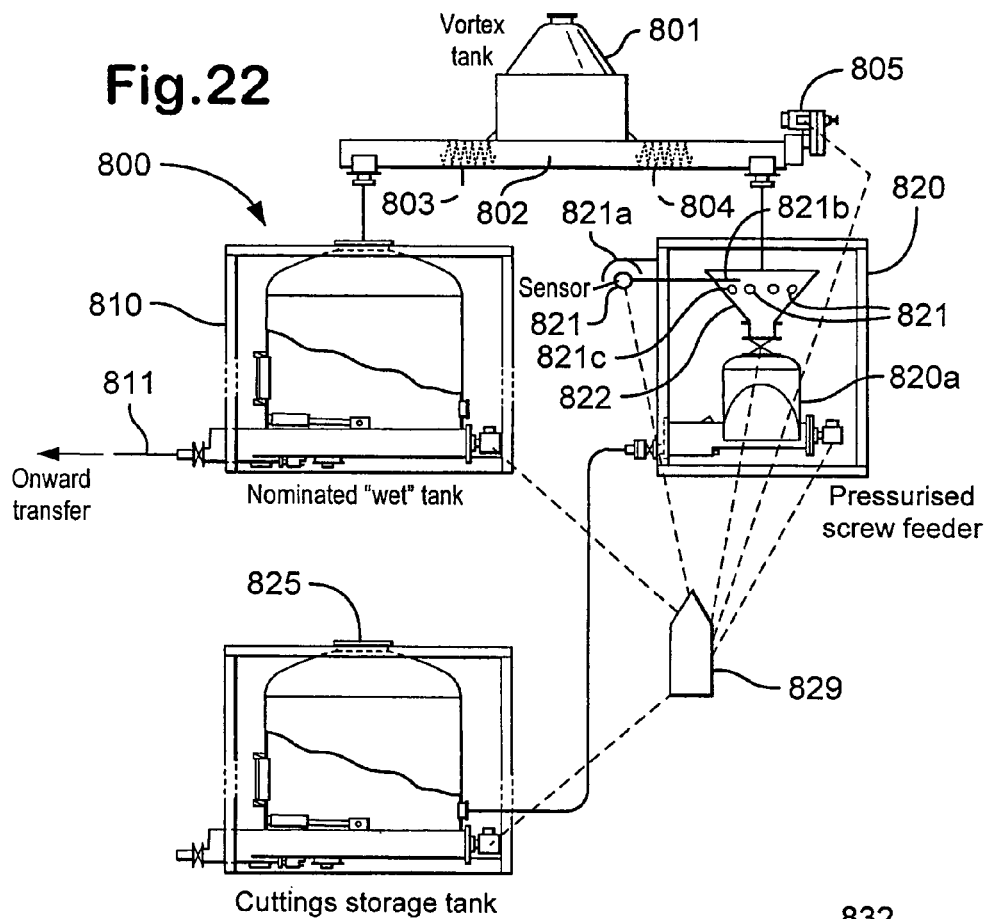
FIG. 22 is a schematic view of a system according to the present invention.

FIG. 22 shows a system 800 according to the present invention which has a vortex dryer 801 which dries drilled cuttings. A conveyor system 802 with augers 803, 804 driven by a motor/gear system 805 provides drilled cuttings selectively to a tank system 810 or to a pressurized feeder system 820, based on measurements by a moisture sensor 821 (or sensors). Non-wet cuttings go to the system 820; if "wet" cuttings are sensed, the augers are reversed and cuttings are conveyed to the tank system 810. A sensor (or sensors) 821 sense moisture content of the drilled cuttings. If the sensor 821 senses "wet" (e.g. greater than 5% oil content) then the auger is reversed and moves the cuttings to the "wet" cuttings storage vessel 810; and, if the cuttings are dry (e.g. less than 5% oil content), the auger is set in forward motion and the cuttings are supplied to the feeder system 820, which blows the cuttings to a dry cuttings box 825. In one particular arrangement, once cuttings have moved to the storage vessel 810, they can then be moved to the dry cuttings box 825. Optionally (as is the case for any moisture sensor or sensor apparatus in any system herein) the sensor 821 may have a protective canopy 821a for components outside a hopper and a protective canopy 821b for components 821c within a hopper 822. Such a canopy 821b protects sensor components 821c from drilling cuttings falling downwardly in a hopper. Multiple sensors 821 may be used spaced apart around the hopper 822 (as is the case for any system according to the present invention with moisture sensor apparatus). In certain aspects, such sensors are efficacious with a drilling cuttings amount that is at least one inch thick and has an area of at least three to four square inches. Such sensors may produce continuous readings for more accurate use by a control system 829 which is in controlling communication with components of the system 800 as indicated by dotted lines.

The control system 829 can switch cuttings flow from the system 825 (e.g. for adequately dry cuttings) to the system 810 (e.g. for relatively wet cuttings). In any system herein a first storage apparatus or a "dry" storage apparatus can be a storage vessel system, the hold of a ship, a hold or reservoir on a rig or in legs of a rig. Such storage facility, in whatever form, may have, according to the present invention, a positive pressure pneumatic system and a bottom aeration system for aerating drilled cuttings material from underneath the material (e.g. through a perforated bottom plate or member) producing a dilute phase material which is more easily conveyed. In one particular aspect moisture content sensors are like Models MCT 300, MCT 600 and MCT 101-T sensors from Process Sensors Corporation, Milford, Mass. As is the case with any pressurized vessel in any system herein, a cuttings vessel 820a of the system 800 may be, in volume, between 0.05 m$^3$ to 0.2 m$^3$.

Figure 23:
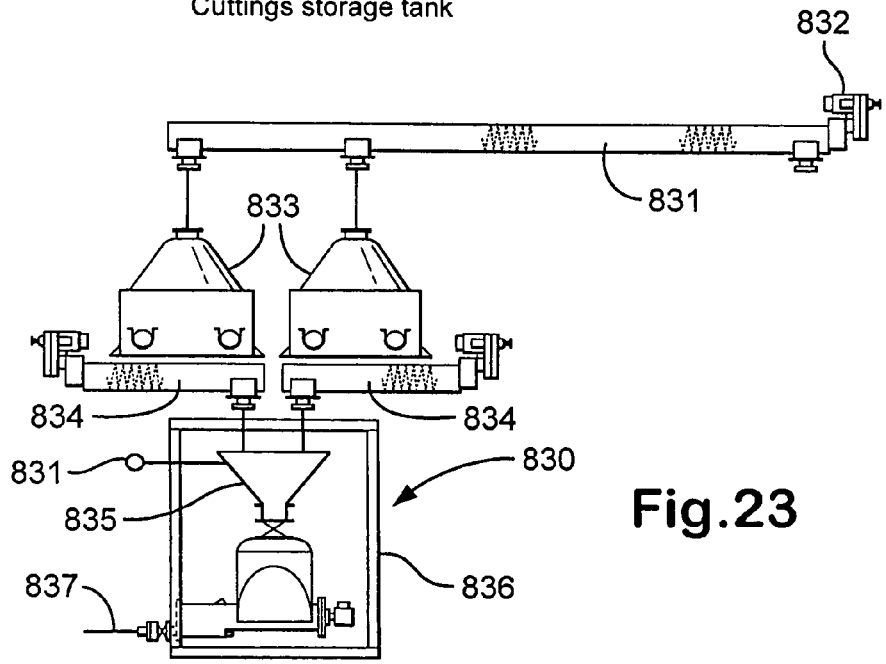
FIG. 23 is a schematic view of a system according to the present invention.

FIG. 23 shows a system 830 according to the present invention in which a conveyor system 831 powered by a motor/gear system 832 feeds drilled cuttings to two vortex dryers 833. Cuttings processed by the vortex dryers 833 are fed by conveyor systems 834 to a hopper 835 of a feeder system 836 (like the system 820, FIG. 22). One of the vortex dryers 833 has a screen which blinds if the drill cuttings are "near sized" ("near sized" means the size of cuttings generated by drilling which have a size distribution like that of the size of screen mesh apertures of screens in screening apparatus; near size particles can become lodged in screen apertures, clogging a screen), at which point wet drill cuttings flow out of the vortex dryer. This is noted by a moisture sensor 831 which sends a signal to the second vortex dryer, which kicks in, which has a screen with a screen size different from the first vortex dryer, and therefore can cope with this size of particle. The system 836 produces processed cuttings which exit in a conduit 837.

Figure 24:
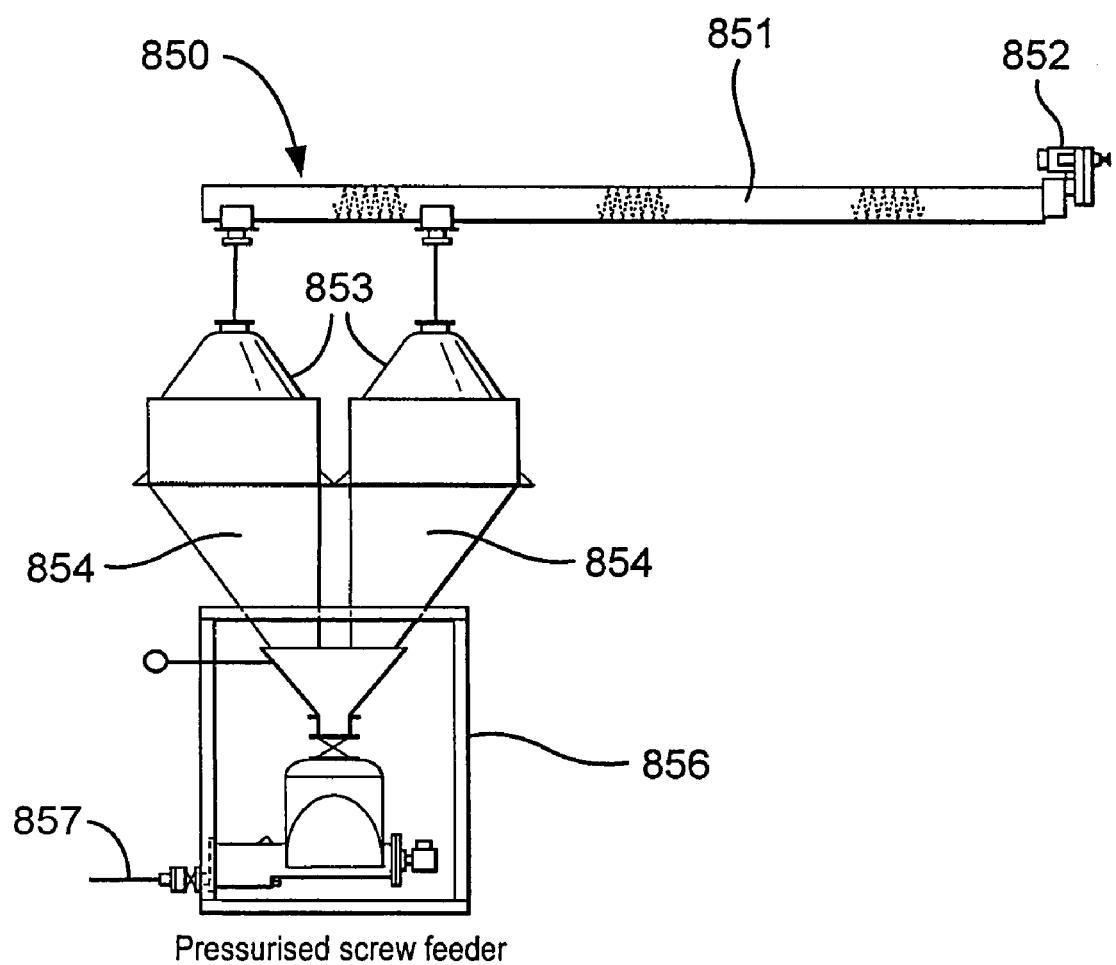
FIG. 24 is a schematic view of a system according to the present invention.

FIG. 24 shows a system 850 according to the present invention similar to the system of FIG. 23 which has a conveyor system 851 powered by a motor/gear system 852 which conveys drilled cuttings to vortex dryers 853 which in turn feed dried cuttings to a system 856 (like the system 836) which feeds the cuttings into an exit conduit 857. The vortex dryers 853 have hoppers 854 beneath them which feed the system 856.

Figure 25:
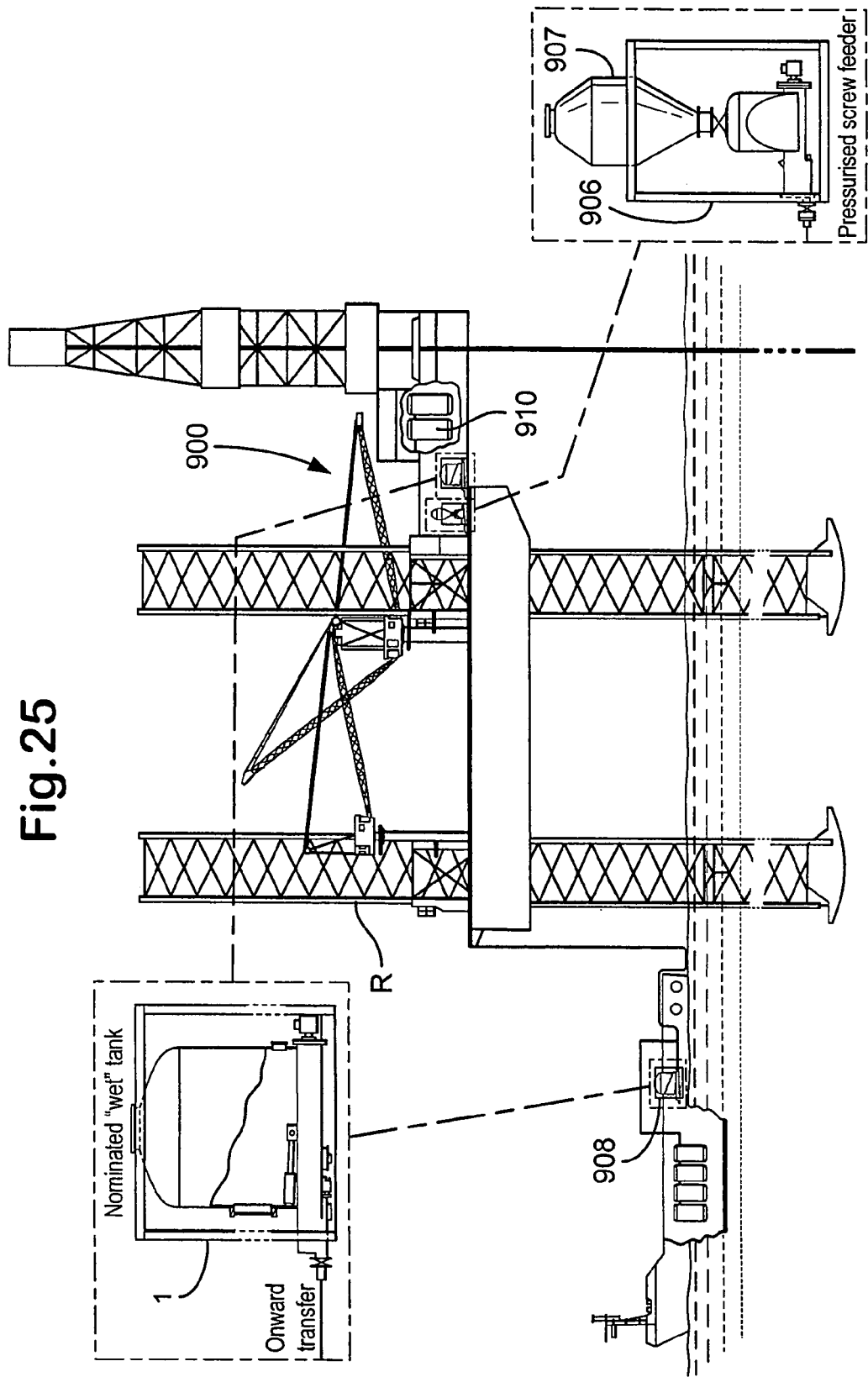
FIG. 25 is a schematic view of a system according to the present invention.

FIG. 25 shows a system 900 according to the present invention for a drilling rig R in which drilled cuttings (e.g. from shale shakers, centrifuges) flow to a system 906 (like the systems 820, 836, 856) with a vortex dryer 907. The system 906 processes the cuttings and feeds them to a system 907 (like the systems 810, 820 and/or systems of FIGS. 13A, 13C, 19A). From the system 907 the cuttings flow to a cuttings box on a boat B or to a system 908 (like the system 907) on the boat B.

Figure 26:
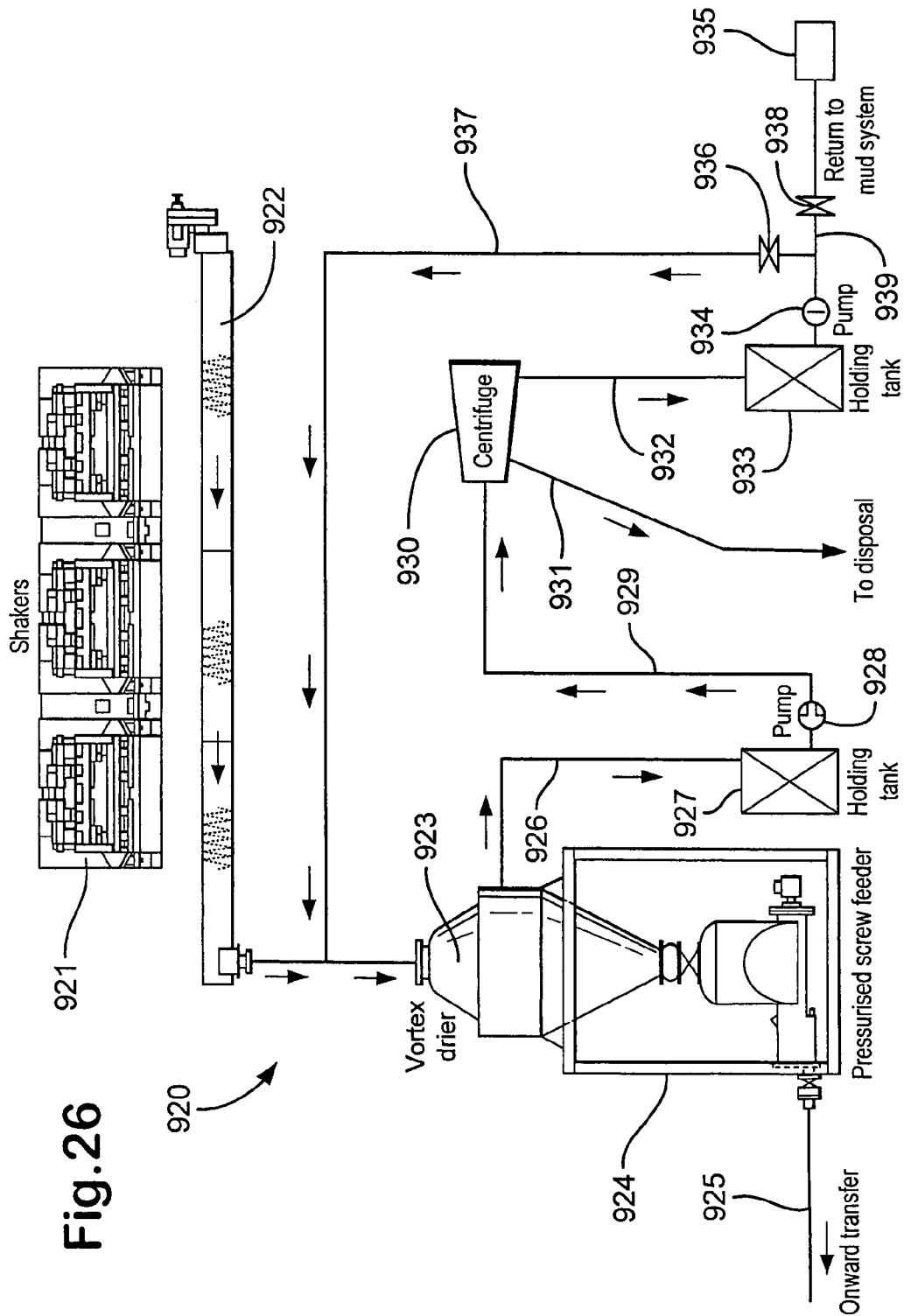
FIG. 26 is a schematic view of a system according to the present invention.

FIG. 26 shows a system 920 according to the present invention in which shakers 921 feed drilled cuttings material to a conveyor system 922 [like the conveyor systems (pressurized screen feeder systems) of FIGS. 22-24] which feeds the material to a vortex dryer 923 which feeds dried material to a pressurized screw feeder system 924 (like the screw feeder systems of FIGS. 20A, 21A and 22-24). Material processed through the system 924 exits for transfer in a line 925. Fluid recovered from the vortex dryer 923 flows in a line 926 to a holding tank 927 from which it is pumped by a pump 928 in a line 929 to a centrifuge 930. Solids from the centrifuge 930 are conducted in a line 931 for disposal and liquid is pumped in a line 932 to a holding tank 933. A pump 934 pumps liquid from the holding tank 933 either in a line 939 to a mud return system 935 (with a valve 936 closed); or back to the vortex dryer 923 in a line 937 (with a valve 938 closed).

Figure 27:
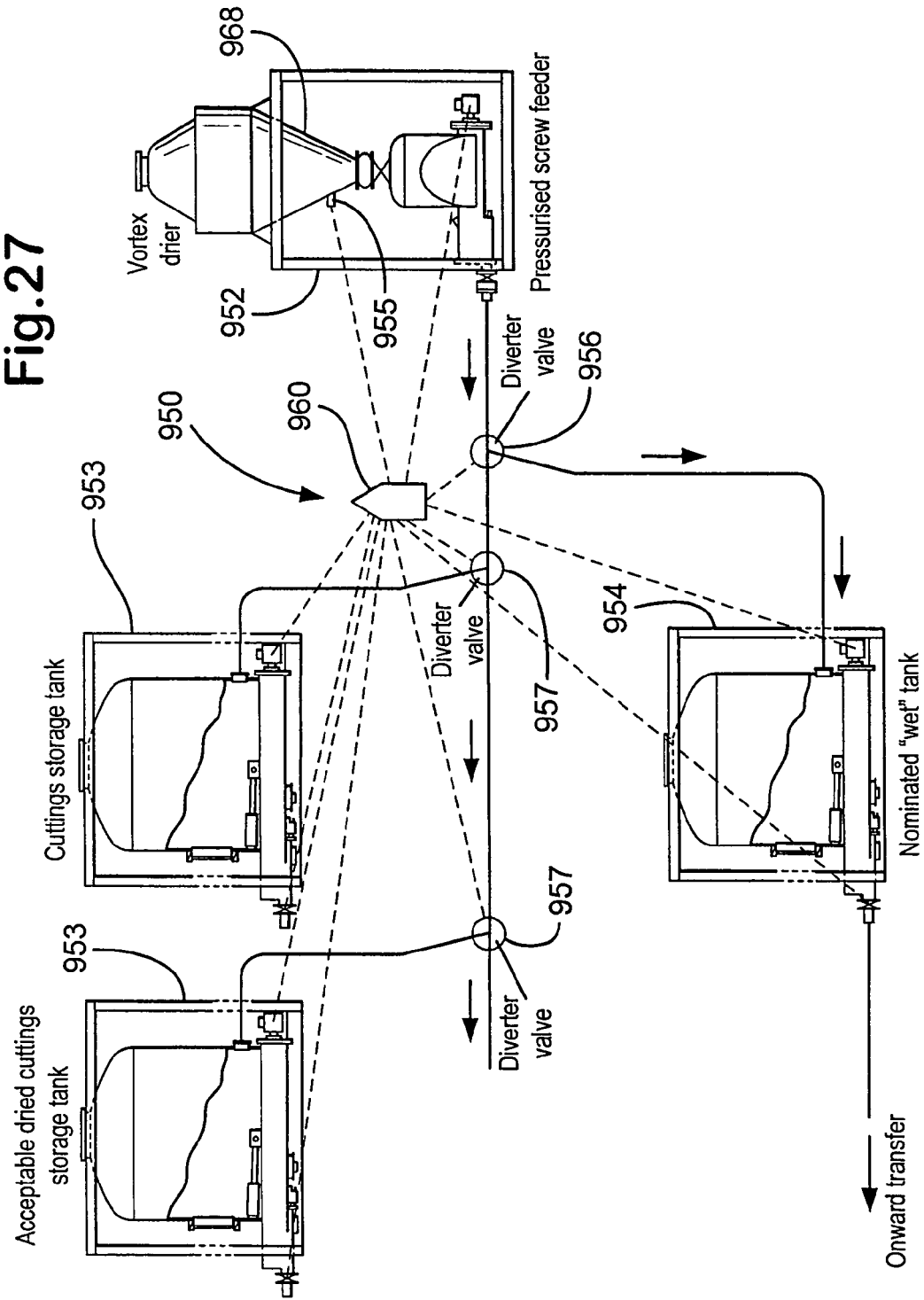
FIG. 27 is a schematic view of a system according to the present invention.

FIG. 27 shows a system 950 according to the present invention in which a pressurized screw feeder system 952 selectively feeds drilled cuttings material to dried cuttings storage systems 953 or to a "wet" tank system 954. A wetness meter 955 senses moisture content of the drilled cuttings material and controller 960 in communication with the wetness meter 955, controls a diverter valve 956 so that adequately dry cuttings go to the storage systems 953 with flow to the "wet" tank system 954 shut off; and wet cuttings go to the wet tank system 954 with flow to the storage systems 953 shut off. Optionally, each storage system 953 has its own associated diverter valve 957 so that flow to each box is selectively controlled by the controller 960.

In certain aspects the pressurized screen feeder system 952 is like the systems in FIGS. 20A and 26; the wet tank system 954 is like the wet tank systems in FIG. 22; and the storage systems 953 are like the storage systems in FIGS. 13B, 15B and 22. The controller 960 controls the motors of each conveyor in the system 950.

In each of the systems of FIGS. 22-27 a suitable control system controls the various components and is in communication with the moisture sensors, valves, conveyors, and motors.

The present invention, in certain aspects, provides a vessel for selectively holding drilling cuttings material, the vessel having a body, the body having a hollow container with an interior space for receiving drilling cuttings material and from which drilling cuttings material may exit from the body; a first opening through which the drilling cuttings material is introducible into the hollow container; a second opening through which the drilling cuttings material is passable out from the hollow container; movement apparatus, the movement apparatus having a movement member within the hollow container and movable adjacent the second opening to facilitate passage of the drilling cuttings material into the second opening; and an exit opening through the body through which drilling cuttings can exit from the hollow container. Such a vessel may include one or some (in any possible combination) of the following: an inlet in the body through which compressed gas (e.g. air and/or nitrogen) under pressure is flowable into the body to facilitate the passage of the drilling cuttings material through the body; the movement apparatus having power apparatus connected to the movement member for moving the movement member; wherein the second opening has a length and the movement member has an elongated member with a length substantially equal to the length of the second opening; wherein the second opening has a width and the movement member is movable back and forth across said width; wherein the movement member has a frame comprising a control shaft connected to a generally circular shaped outer perimeter portion and at least one cross-member; wherein the outer perimeter portion of the frame is generally eye-shaped; conveyance apparatus located below the second opening for conveying drilling cuttings material, the conveyance apparatus including a conduit for receiving the drilling cuttings material passing through the second opening; gas apparatus in fluid communication with the conduit for applying compressed gas under pressure for facilitating the movement of the drilling cuttings material within the conduit; auger apparatus within the conveyance apparatus for auguring the drilling cuttings material along in the conduit; at least one projection member projecting from the auger apparatus to facilitate dispersal of the drilling cuttings material; the conduit having an exit portion, the exit portion having an exit portion inlet, flow apparatus for flowing compressed gas under pressure into the exit portion inlet to facilitate exit of the drilling cuttings material from the conduit; wherein the movement member has an edge shaped for facilitating movement of the drilling cuttings material to the second opening; wherein the body of the vessel has two sides which slope toward each other; wherein the body of the vessel has a conical hopper portion; wherein the conical hopper portion has a cone angle and forms a lower section of the vessel and the cone angle is below a critical value required to achieve mass flow of the drilling cuttings material; wherein the body is generally cylindrical with a generally circular base, the second opening extending through the generally circular base; positive pressure blow tank apparatus for feeding the drilling cuttings material to the first opening; wherein the drilling cuttings material is a free-flowing paste; wherein the drilling cuttings material is a non free-flowing paste; and/or moisture-content sensor apparatus on the body for sensing moisture content of drilling cutting within the vessel, conduit apparatus for conducting drilling cuttings from the exit opening, valve apparatus for selectively controlling flow of drilling cuttings in the conduit apparatus, and a controller in communication with the moisture-content sensor and the valve apparatus for selectively controlling flow in the conduit apparatus and, in one aspect, conducting drilling cuttings material to a "wet" tank or to a "dry" tank.

The present invention, in certain aspects, provides a vessel for selectively holding drilling cuttings material, the vessel having: a body, the body having a hollow container with an interior space for receiving drilling cuttings material and from which drilling cuttings material may exit from the body; a first opening through which the drilling cuttings material is introducible into the hollow container; a second opening through which the drilling cuttings material is passable out from the hollow container; movement apparatus, the movement apparatus having a movement member within the hollow container and movable adjacent the second opening to facilitate passage of the drilling cuttings material into the second opening; an inlet in the body through which compressed gas under pressure is flowable into the body to facilitate the passage of the drilling cuttings material through the body; the movement apparatus further comprising power apparatus connected to the movement member for moving the movement member; wherein the second opening has a length and the movement member comprises an elongated member with a length substantially equal to the length of the second opening; wherein the second opening has a width and the movement member is movable back and forth across said width; and conveyance apparatus located below the second opening, the conveyance apparatus including a conduit for receiving the drilling cuttings material passing through the second opening. Such a vessel may include one or some (in any possible combination) of the following: wherein the body of the vessel has two sides which slope toward each other; wherein the body of the vessel has a conical hopper portion and wherein the conical hopper portion has a cone angle and forms a lower section of the vessel and the cone angle is below a critical value required to achieve mass flow of the drilling cuttings material; and/or wherein the body is generally cylindrical with a generally circular base, the second opening extending through the generally circular base.

The present invention, in certain aspects, provides a vessel for selectively holding drilling cuttings material, the vessel having: a body, the body comprising a hollow container with an interior space for receiving drilling cuttings material and from which drilling cuttings material may exit from the body; a first opening through which the drilling cuttings material is introducible into the hollow container; a second opening through which the drilling cuttings material is passable out from the hollow container; conveyance apparatus located below the second opening for conveying drilling cuttings material, the conveyance apparatus including a conduit for receiving the drilling cuttings material passing through the second opening, gas apparatus in fluid communication with the hollow container and with the conduit for applying compressed gas under pressure within the hollow container and within the conduit so that pressure drop between the hollow container and the conduit is negligible. Such a vessel may include one or some (in any possible combination) of the following: movement apparatus, the movement apparatus having a movement member within the hollow container and movable adjacent the second opening to facilitate passage of the drilling cuttings material into the second opening, and an exit opening through the body through which drilling cuttings can exit from the hollow container.

The present invention, in certain aspects, provides a system for processing drilling cuttings material, the system having a cuttings feeder system for receiving drilling cuttings material from a wellbore operation; conduit apparatus for conveying drilling cuttings material from the cuttings feeder system to first storage apparatus and to second storage apparatus; sensor apparatus for sensing moisture content of drilling cuttings material in the cuttings feeder system; valve apparatus on the conduit apparatus for selectively controlling flow to the first storage apparatus and to the second storage apparatus; control apparatus in controlling communication with the cuttings feeder system, the sensor apparatus, and the valve apparatus for selectively permitting flow of drilling cuttings material from the cuttings feeder system and through the conduit apparatus to either the first storage apparatus or the second storage apparatus depending on sensed moisture content of the drilling cuttings material sensed by the sensor apparatus; and the control system permitting flow to the first storage apparatus when sensed moisture content is below a pre-selected valve and to the second storage apparatus when sensed moisture content is above the pre-selected valve. Such a system may include one or some (in any possible combination) of the following: wherein the first storage apparatus includes a plurality of spaced-apart pressure vessel storage system, each with corresponding flow conduits for receiving drilling cuttings material, each with corresponding vessel valve apparatus for selectively controlling flow in said corresponding flow conduits, each of said vessel valve apparatuses in controlling communication with the control apparatus; wherein the cuttings feeder system, the first storage apparatus, and the second storage apparatus each has associated cuttings movement apparatus, all cuttings movement apparatuses in controlling communication with the control system; and/or wherein the cuttings feeder system includes a cuttings vessel which receives the drilling cuttings material, the cuttings vessel in volume between $0.05$ m$^3$ and $0.2$ m$^3$.

The present invention, in certain aspects, provides a method for moving drilling cuttings material from a vessel, the method including introducing drilling cuttings material into a first opening of a vessel, the vessel like any herein according to the present invention, moving the movement member of the vessel adjacent a second opening facilitating passage of the drilling cuttings material into the second opening; and in such a method the drilling cuttings material is a free-flowing paste; or is a non free-flowing paste.

The present invention, in certain aspects, provides a method of conveying a paste, the paste including drilled cuttings laden with fluid, the method including: feeding the paste into a vessel, the vessel having a body, the body comprising a hollow container with an interior space for receiving drilling cuttings material and from which drilling cuttings material may exit from the body, a first opening through which the drilling cuttings material is introducible into the hollow container, a second opening through which the drilling cuttings material is passable out from the hollow container, and movement apparatus, the movement apparatus comprising a movement member within the hollow container and movable adjacent the second opening to facilitate passage of the drilling cuttings material into the second opening; and applying a compressed gas to the vessel to cause the paste to flow out of the vessel, the vessel including a conical hopper portion which, at least during discharge of the produced material, forms the lower section of the vessel and the lower section having a cone angle below a critical value required to achieve mass flow of the produced material. Such a method may include one or some (in any possible combination) of the following: wherein the paste is a free-flowing paste; wherein the paste is a non-free-flowing paste; accomplishing said method on a boat, or accomplishing said method on an offshore drilling rig.

The present invention, in certain aspects, provides a method for processing drilling cuttings material, the method further including: introducing drilling cuttings material to a cuttings feeder system of a cuttings conveyance system, the cuttings conveyance system having a cuttings feeder system for receiving drilling cuttings material from a wellbore operation, conduit apparatus for conveying drilling cuttings material from the cuttings feeder system to first storage apparatus and to second storage apparatus, sensor apparatus for sensing moisture content of drilling cuttings material in the cuttings feeder system, valve apparatus on the conduit apparatus for selectively controlling flow to the first storage apparatus and to the second storage apparatus, control apparatus in controlling communication with the cuttings feeder system, the sensor apparatus, and the valve apparatus for selectively permitting flow of drilling cuttings material from the cuttings feeder system and through the conduit apparatus to either the first storage apparatus or the second storage apparatus depending on sensed moisture content of the drilling cuttings material sensed by the sensor apparatus, and the control system permitting flow to the first storage apparatus when sensed moisture content is below a pre-selected valve and to the second storage apparatus when sensed moisture content is above the pre-selected valve; sensing moisture content of the drilling cuttings material in the cuttings feeder system with the sensor apparatus; controlling the valve apparatus with the control apparatus to permit flow of drilling cuttings material to either the first storage apparatus or the second storage apparatus depending on the sensed moisture content of the drilling cuttings material in the cuttings feeder system by the sensor apparatus; and selectively flowing drilling cuttings material to the first storage apparatus and the second storage apparatus. Such a method may include one or some (in any possible combination) of the following: wherein the first storage apparatus receives dry drilling cuttings material and the second storage apparatus receives wet drilling cuttings material; wherein the cuttings feeder system includes dryer apparatus for drying the drilling cuttings material from the wellbore operation, the method further including drying with the dryer apparatus the drilling cuttings material from the wellbore operation; and/or wherein the cuttings feeder system, the first storage apparatus, and the second storage apparatus each has associated cuttings movement apparatus, all cuttings movement apparatuses in controlling communication with the control apparatus, the method including controlling with the control apparatus the cuttings movement apparatus.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A method for processing drill cuttings, the method comprising:

obtaining drill cuttings from at least one of a shale shaker, hydrocyclone, centrifuge or drill cuttings dryer, measuring the moisture content of the drill cuttings to obtain a moisture value, comparing the moisture value to a predetermined threshold, and conveying the drill cuttings in a dry cuttings route if the moisture value is below the predetermined threshold or conveying the drill cuttings in a wet cuttings route if the moisture value is above the threshold.

2. The method of claim 1 wherein the dry cuttings route comprises a feeder apparatus and a pneumatic conveying line, the method further comprising loading the drill cuttings into the feeder apparatus, which feeder apparatus feeds the pneumatic conveying line with the drill cuttings.

3. The method of claim 2 wherein the pneumatic conveying line is a positive pressure pneumatic conveying line.

4. The method of claim 2 wherein the pneumatic conveying line leads to a storage vessel, the method further comprising conveying the drill cuttings through the pneumatic conveying line to the storage vessel.

5. The method of claim 2 wherein the pneumatic conveying line leads to a bulk storage tanks of an oil or gas rig, the method further a comprising conveying the drill cuttings through the pneumatic conveying line to the bulk storage tanks.

6. The method of claim 2 wherein the pneumatic conveying line leads to a hold of an oil or gas rig, the method further comprising conveying the drill cuttings through the pneumatic conveying line to the hold.

7. The method of claim 2 wherein measuring the moisture content of the drill cuttings is carried out with a moisture sensor located in the feeder apparatus.

8. The method of claims 2 wherein the feeder apparatus comprises a hopper and a pressure vessel, and the measuring of the moisture content of the drill cuttings is carried out with a moisture sensor located in the hopper.

9. The method of claims 1 wherein the wet cuttings route comprises a feeder apparatus and a pneumatic conveying line, the method further comprising loading the drill cuttings into the feeder apparatus, which feeder apparatus feeds the pneumatic conveying line with the drill cuttings.

10. The method of claim 9 wherein the pneumatic conveying line is a positive pressure pneumatic conveying line.

11. The method of claim 9 wherein the pneumatic conveying line leads to a storage vessel, the method further comprising conveying the drill cuttings through the pneumatic conveying line to the storage vessel.

12. The method of claim 9 wherein the pneumatic conveying line leads to a cuttings dryer for further drying, the method including further drying the drill cuttings with the cuttings dryer.

13. The method of claim 2 wherein the measuring of the moisture content of the drill cuttings is carried out with a moisture sensor located in the feeder apparatus.

14. The method of claim 2 wherein the feeder apparatus comprises a hopper and a pressure vessel, and the measuring of the moisture content of the drill cuttings is carried out with a moisture sensor located in the hopper.

15. The method of claim 1 wherein a screw conveyor is located beneath the at least one of a shale shaker, hydrocyclone, centrifuge or drill cuttings dryer to receive the drill cuttings, the screw conveyor comprising a drive such that the screw conveyor is reversible to convey the drill cuttings in one direction for a dry cuttings route and in a second direction for a wet cuttings route, the method including conveying the drill cuttings with the screw conveyor.

16. The method of claim 1 wherein the predetermined threshold is any of the values of 5% moisture content, 3% moisture content, and 1% moisture content.

* * * * *